(12) United States Patent
Vega Zayas et al.

(10) Patent No.: US 12,393,397 B2
(45) Date of Patent: *Aug. 19, 2025

(54) DISTRIBUTED SYNCHRONIZATION

(71) Applicant: Sonos, Inc., Santa Barbara, CA (US)

(72) Inventors: Luis Vega Zayas, Cambridge, MA (US); Ted M. Lin, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,478

(22) Filed: Nov. 6, 2023

(65) Prior Publication Data

US 2024/0281198 A1 Aug. 22, 2024

Related U.S. Application Data

(63) Continuation of application No. 17/853,654, filed on Jun. 29, 2022, now Pat. No. 11,809,780, which is a continuation of application No. 16/160,996, filed on Oct. 15, 2018, now Pat. No. 11,416,209.

(51) Int. Cl.
*G06F 17/00* (2019.01)
*G06F 3/16* (2006.01)

(52) U.S. Cl.
CPC .................................. *G06F 3/165* (2013.01)

(58) Field of Classification Search
CPC ....................................................... G06F 3/165
USPC ............................................................. 700/94
See application file for complete search history.

(56) References Cited

U.S. PATENT DOCUMENTS

| | | |
|---|---|---|
| 848,353 A | 3/1907 | Elmer, Jr. |
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |

(Continued)

FOREIGN PATENT DOCUMENTS

| | | |
|---|---|---|
| CN | 101410773 A | 4/2009 |
| CN | 103338204 A | 10/2013 |

(Continued)

OTHER PUBLICATIONS

AudioTron Quick Start Guide, Version 1.0, Mar. 2001, 24 pages.

(Continued)

*Primary Examiner* — Paul C McCord
(74) *Attorney, Agent, or Firm* — Akerman LLP

(57) ABSTRACT

Disclosed herein are playback devices, groups of playback devices, and methods of operating playback devices and groupings thereof to cause the playback devices in a group of playback devices to play audio content together in synchrony based on playback timing and clock timing, where the audio content and playback timing and the clock timing for use with playing the audio content according to the clock timing are provided by different playback devices in the group of playback devices.

20 Claims, 23 Drawing Sheets

(56) References Cited

U.S. PATENT DOCUMENTS

| | | |
|---|---|---|
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,668,964 B2 | 2/2010 | Millington |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,428,758 B2 | 4/2013 | Naik et al. |
| 8,483,853 B1 | 7/2013 | Lambourne |
| 8,942,252 B2 | 1/2015 | Balassanian et al. |
| 9,788,140 B2 | 10/2017 | Sole et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2010/0150383 A1 | 6/2010 | Sampat |
| 2010/0198992 A1 | 8/2010 | Morrison et al. |
| 2014/0003542 A1 | 1/2014 | Zukerman et al. |
| 2014/0093085 A1 | 4/2014 | Jarvis et al. |
| 2015/0094834 A1 | 4/2015 | Vega et al. |
| 2015/0304696 A1 | 10/2015 | Cheng |
| 2017/0098466 A1 | 4/2017 | Elliot et al. |
| 2017/0242653 A1 | 8/2017 | Lang et al. |
| 2018/0107446 A1 | 4/2018 | Wilberding et al. |
| 2018/0165056 A1 | 6/2018 | Lay et al. |
| 2019/0215597 A1 | 7/2019 | Ha et al. |

FOREIGN PATENT DOCUMENTS

| | | |
|---|---|---|
| CN | 105872261 A | 8/2016 |
| EP | 1389853 A1 | 2/2004 |
| EP | 2843663 A1 | 3/2015 |
| WO | 200153994 | 7/2001 |
| WO | 2003093950 A2 | 11/2003 |
| WO | 2017035968 A1 | 3/2017 |
| WO | 2017058654 A1 | 4/2017 |
| WO | 2017106011 A1 | 6/2017 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action and Translation mailed on Jan. 24, 2022, issued in connection with Chinese Application No. 201980077624.4, 10 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Sep. 27, 2022, issued in connection with European Application No. 19797928.9, 6 pages.
Final Office Action mailed on Jun. 8, 2020, issued in connection with U.S. Appl. No. 16/160,996, filed Oct. 15, 2018, 20 pages.
International Bureau, International Search Report and Written Opinion mailed on Dec. 20, 2019, issued in connection with International Application No. PCT/US2019/056306, filed on Oct. 15, 2019, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jun. 11, 2021, issued in connection with U.S. Appl. No. 16/160,996, filed Oct. 15, 2018, 15 pages.
Non-Final Office Action mailed on Mar. 2, 2023, issued in connection with U.S. Appl. No. 17/853,654, filed Jun. 29, 2022, 19 pages.
Non-Final Office Action mailed on Sep. 30, 2019, issued in connection with U.S. Appl. No. 16/160,996, filed Oct. 15, 2018, 16 pages.
Notice of Allowance mailed on Mar. 28, 2022, issued in connection with U.S. Appl. No. 16/160,996, filed Oct. 15, 2018, 7 pages.
Notice of Allowance mailed on Jul. 6, 2023, issued in connection with U.S. Appl. No. 17/853,654, filed Jun. 29, 2022, 8 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

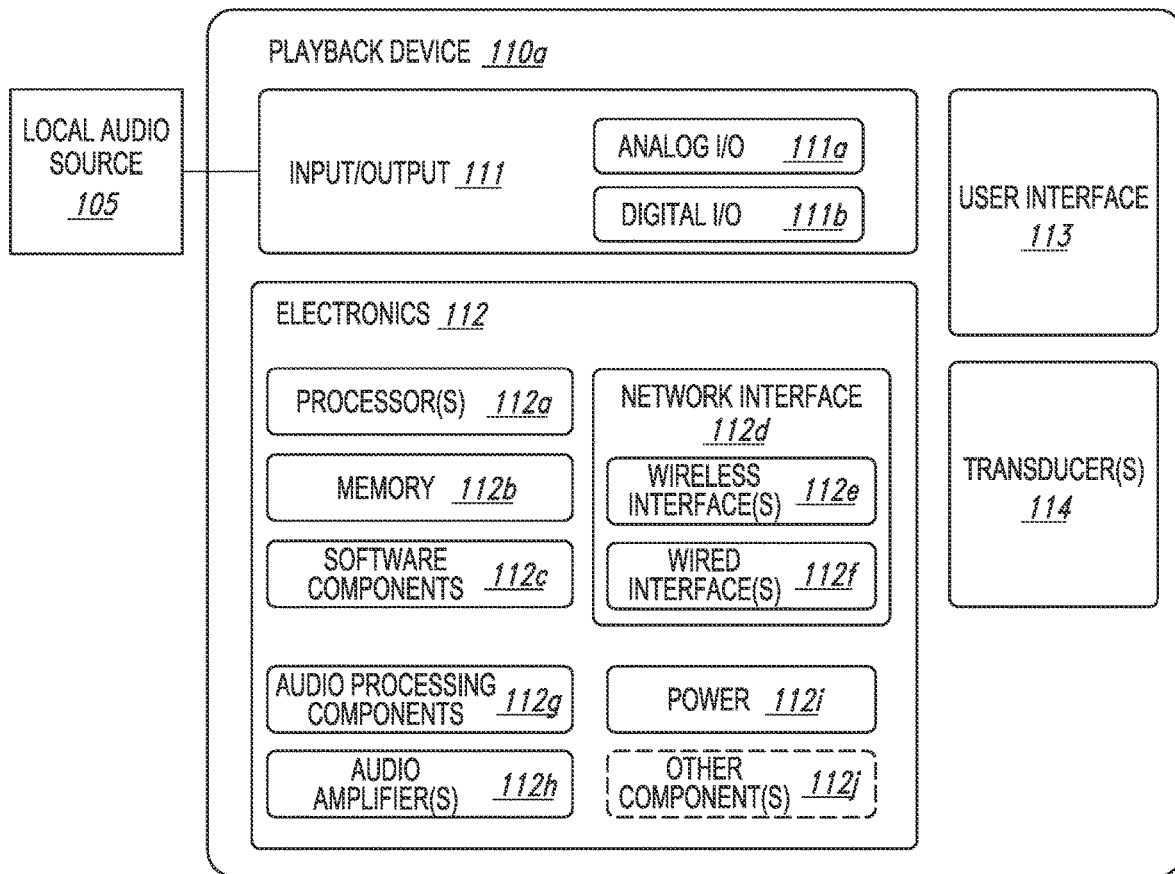
*Fig. 1C*
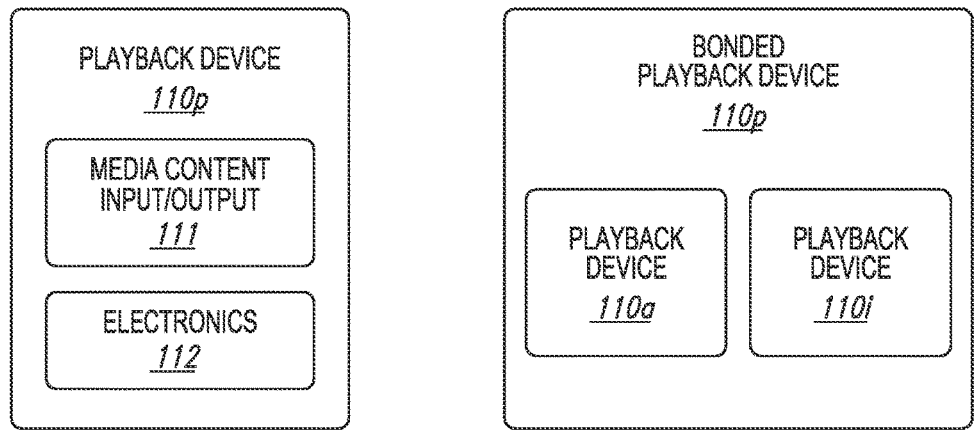
*Fig. 1D*    *Fig. 1E*

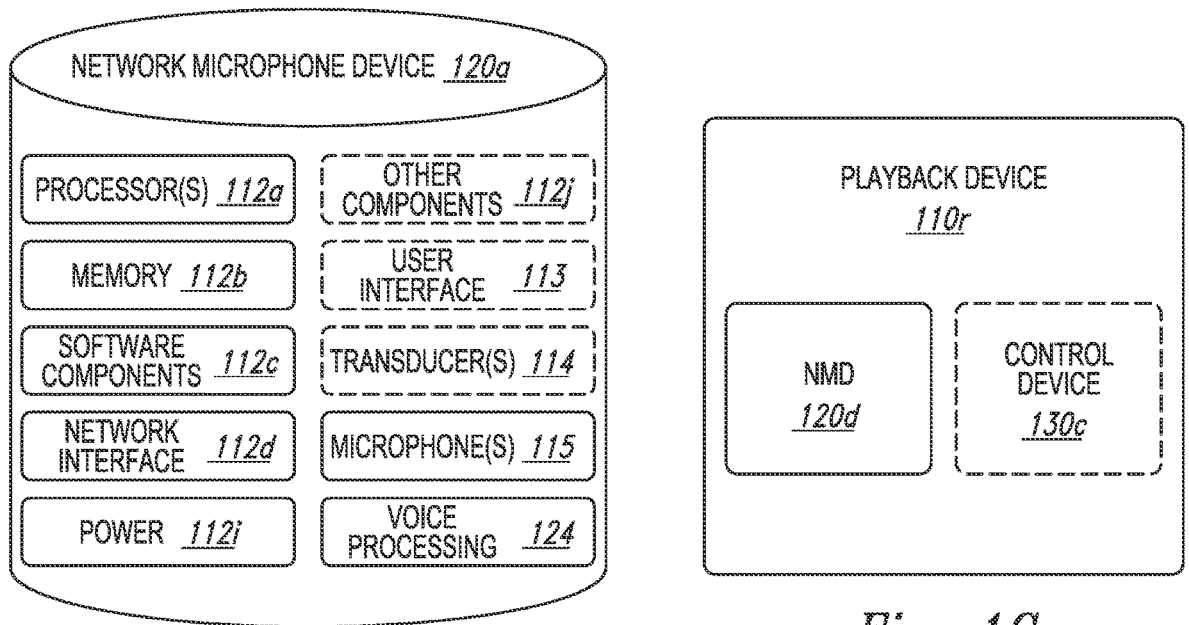
Fig. 1F
Fig. 1G
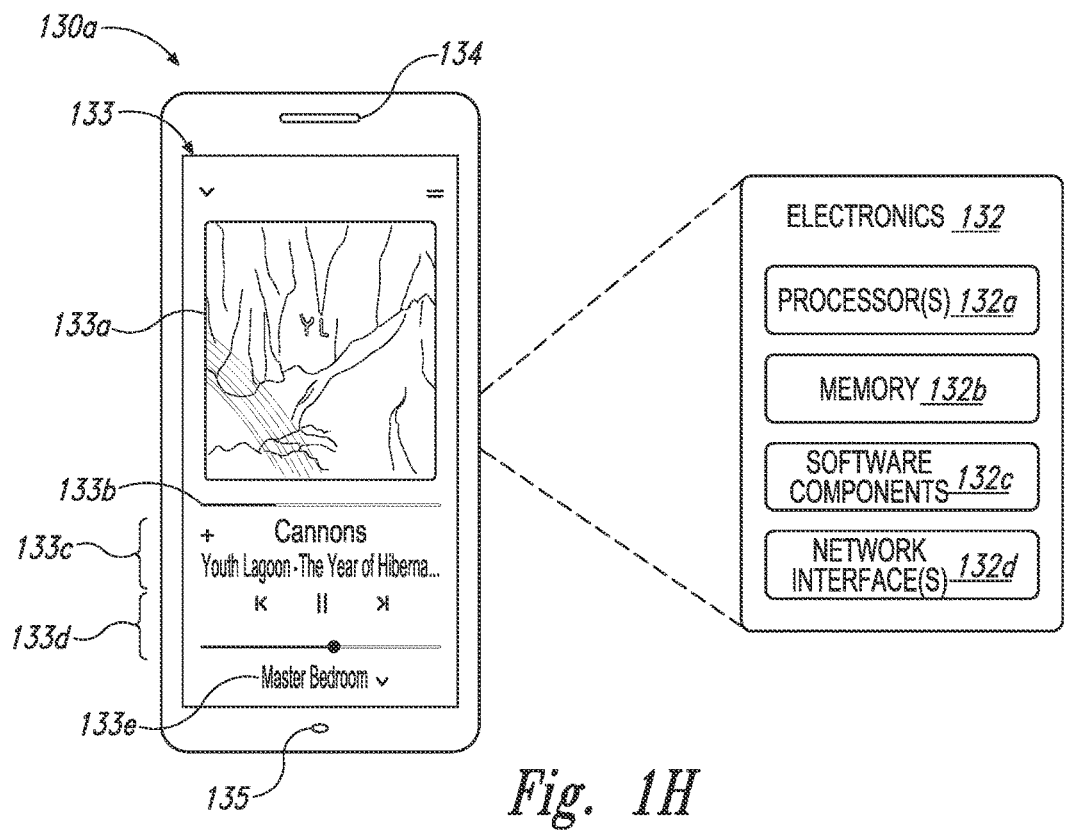
Fig. 1H

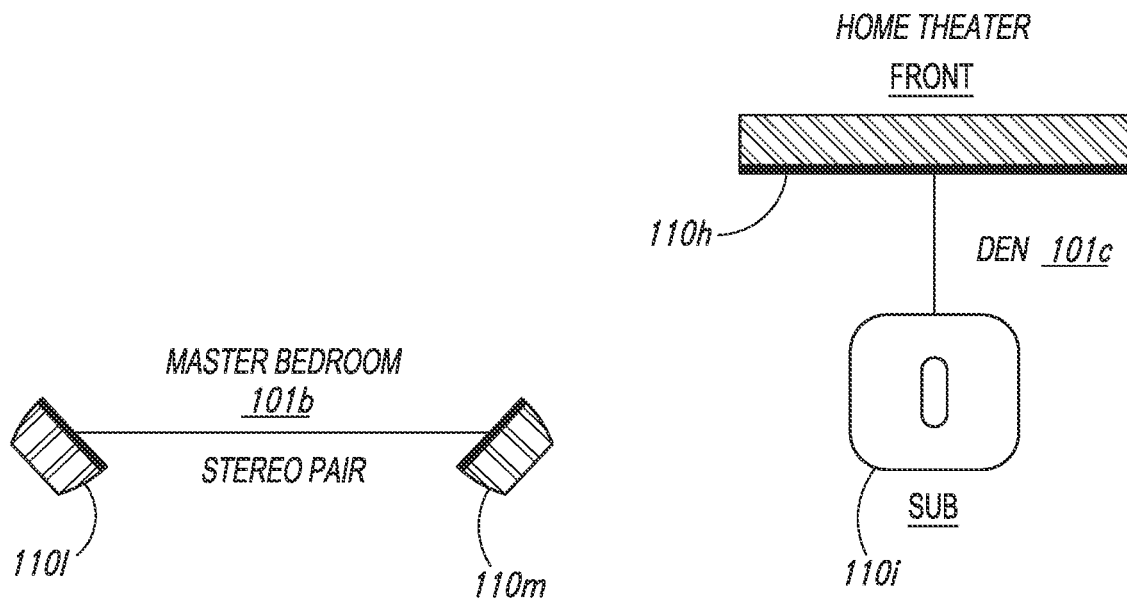
Fig. 1I
Fig. 1J
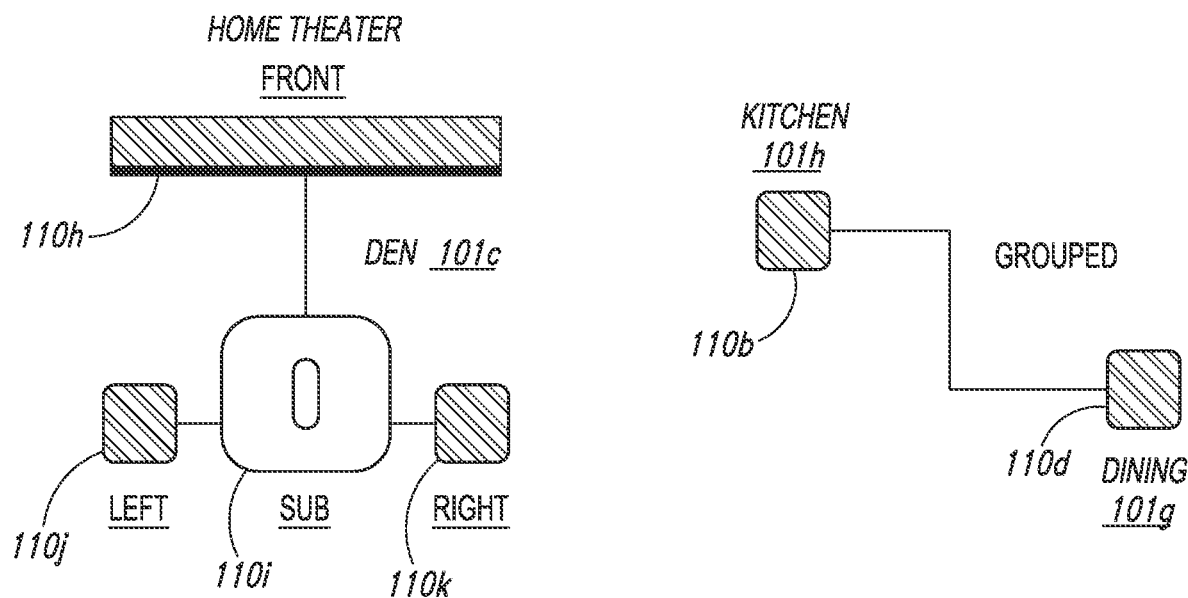
Fig. 1K
Fig. 1L

DISTRIBUTED SYNCHRONIZATION

CROSS-REFERENCE TO RELATED APPLICATIONS

The present application is a continuation of U.S. application Ser. No. 17/853,654, titled "Distributed Synchronization," filed on Jun. 29, 2022, and currently pending; U.S. application Ser. No. 17/853,654 is a continuation of U.S. application Ser. No. 16/160,996, titled "Distributed Synchronization," filed on Oct. 15, 2018, and issued as U.S. Pat. No. 11,416,209 on Aug. 16, 2022. This application is also related to PCT App. PCT/US19/56306, titled "Distributed Synchronization," filed on Oct. 15, 2019, and currently expired. The entire contents of U.S. application Ser. Nos. 17/853,654, 16/160,996 and PCT App. PCT/US19/56306 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C shows a block diagram of a playback device.

FIG. 1D shows a block diagram of a playback device.

FIG. 1E shows a block diagram of a network microphone device.

FIG. 1F shows a block diagram of a network microphone device.

FIG. 1G shows a block diagram of a playback device.

FIG. 1H shows a partially schematic diagram of a control device.

FIGS. 1-I through 1L show schematic diagrams of corresponding media playback system zones.

Figure 1A:
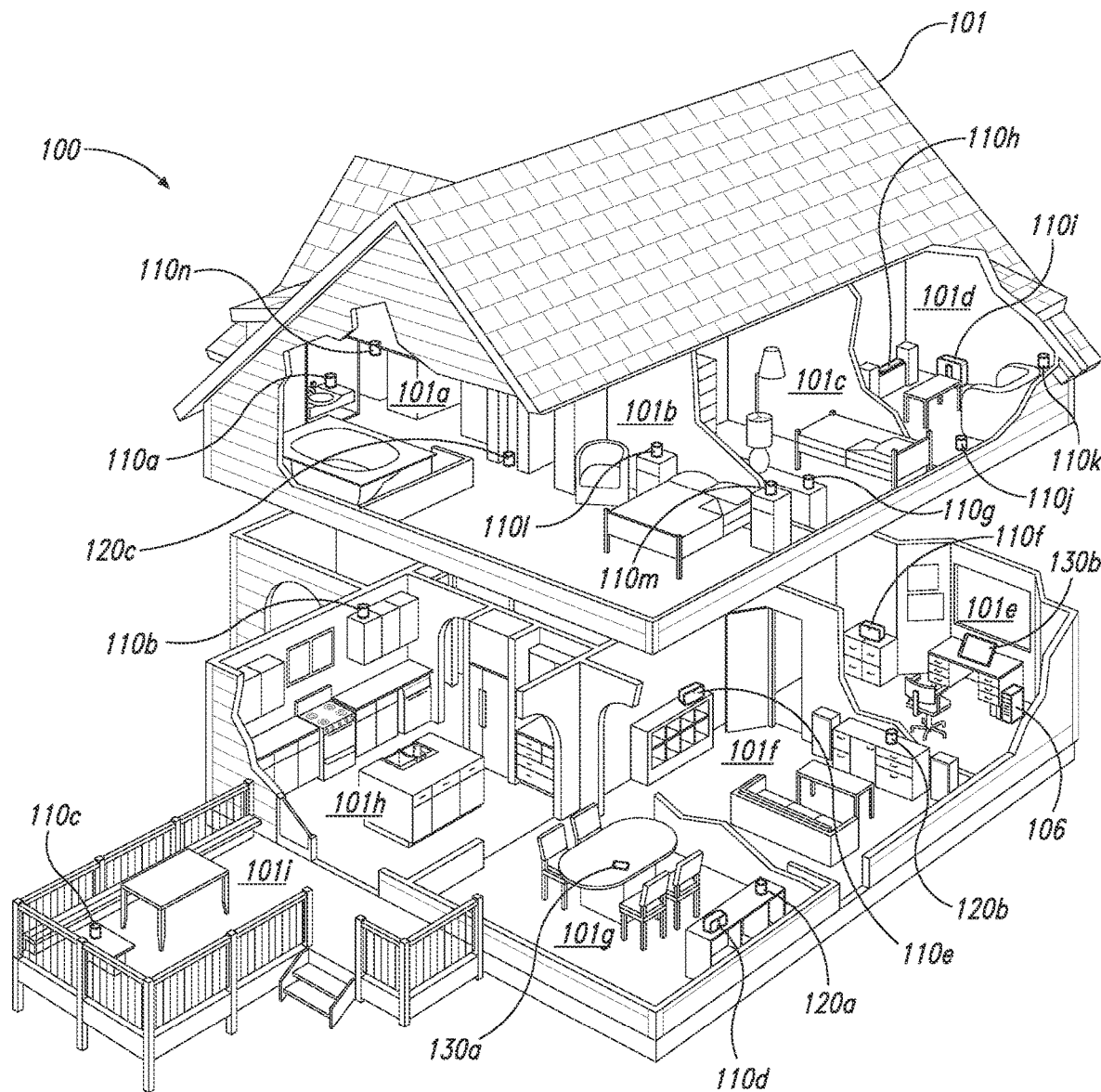
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

It is desirable for playback devices to play audio content from many different sources, e.g., audio streaming services, video streaming services, audio or video sources, voice assistant services (VASs) doorbells, intercoms, telephones, and other sources. Sometimes it is desirable to play audio content from multiple sources at the same time. For example, while playing music or playing audio associated with a television program or other video content, it may be desirable in some instances for a playback device to also play a doorbell chime or provide a voice (or other audio) response or confirmation.

For example, assume a scenario where (i) a user is watching a television program, movie, or other video content and (ii) a playback device is playing the audio content associated with that video content. While the playback device is playing the audio content associated with the video content, a visitor or delivery person activates the user's network-connected doorbell (e.g., a Nest Hello® or similar doorbell or intercom system). In response to activation of the doorbell, and while continuing to play the audio content associated with the video content, the playback device ducks (reduces the volume of) the audio content associated with the video content, and the playback device plays audio from the doorbell, thereby alerting the user to the doorbell activation. And for doorbell systems with two-way intercom or speech capability, a playback device with a microphone may additionally enable the user to talk to the visitor or delivery person via a bidirectional communication link between the microphone-equipped playback device and the doorbell while the playback device continues to play the audio content associated with the video content, albeit perhaps playing the audio content associated with the video content at the lower (or ducked) volume level.

Although a single conventional playback device may be able to play the second audio content (e.g., the audio associated with the doorbell/intercom) from the second audio source (e.g., the doorbell/intercom or computing device/system associated therewith) while still playing the first audio content (e.g., the audio associated with the video content) from the first audio source (e.g., the television or computing device/system associated with the television or providing the audio/video content for playback), technical problems arise when a set (or group) of two or more networked playback devices need to play the second audio (e.g., the audio associated with the doorbell/intercom) in synchrony with each other while the set of two or more networked playback devices are also playing the first audio (e.g., the audio associated with the video content) in synchrony with each other.

For example, playing multiple audio streams from multiple audio sources by multiple playback devices presents technical challenges in scenarios where, like some embodiments described herein, one or more of the multiple playback devices and/or audio sources are clocking at different clocking rates. This is especially true in systems where, like some embodiments described herein, (i) the multiple audio sources and playback devices are connected via an asynchronous data network (e.g., Ethernet, WiFi, or other asynchronous network) where packets of audio content transit the LAN or WAN with non-deterministic delays and/or (ii) the multiple audio sources and playback devices are not synchronized to a centralized, dedicated master clock that enables all of the devices to perform playback functions at precisely the same time under control of or otherwise synchronized to the time, phase, and/or frequency of the centralized, dedicated master clock.

The problem is further compounded when different playback devices in a group source different audio content from different audio sources for playback by the group in synchrony with each other. For example, in some current synchronous playback schemes, if a first playback device tries to play first audio content that it sources and provides to a second playback device according to the first playback device's timing and also tries to play second audio content received from the second playback device according to the second playback device's timing, the first and second playback devices could create a timing reference loop where neither playback device would be able to reliably play either of the two separate audio content streams in synchrony. The problem is compounded further still with larger groups of playback devices and additional audio content sourced from additional audio sources.

The systems and methods disclosed and described herein overcome these and other technical problems that can arise when a group of playback devices obtains different audio content from different audio sources for playback by the playback devices in the group in synchrony at the same time. In some embodiments disclosed herein, a group of two or more playback devices is configured in a synchrony group where all the playback devices in the synchrony group are configured to play audio content in synchrony with each other. In some embodiments, a group of two playback devices is configured in a stereo pair where one playback device plays a right channel of audio content and the other playback device plays a left channel of audio content. In some embodiments, a group of two or more playback device is configured as a consolidated playback device where different playback devices in the consolidated playback device are configured to play different frequencies and/or channels of audio content. In some embodiments, a group of two or more playback devices is configured as a multi-channel surround sound system where different playback devices in the group are configured to play one or more channels of surround sound content. And in some embodiments, a group of two or more playback devices not in configured in a synchrony group, stereo pair, consolidated playback device, or surround sound system arrangement, but individual playback devices are configured to share playback timing and clock timing information over a network so that individual playback devices can play at least some audio content (e.g., some types of audio from some types of audio sources) in synchrony with each other even though those individual playback devices may not be formally grouped in a synchrony group, stereo pair, consolidated playback device, surround sound system, or any other formal grouping. And in still further embodiments, a group of two or more playback devices may include one or more of (i) a set of two or more playback devices grouped in a synchrony group, (ii) a set of two playback devices grouped as a stereo pair, (iii) a set of two or more playback devices grouped as a consolidated playback device, (iv) a set of two or more playback devices grouped as a surround sound system, and/or (v) a set of two or more playback devices that are not formally grouped but nevertheless configured to playback at least some audio or some types of audio from some types of sources in synchrony with each other.

Within the various configurations, one aspect of the disclosed technical solutions relates to how different playback devices sourcing audio content generate playback timing for their respective sourced audio content and then send that playback timing to the other playback devices of the group along with the audio content for playback in synchrony by the playback devices in the group.

Another aspect of the disclosed technical solutions relates to how playback devices in the group adjust playback timing received from a playback device based on clock timing information before playing the audio content in synchrony with the other playback devices in the group. In some embodiments, a first playback device adjusts playback timing received from a second playback device based on its own clock timing information and clock timing information received from another playback device, e.g., the second playback device or a third playback device.

Yet another aspect of the disclosed technical solutions is based on decoupling the generation of playback timing from the generation of clock timing to allow, for example, a playback device that sources audio content (i.e., the "sourcing" playback device) to generate playback timing for that audio content based on clock timing received from another playback device. A related aspect that flows from the decoupling of the generation of playback timing from the generation of clock timing is based on how playback devices can use playback timing and clock timing from different playback devices to play audio content in synchrony.

Yet another aspect of the disclosed technical solutions is based on enabling any playback device (or other device in the network) to provide clock timing for use by playback devices to generate playback timing and/or play audio content in synchrony based on playback timing. In some embodiments, any device in the network (e.g., a playback device or other computing device) can provide clock timing for a synchronous playback session, and the device in the network that provides clock timing can change over time.

These and other aspects of the technical solutions disclosed herein enable groups of playback devices to play audio content sourced from multiple playback devices in the group (and from any playback device in the group) in synchrony even when the playback devices and audio sources have different clock times and/or operate at slightly different clocking rates.

For example, some embodiments disclosed herein relate to a first playback device comprising one or more processors and tangible, non-transitory, computer-readable media comprising instructions that, when executed, cause the first playback device to perform computing functions relating to playing audio content in synchrony with one or more other playback devices.

In some embodiments, this first playback device is configured to generate first clock timing information for the first playback device, where the first clock timing information comprises a first clock time of the first playback device. The first playback device also receives second clock timing information comprising a second clock time and determines a difference between the first clock time and the second clock time.

The first playback device additionally receives first audio information from a first audio information source and first playback timing information indicating when to play at least a portion of the first audio information.

And after receiving the first audio information and the playback timing information, the first playback device plays the first audio information in synchrony with a second playback device based on (i) the first playback timing information, (ii) the first clock timing information, and (iii) the difference between the first clock time and the second clock time.

Then, while playing the first audio information in synchrony with the second playback device, the first playback device receives second audio information. And in response to receiving the second audio information, the first playback device (i) generates second playback timing information based on the difference between the first clock time and the second clock time, (ii) transmits the second audio information and the second playback timing information to the second playback device, and (iii) plays the second audio information in synchrony with the second playback device based on the second playback timing information and the first clock timing information.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 110e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 110e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 110e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 11-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 110e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
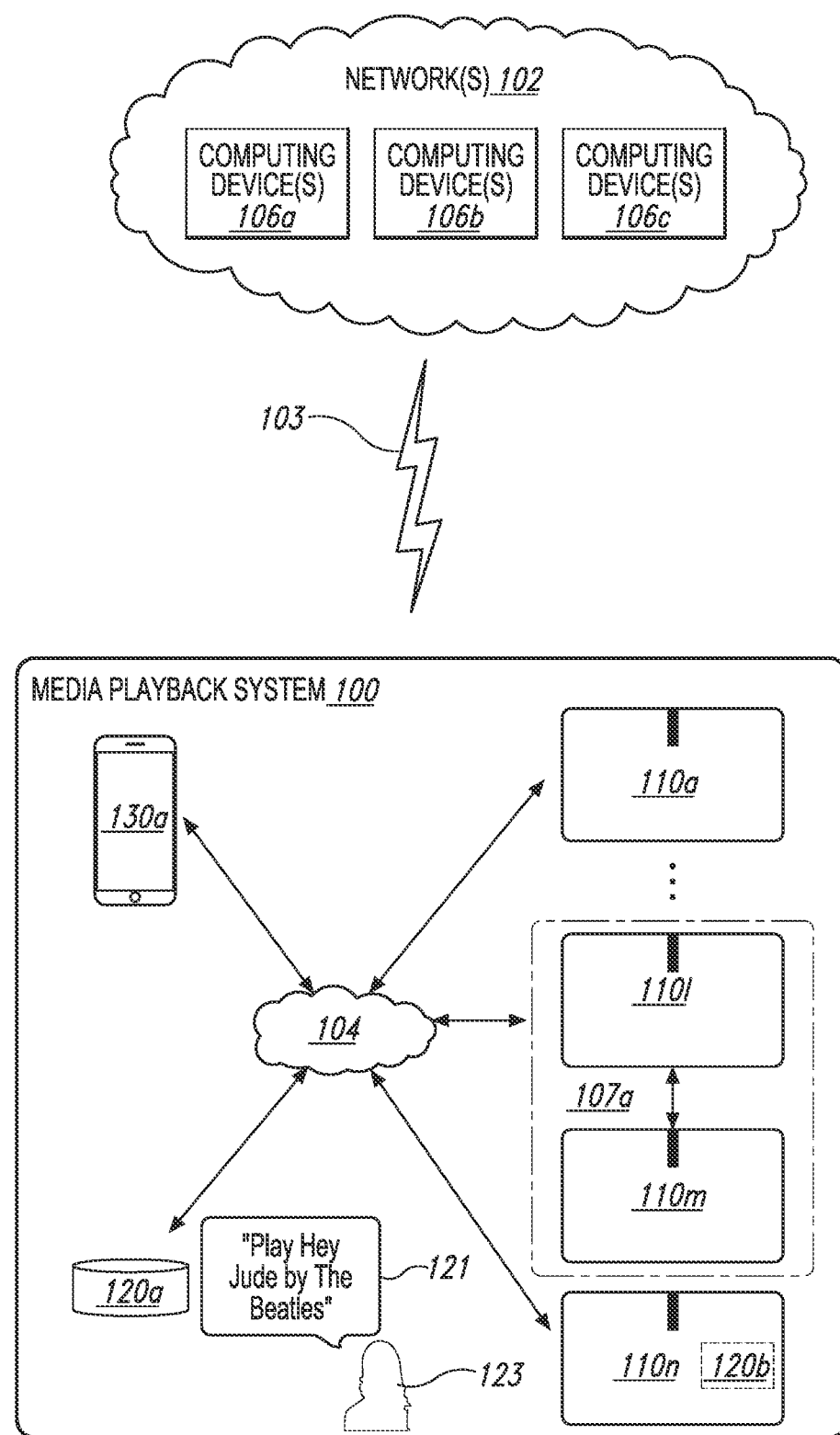
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through IM.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
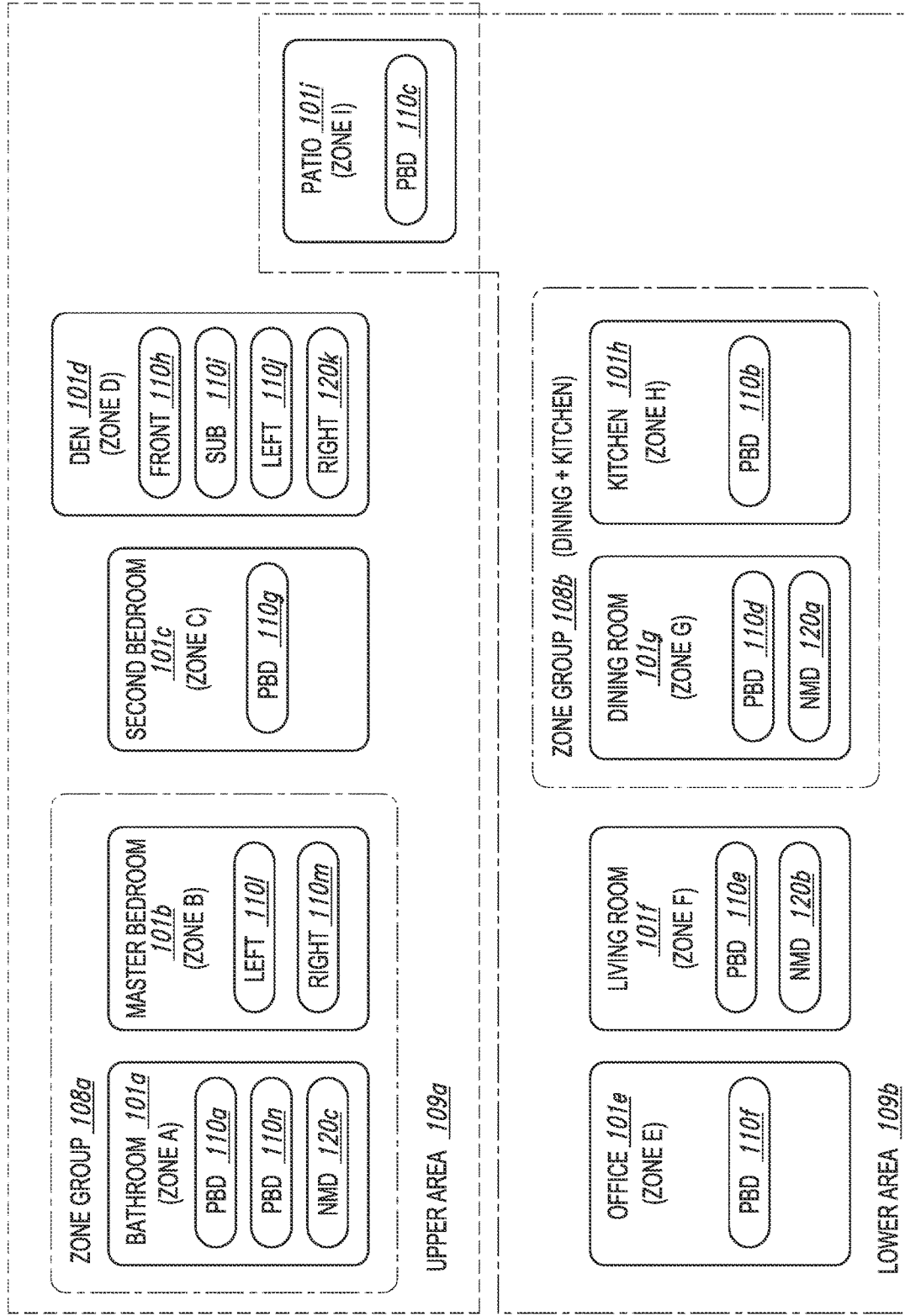
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
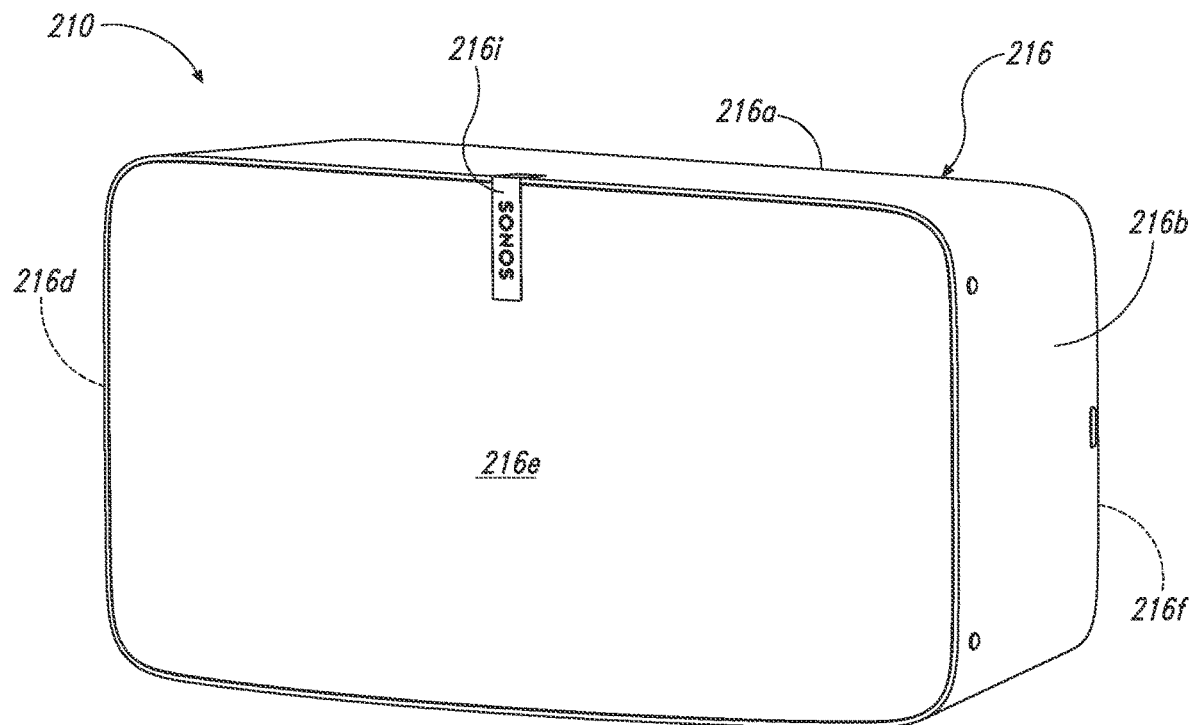
FIG. 2A shows a front isometric view of a playback device configured in accordance with aspects of the disclosed technology.
Figure 2B:
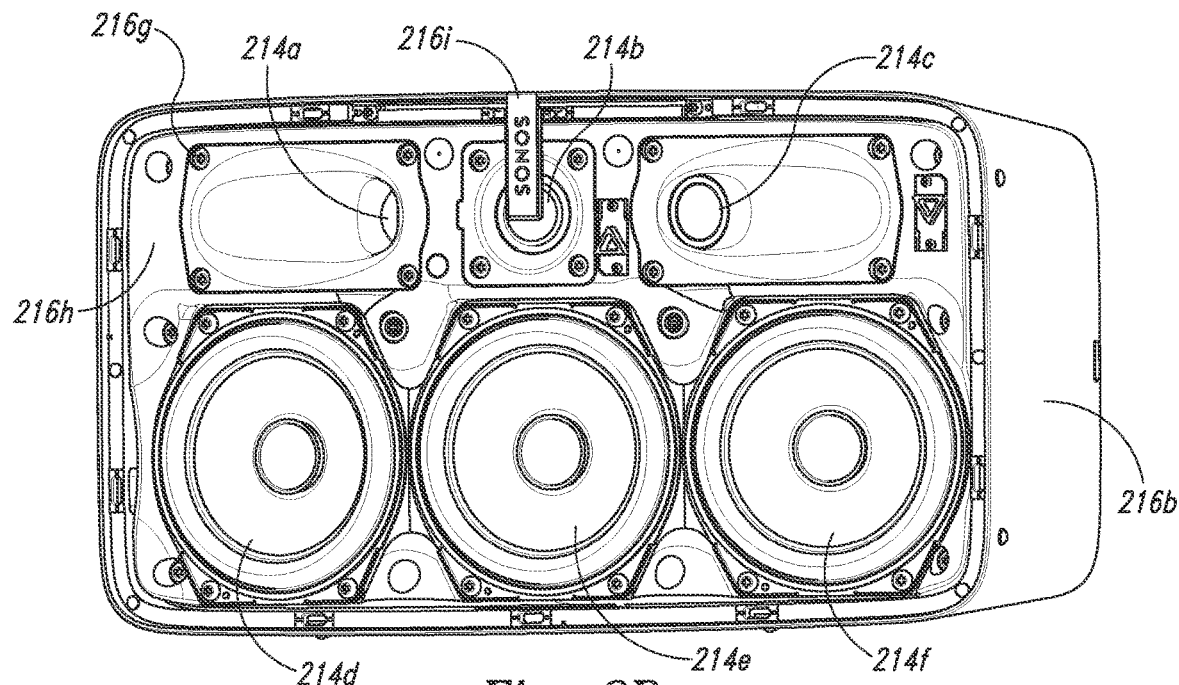
FIG. 2B shows a front isometric view of the playback device of FIG. 3A without a grille.
Figure 2C:
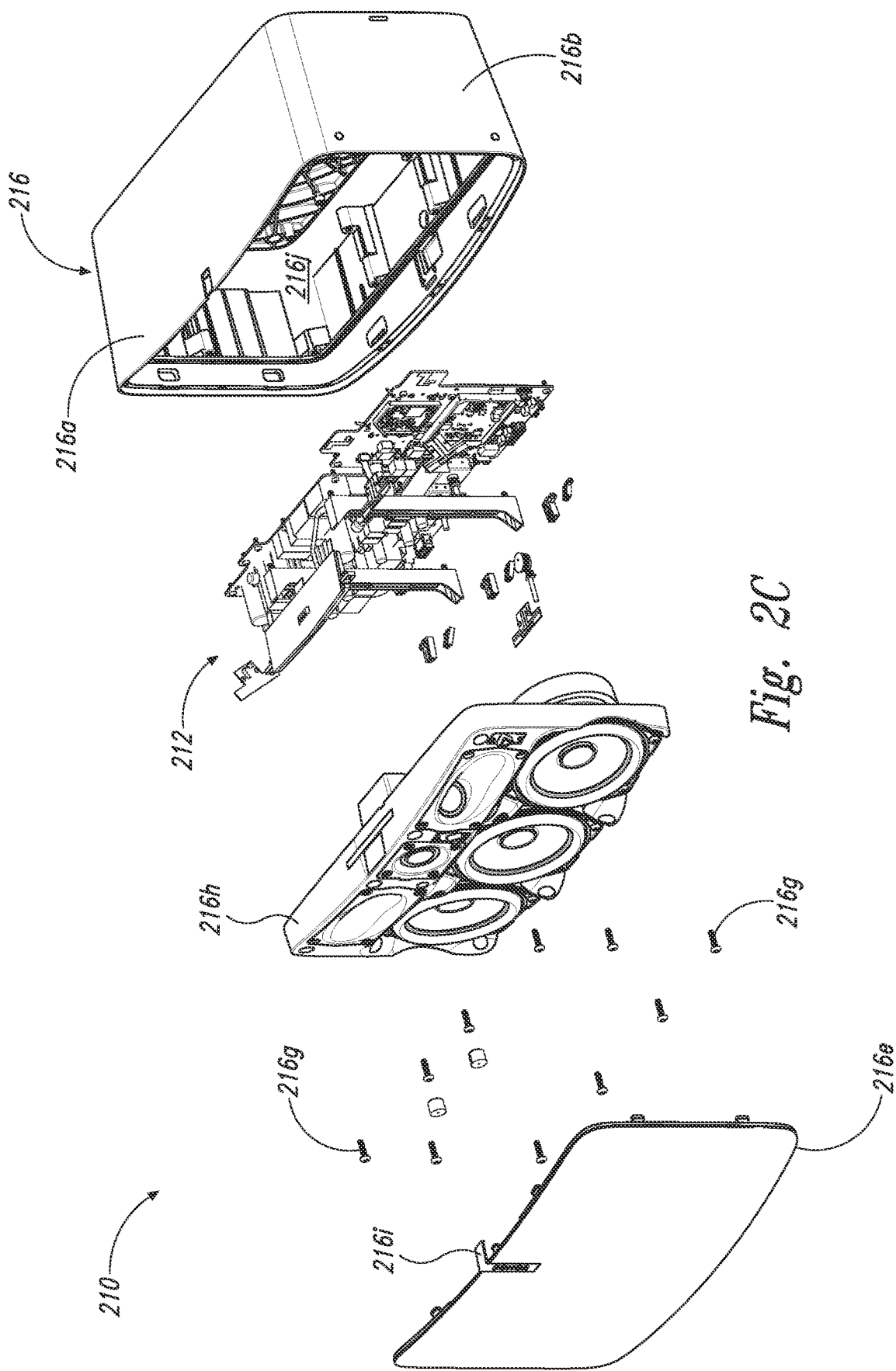
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
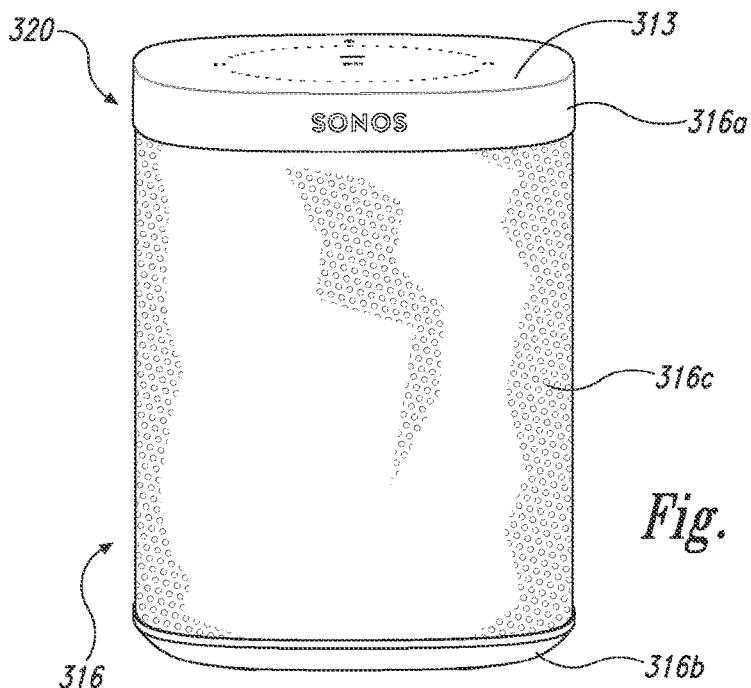
FIG. 3A shows a front view of a network microphone device configured in accordance with aspects of the disclosed technology.
Figure 3B:
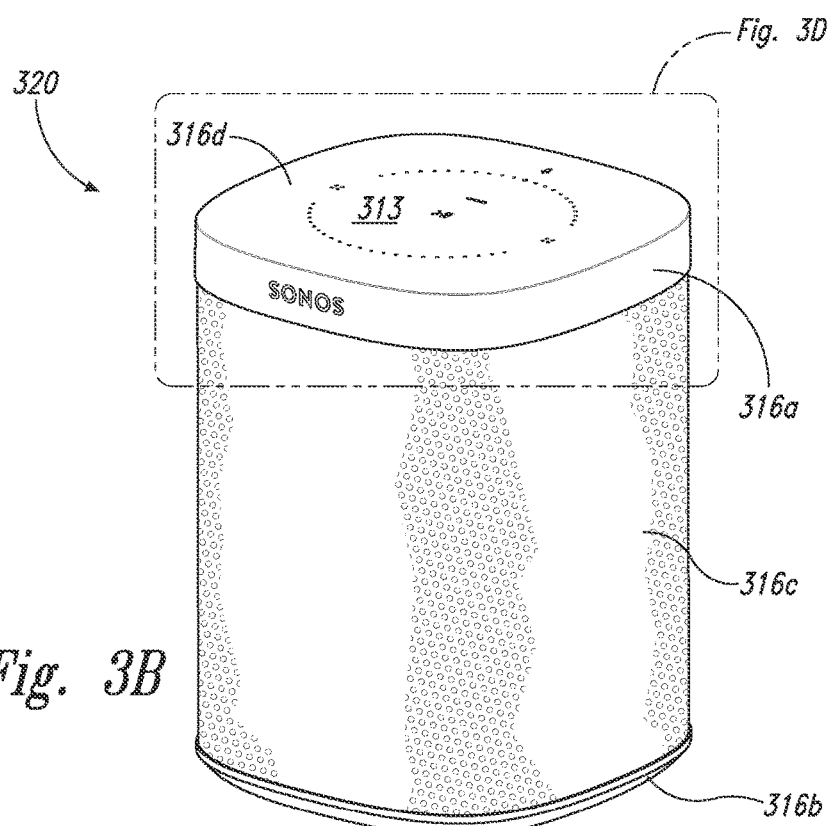
FIG. 3B shows a side isometric view of the network microphone device of FIG. 3A.
Figure 3C:
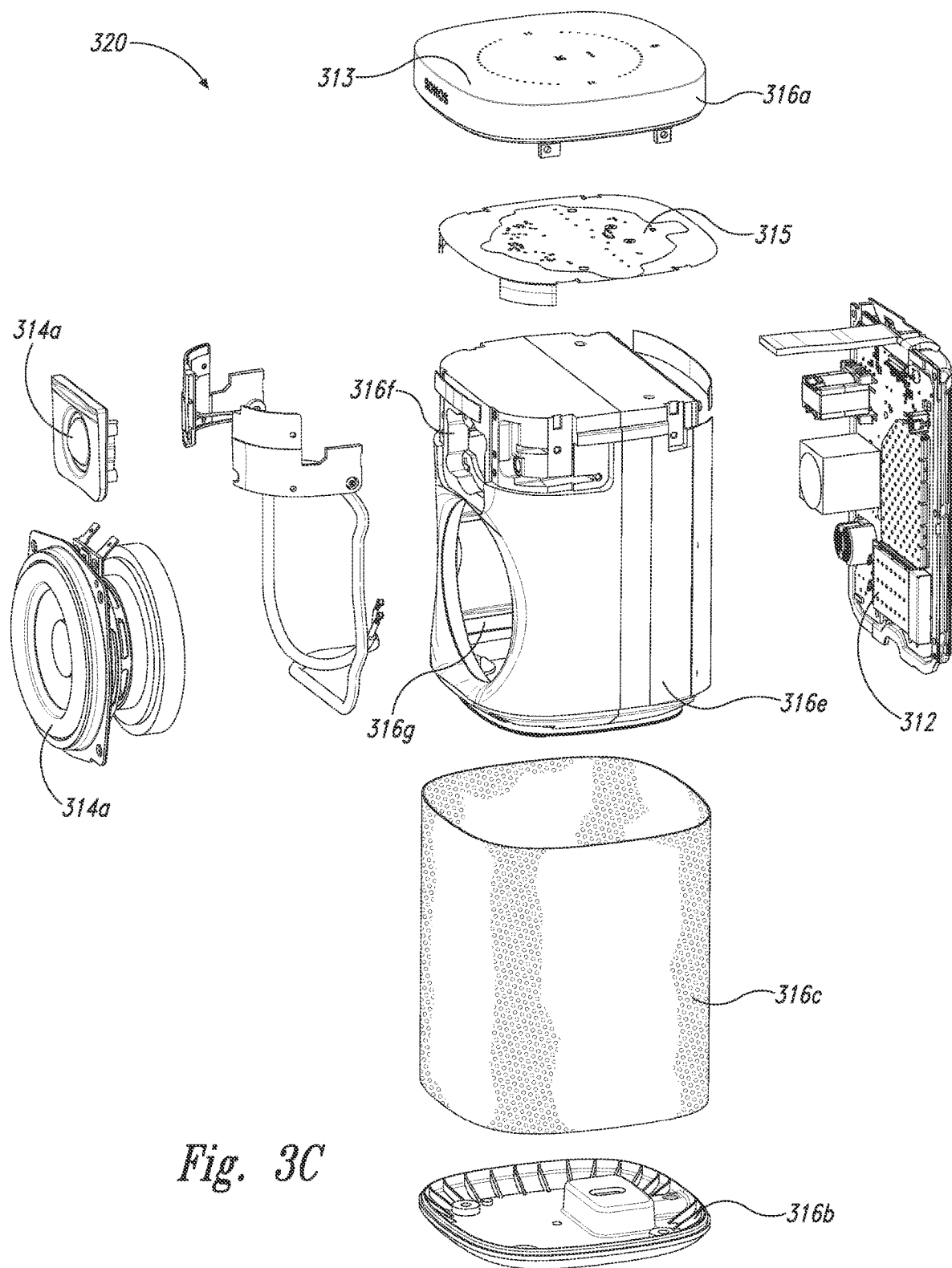
FIG. 3C shows an exploded view of the network microphone device of FIGS. 3A and 3B.
Figure 3D:
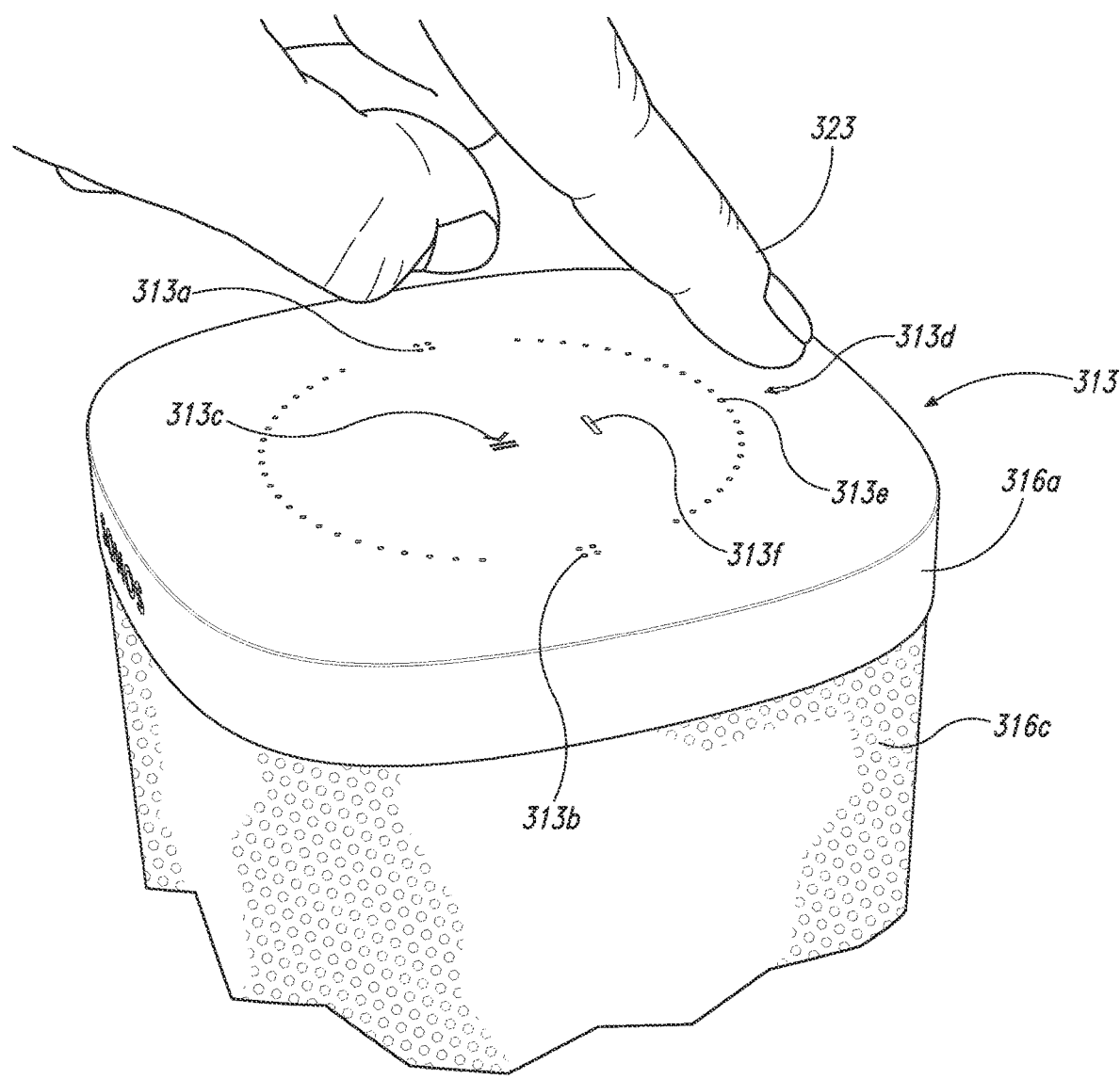
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10*m* or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
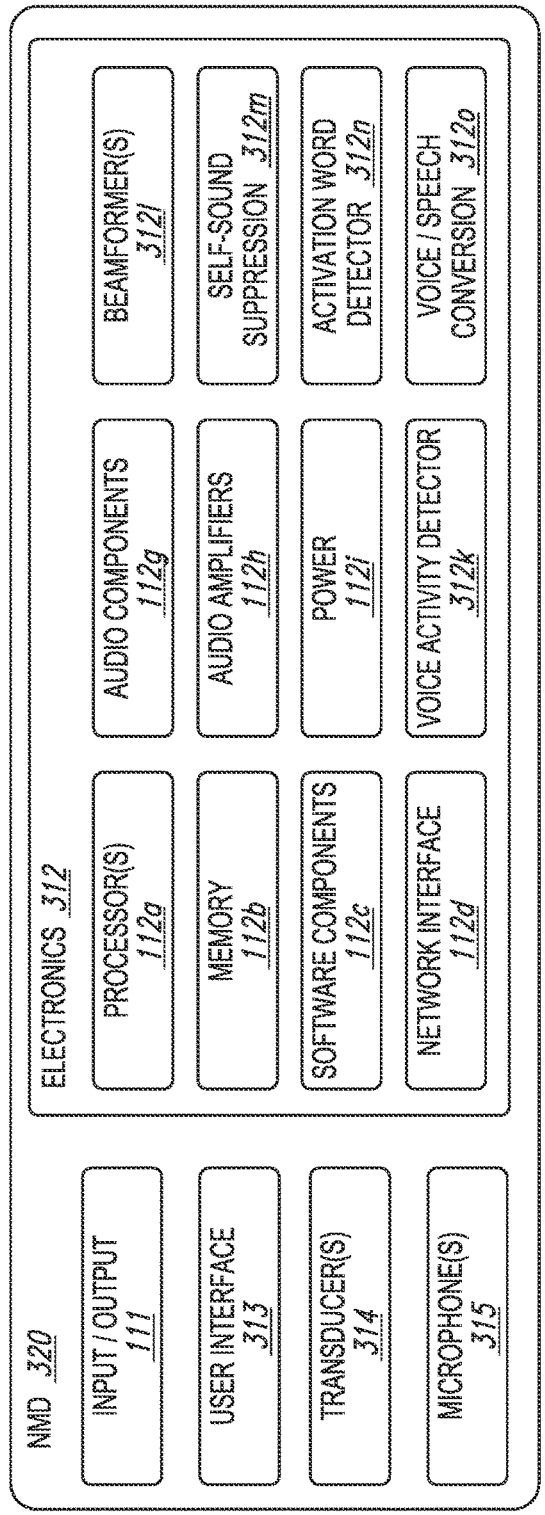
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
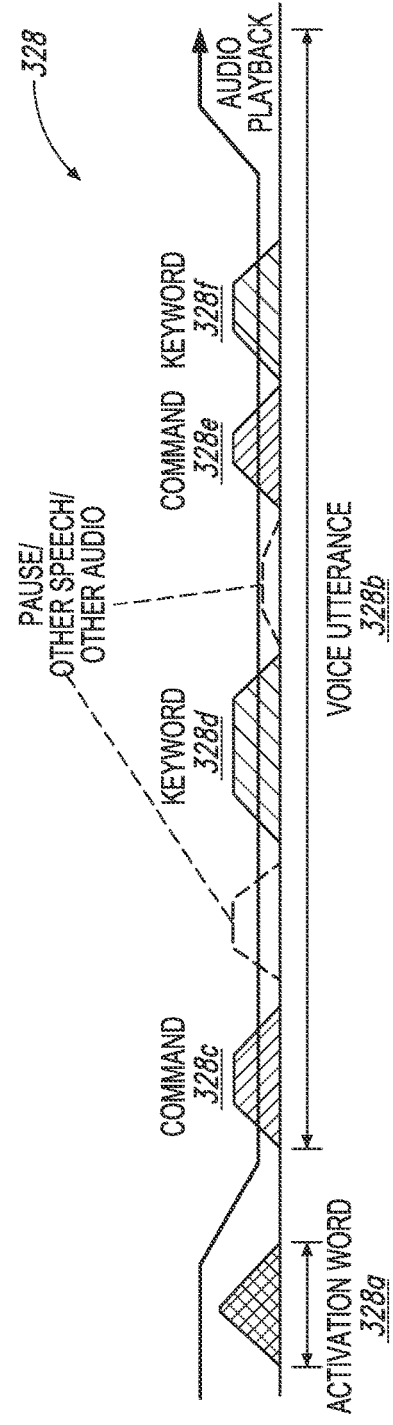
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternatively, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
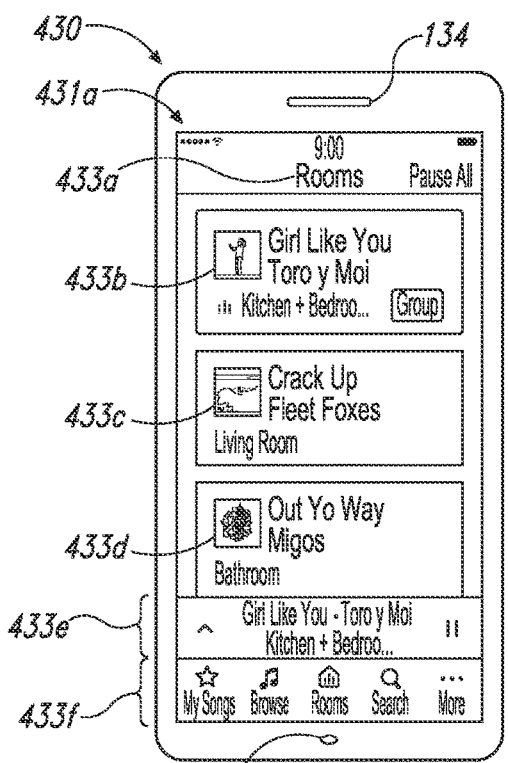
FIGS. 4A-4D show schematic diagrams of a control device in various stages of operation in accordance with aspects of the disclosed technology.
Figure 4B:
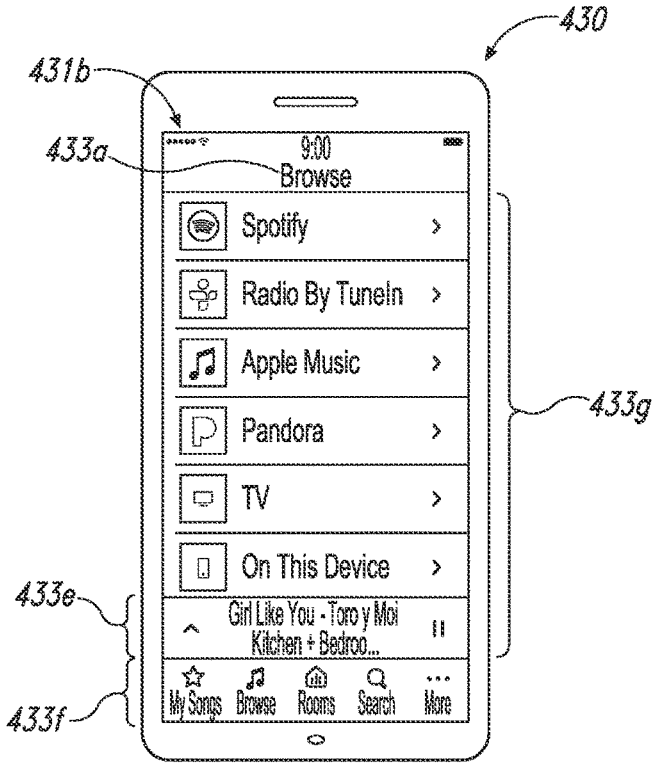
Figure 4C:
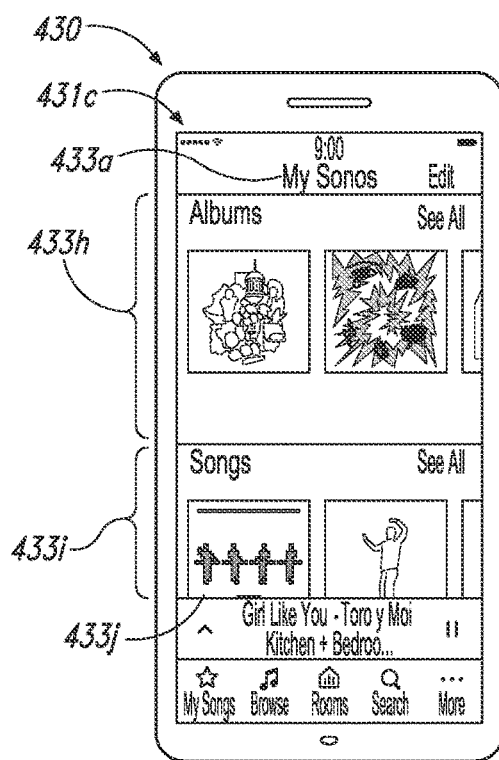
Figure 4D:
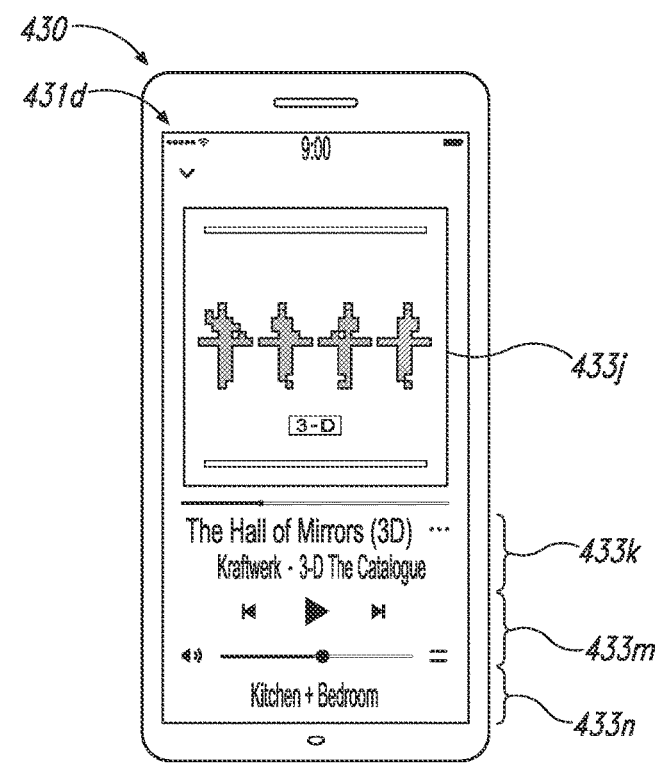

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
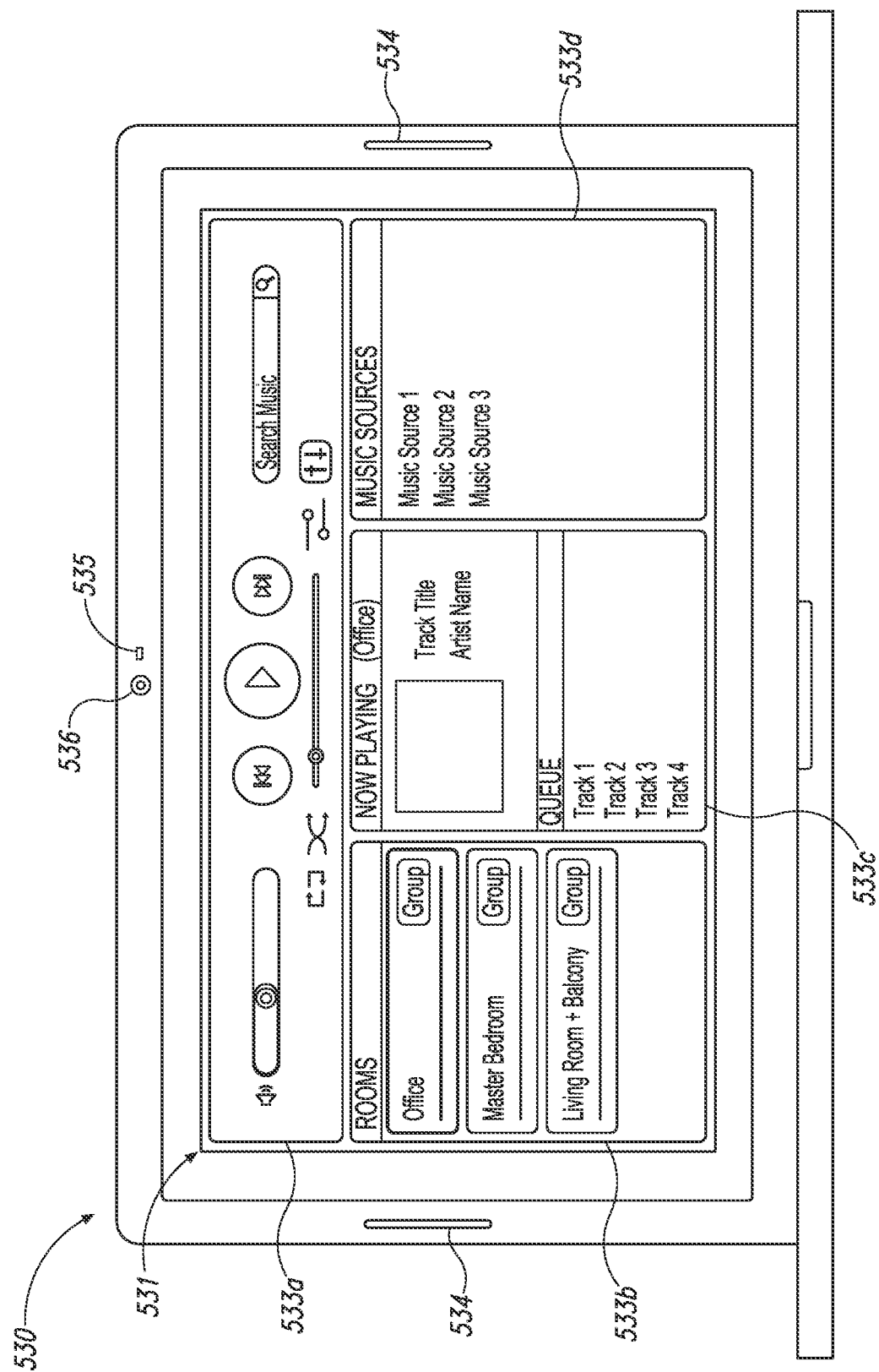
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
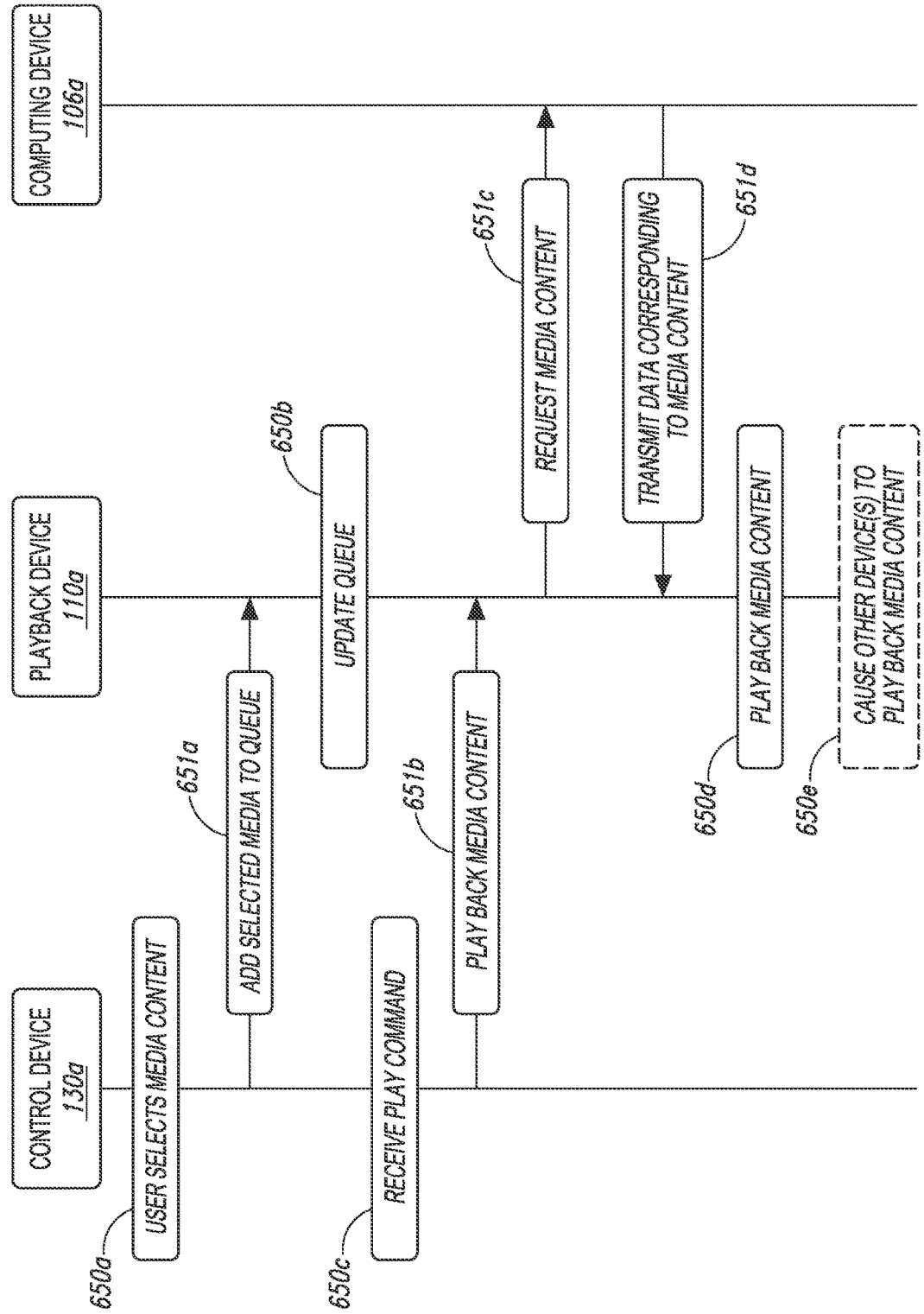
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned above, it is desirable for playback devices to play audio content from many different sources, e.g., audio streaming services, video streaming services, audio or video sources, voice assistant services (VASs) doorbells, intercoms, telephones, and other sources. Sometimes it is desirable to play audio content from multiple sources at the same time. For example, while playing music or playing audio associated with a television program or other video content, it may be desirable in some instances for a playback device to also play a doorbell chime or provide a voice (or other audio) response or confirmation.

For example, assume a scenario where (i) a user is watching a television program, movie, or other video content and (ii) a playback device is playing the audio content associated with that video content. While the playback device is playing the audio content associated with the video content, a visitor or delivery person activates the user's network-connected doorbell (e.g., a Nest Hello® or similar doorbell or intercom system). In response to activation of the doorbell, and while continuing to play the audio content associated with the video content, the playback device ducks (reduces the volume of) the audio content associated with the video content, and the playback device plays audio from the doorbell, thereby alerting the user to the doorbell activation. And for doorbell systems with two-way intercom or speech capability, a playback device with a microphone may additionally enable the user to talk to the visitor or delivery person via a bidirectional communication link between the microphone-equipped playback device and the doorbell while the playback device continues to play the audio content associated with the video content, albeit perhaps playing the audio content associated with the video content at the lower (or ducked) volume level.

Although a single conventional playback device may be able to play the second audio content (e.g., the audio associated with the doorbell/intercom) from the second audio source (e.g., the doorbell/intercom or computing device/system associated therewith) while still playing the first audio content (e.g., the audio associated with the video content) from the first audio source (e.g., the television or computing device/system associated with the television or providing the audio/video content for playback), technical problems arise when a set (or group) of two or more networked playback devices need to play the second audio (e.g., the audio associated with the doorbell/intercom) in synchrony with each other while the set of two or more networked playback devices are also playing the first audio (e.g., the audio associated with the video content) in synchrony with each other.

For example, playing multiple audio streams from multiple audio sources by multiple playback devices presents technical challenges in scenarios where, like some embodiments described herein, one or more of the multiple playback devices and/or audio sources are clocking at different clocking rates. This is especially true in systems where, like some embodiments described herein, (i) the multiple audio sources and playback devices are connected via an asynchronous data network (e.g., Ethernet, WiFi, or other asynchronous network) where packets of audio content transit the LAN or WAN with non-deterministic delays and/or (ii) the multiple audio sources and playback devices are not synchronized to a centralized, dedicated master clock that enables all of the devices to perform playback functions at precisely the same time under control of or otherwise synchronized to the time, phase, and/or frequency of the centralized, dedicated master clock.

The problem is further compounded when different playback devices in a group source different audio content from different audio sources for playback by the group in synchrony with each other. For example, if a first playback device tries to play first audio content that it sources and provides to a second playback device according to the first playback device's timing and also tries to play second audio content received from the second playback device according to the second playback device's timing, the first and second playback devices could create a timing reference loop where neither playback device would be able to reliably play either of the two separate audio content streams in synchrony. The problem is compounded further still with larger groups of playback devices and additional audio content sourced from additional audio sources.

The systems and methods disclosed and described herein overcome these and other technical problems that can arise when a group of playback devices obtains different audio content from different audio sources for playback by the playback devices in the group in synchrony at the same time.

One aspect of the disclosed technical solutions relates to how different playback devices sourcing audio content generate playback timing for their respective sourced audio content and then send that playback timing to the other playback devices of the group along with the audio content for playback in synchrony by the playback devices in the group.

Another aspect of the disclosed technical solutions relates to how playback devices in the group adjust playback timing received from a playback device based on clock timing information before playing the audio content in synchrony with the other playback devices in the group. In some embodiments, a first playback device adjusts playback timing received from a second playback device based on its own clock timing information and clock timing information received from another playback device, e.g., the second playback device or a third playback device.

Yet another aspect of the disclosed technical solutions is based on decoupling the generation of playback timing from the generation of clock timing to allow, for example, a playback device that sources audio content (i.e., the "sourcing" playback device) to generate playback timing for that audio content based on clock timing received from another playback device. A related aspect that flows from the decoupling of the generation of playback timing from the generation of clock timing is based on how playback devices can use playback timing and clock timing from different playback devices to play audio content in synchrony.

Yet another aspect of the disclosed technical solutions is based on enabling any playback device (or other device in the network) to provide clock timing for use by playback devices to generate playback timing and/or play audio content in synchrony based on playback timing. In some embodiments, any device in the network (e.g., a playback device or other computing device) can provide clock timing for a synchronous playback session, and the device in the network that provides clock timing can change over time.

These and other aspects of the technical solutions disclosed herein enable groups of playback devices to play audio content sourced from multiple playback devices in the group (and from any playback device in the group) in synchrony even when the playback devices and audio sources have different clock times and/or operate at slightly different clocking rates.

VI. Technical Features

In some embodiments, at least some aspects of the technical solutions derive from the technical structure and organization of the audio information, playback timing, and clock timing information that the playback devices use to play audio content from audio sources in synchrony with each other, including how different playback devices generate playback timing based on clock timing (local clock timing or remote clock timing) and play audio content based on playback timing (generated locally or remotely) and clock timing (generated locally or remotely).

Therefore, to aid in understanding certain aspects of the disclosed technical solutions, certain technical details of the audio information, playback timing, and clock timing information, as well as how playback devices generate and/or use playback timing and clock timing for playing audio content in different configurations, are described below. Except where noted, the technical details of the audio information, playback timing, and clock timing information described below are the same or at least substantially the same for the examples shown and described with reference to FIGS. 7, 8, 9, 10, 11A, 11B, 12 and 13.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices is sometimes referred to herein as the "sourcing" playback device. One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

In some embodiments, the "sourcing" playback device receives audio content from an audio source in digital form, e.g., as a stream of packets. In some embodiments, individual packets in the stream of packets have a sequence number or other identifier that specifies an ordering of the packets. Packets transmitted over a data packet network (e.g., Ethernet, WiFi, or other packet networks) may arrive out of order, so the sourcing playback device uses the sequence number or other identifier to reassemble the stream of packets in the correct order before performing further packet processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

In some embodiments, the sourcing playback device does not change the sequence number or identifier of the received packets during packet processing. In some embodiments, the sourcing playback device reorders at least a first set packets in a packet stream based on each packet's sequence identifier, extracts audio content from the received packets, reassembles a bitstream of audio content from the received packets, and then repacketizes the reassembled bitstream into a second set of packets, where packets in the second set of packets have sequence numbers that differ from the sequence numbers of the packets in the first set of packets. In some embodiments, individual packets in the second set of packets are a different length (i.e., shorter or longer) than individual packets in the first set of packets. In some embodiments, reassembling a bitstream from the incoming packets and then subsequently repacketizing the reassembled bitstream into a different set of packets facilitates uniform processing and/or transmission of audio content by the sourcing playback device and by other playback devices that receive the audio content from the sourcing playback device. However, for some delay-sensitive audio content, reassembly and repacketization may be undesirable, and therefore, in some embodiments, the sourcing playback device may not perform reassembly and repacketization for some (or all) audio content that it receives before playing the audio content and/or transmitting the audio content to other playback devices.

In some embodiments an audio source provides audio content in digital form to a sourcing playback device, e.g., via a digital line-in interface. In such embodiments, the sourcing playback device packetizes the digital audio into packets of audio content before transmitting the audio content to other playback devices. In some embodiments, individual packets of the audio content comprise a sequence number or other identifier so that, when other playback devices receive the audio content, those other playback devices will be able to reliably arrange the received packets in the correct order before performing further packet processing.

In some embodiments an audio source provides audio content in analog form to a sourcing playback device, e.g., via an analog line-in interface. In such embodiments, the sourcing playback device converts the received analog audio into digital audio and packetizes the digital audio into packets of audio content before transmitting the audio content to other playback devices. In some embodiments, individual packets of the audio content comprise a sequence number or other identifier so that, when other playback devices receive the audio content, those other playback devices will be able to reliably arrange the received packets in the correct order before performing further packet processing.

After obtaining audio content from an audio source or from another playback device, a playback device in some embodiments one or more of (i) plays the audio content individually, (ii) plays the content in synchrony with one or more additional playback devices, and/or (iii) transmits the audio content to one or more other playback devices.

b. Playback Timing

The playback devices disclosed and described herein use playback timing to play audio content in synchrony with each other. An individual playback device can generate playback timing and/or playback audio content according to playback timing, based on the playback device's configuration in the media playback network. The sourcing playback device that generates the playback timing for audio content also transmits that generated playback timing to all the playback devices that are configured to play the audio content. In some embodiments, the sourcing playback device transmits the playback timing to a multicast network address, and all the other playback devices configured to play the audio content receive the playback timing via that multicast address. In some embodiments, the sourcing playback device alternatively transmits the playback timing to each unicast network address of each other playback device configured to play the audio content, and each of the other playback devices configured to play the audio content receive the playback timing via its unicast address.

In operation, a playback device (or a computing device associated with the playback device) generates the playback timing for audio content based on clock timing (described below), which can be "local" clock timing (i.e., clock timing generated by the sourcing playback device) or "remote" clock timing received from a different playback device (or different computing device).

In some embodiments, the playback timing is generated for individual frames (or packets) of audio content. As described above, in some embodiments, the audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play audio content within that individual frame (or packet). In operation, when the playback timing for an individual frame (or packet) is generated, the playback timing for that individual frame (or packet) is a future time relative to a current clock time of a reference clock at the time that the playback timing for that individual frame (or packet) is generated. As described in more detail below, the reference clock can be a "local" clock at the playback device or a "remote" clock at a separate network device, e.g., another playback device, a computing device, or another network device configured to provide clock timing for use by playback devices to generate playback timing and/or playback audio content.

In operation, a playback device tasked with playing particular audio content will play the portion(s) of the particular audio content within an individual frame (or packet) at the playback time specified by the playback timing for that individual frame (or packet), as adjusted to accommodate for clocking differences between the sourcing playback device, the clock timing, and the playback device that is tasked with playing the audio content, as describe in more detail below.

c. Clock Timing

The playback devices disclosed and described herein use clock timing to generate playback timing for audio content and to play the audio content based on the generated playback timing. In some embodiments, the sourcing playback device uses clock timing from a reference clock (e.g., a device clock, a digital-to-audio converter clock, a playback time reference clock, or any other clock) to generate playback timing for audio content that the sourcing playback device receives from an audio source. For an individual playback device, the reference clock can be a "local" clock at the playback device or a "remote" clock at a separate network device, e.g., another playback device, a computing device, or another network device configured to provide clock timing for use by playback devices to generate playback timing and/or playback audio content.

In some embodiments, all of the playback devices tasked with playing particular audio content in synchrony use the same clock timing from the reference clock to play back that particular audio content. In some embodiments, playback devices use the same clock timing to play audio content that was used to generate the playback timing for the audio content.

In operation, the network device that generates the clock timing also transmits the clock timing to all the playback devices in the network that need to use the clock timing for generating playback timing and/or playing back audio content. In some embodiments, the network device that generates the clock timing transmits the clock timing to a multicast network address, and all the other playback devices configured to generate playback timing and/or play audio content receive the clock timing via that multicast address. In some embodiments, the network device alternatively transmits the clock timing to each unicast network address of each other playback device configured to play the audio content, and each of the other playback devices configured to play the audio content receive the clock timing via its unicast address.

d. Generating Playback Timing with Clock Timing from a Local Clock

In some embodiments, a sourcing playback device (i) generates playback timing for audio content based on clock timing from a local clock at the sourcing playback device, and (ii) transmits the generated playback timing to all other playback devices configured to play the audio content. In operation, when generating playback timing for an individual frame (or packet), the "sourcing" playback device adds a "timing advance" to the current clock time of the local clock of the sourcing playback device that the sourcing playback device is using for generating the playback timing.

In some embodiments, the "timing advance" is based on an amount of time that is greater than or equal to the sum of (i) the network transit time required for frames and/or packets comprising audio content transmitted from the sourcing playback device to arrive at all other playback devices that are configured to use the playback timing for playing the audio content in synchrony and (ii) the amount of time required for all the other playback devices configured to use that playback timing for synchronous playback to process received frames/packets from the sourcing playback device for playback.

In some embodiments, the sourcing playback device determines a timing advance by sending one or more test packets to one or more (or perhaps all) of the other playback devices configured to play the audio content that the sourcing device is transmitting, and then receiving test response packets back from those one or more of the other playback devices. In some embodiments, the sourcing playback device and the one or more other playback devices negotiate a timing advance via multiple test and response messages. In some embodiments with more than two additional playback devices, the sourcing playback device determines a timing advance by exchanging test and response messages with all of the playback devices, and then setting a timing advance that is sufficient for the playback device having the longest total of network transit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined. In other embodiments, the playback device that generates the playback timing can change the timing advance in response to a request from a receiving device indicating that a greater timing advance is required (e.g., because the receiving device is not receiving packets comprising portions of audio content until after other devices have already played the portions of audio content) or a shorter timing advance would be sufficient (e.g., because the receiving device is buffering more packets comprising portions of audio content than necessary to provide consistent, reliable playback).

As described in more detail below, all the playback devices configured to play the audio content in synchrony will use the playback timing and the clock timing to play the audio content in synchrony with each other.

e. Generating Playback Timing with Clock Timing from a Remote Clock

In some embodiments, a sourcing playback device generates playback timing for audio content based on clock timing from a remote clock at another network device, e.g., another playback device, another computing device (e.g., a smartphone, laptop, media server, or other computing device configurable to provide clock timing sufficient for use by a playback device generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the sourcing playback device generates playback timing for audio content based on clock timing from a remote cock, the playback timing for an individual frame (or packet) is based on (i) a "timing offset" between (a) a local clock at the sourcing playback device that the sourcing playback device uses for generating the playback timing and (b) the clock timing information from the remote reference clock, and (ii) a "timing advance" based on an amount of time that is greater than or equal to the sum of (a) the network transit time required for packets transmitted from the sourcing playback device to arrive at all other playback devices tasked with playing the audio content and (b) the amount of time required for all of those other playback devices to process frames and/or packets comprising audio content received from the sourcing playback device for playback.

For an individual frame (or packet) containing a portion(s) of the audio content, the sourcing playback device generates playback timing for that individual frame (or packet) by adding the sum of the "timing offset" and the "timing advance" to a current time of the local clock at the sourcing playback device that the sourcing playback device uses to generate the playback timing for the audio content. In operation, the "timing offset" may be a positive or a negative offset, depending on whether the local clock at the sourcing playback device is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the sourcing playback device that the sourcing playback device is using to generate the playback timing for the audio content, the sourcing playback device is, in effect, generating the playback timing relative to the remote clock.

In some embodiments, and as described above, the "timing advance" is based on an amount of time that is greater than or equal to the sum of (i) the network transit time required for frames and/or packets comprising audio content transmitted from the sourcing playback device to arrive at all other playback devices that are configured to use the playback timing for playing the audio content in synchrony and (ii) the amount of time required for all the other playback devices configured to use that playback timing for synchronous playback to process received frames/packets from the sourcing playback device for playback.

In some embodiments, the sourcing playback device determines a timing advance via signaling between the sourcing playback device and one or more other playback devices in the network, as described previously. Further, in some embodiments, the timing advance is less than about 50 milliseconds, less than about 20-30 milliseconds, or less than about 10 milliseconds, depending on the audio content playback latency requirements; different audio content may have different latency requirements. In some embodiments, the timing advance remains constant after being determined. And in some embodiments, the playback device that generates the playback timing can change the timing advance based on further signaling between the sourcing playback device (generating the playback timing) and one or more other playback devices in the network (that are using the playback timing to play audio content).

As described in more detail below, all the playback devices configured to play the audio content in synchrony will use the playback timing and the clock timing to play the audio content in synchrony with each other.

f. Playing Audio Content using Local Playback Timing and Local Clock Timing

In some embodiments, the sourcing playback device is configured to play audio content in synchrony with one or more other playback devices. And if the sourcing playback device is using clock timing from a local clock at the sourcing playback device to generate the playback timing, then the sourcing playback device will play the audio content using locally-generated playback timing and the locally-generated clock timing. In operation, the sourcing playback device plays an individual frame (or packet) comprising portions of the audio content when the local clock that the sourcing playback device used to generate the playback timing reaches the time specified in the playback timing for that individual frame (or packet).

For example, recall that when generating playback timing for an individual frame (or packet), the sourcing playback device adds a "timing advance" to the current clock time of the reference clock used for generating the playback timing. In this instance, the reference clock used for generating the playback timing is a local clock at the sourcing playback device. So, if the timing advance for an individual frame is, for example, 30 milliseconds, then the sourcing playback device plays the portion (e.g., a sample or set of samples) of audio content in an individual frame (or packet) 30 milliseconds after creating the playback timing for that individual frame (or packet).

In this manner, the sourcing playback device plays the audio content using locally-generated playback timing and clock timing from a local reference clock. As described further below, by playing the portion(s) of the audio content of an individual frame and/or packet when the clock time of the local reference clock reaches the playback timing for that individual frame or packet, the sourcing playback device plays that portion(s) of the audio content in that individual frame and/or packet in synchrony with other playback devices.

g. Playing Audio Content using Local Playback Timing and Remote Clock Timing

As mentioned earlier, in some embodiments, a sourcing playback device generates playback timing for audio content based on clock timing from a remote clock, i.e., a clock at another network device, e.g., another playback device, or another computing device (e.g., a smartphone, laptop, media server, or other computing device configurable to provide clock timing sufficient for use by a playback device generate playback timing and/or playback audio content). Because the sourcing device used clock timing from the remote clock to generate the playback timing for the audio content, the sourcing playback device also uses the clock timing from the remote clock to play the audio content. In this manner, the sourcing playback device plays audio content using the locally-generated playback timing and the clock timing from the remote clock.

Recall that, in embodiments where the sourcing playback device generates playback timing for audio content based on clock timing from a remote clock, the sourcing playback device generates the playback timing for an individual frame (or packet) based on (i) a "timing offset" based on a difference between (a) a local clock at the sourcing playback device and (b) the clock timing information from the remote clock, and (ii) a "timing advance" comprising an amount of time that is greater than or equal to the sum of (a) the network transit time required for frames/packets transmitted from the sourcing playback device to arrive at all other playback devices tasked with playing the audio content and (b) the amount of time required for all of those other playback devices to process frames and/or packets comprising audio content received from the sourcing playback device for playback. And further recall that the sourcing playback device transmits the generated playback timing to all of those other playback devices tasked with playing the audio content in synchrony.

In this scenario, to play an individual frame (or packet) of audio content in synchrony with the one or more other playback devices, the sourcing playback device subtracts the "timing offset" from the playback timing for that individual frame (or packet) to generate a "local" playback time for playing the audio content within that individual frame (or packet). After generating the "local" playback time for playing the portion(s) of the audio content within the individual frame (or packet), the sourcing playback device plays the portion(s) of the audio content in the individual frame (or packet) when the local clock (at the sourcing playback device) that the sourcing playback device is using to play the audio content (which is the same local clock that the sourcing playback device used to generate the playback timing) reaches the "local" playback time for that individual frame (or packet). By subtracting the "timing offset" from the playback timing to generate the "local" playback time for an individual frame, the sourcing playback device effectively plays the portion(s) of audio content in that frame/packet with reference to the clock timing from the remote clock.

h. Playing Audio Content using Remote Playback Timing and Local Clock Timing

Recall that, in some embodiments, the sourcing playback device transmits the audio content and the playback timing for the audio content to one or more other playback devices. If the playback device that receives the audio content (the receiving playback device) and playback timing from the sourcing playback device is the same playback device that provided clock timing information to the sourcing playback device that the sourcing playback used for generating the playback timing, then the receiving playback device in this instance plays audio content using playback timing received from the sourcing playback device (i.e., remote playback timing) and clock timing from a clock at the receiving playback device (i.e., local clock timing). Because the sourcing device used clock timing from a clock at the receiving playback device to generate the playback timing for the audio content, the receiving playback device also uses the clock timing from its local clock to play the audio content. In this manner, the receiving playback device plays audio content using the remote playback timing and the clock timing from its local clock.

To play an individual frame (or packet) of the audio content in synchrony with the sourcing playback device (and every other playback device that receives the playback timing from the sourcing playback device and clock timing from the receiving playback device), the receiving playback device (i) receives the frames (or packets) comprising the portions of the audio content from the sourcing playback device, (ii) receives the playback timing for the audio content from the sourcing playback device (e.g., in the frame and/or packet headers of the frames and/or packets comprising the portions of the audio content or perhaps separately from the frames and/or packets comprising the portions of the audio content), and (iii) plays the portion(s) of the audio content in the individual frame (or packet) when the local clock that the receiving playback device used to generate the clock timing reaches the playback time specified in the playback timing for that individual frame (or packet) received from the sourcing playback device. Because the sourcing playback device uses the "timing offset" (which is the difference between the clock timing at the receiving device and the clock timing at the sourcing playback device in this scenario) when generating the playback timing, and because this "timing offset" timing already accounts for differences between timing at the sourcing playback device and the receiving playback device, the receiving device in this scenario plays individual frames (or packets) comprising portions of the audio content when the receiving playback device's local clock (that was used to generated the clock timing) reaches the playback time for an individual frame (or packet) specified in the playback timing for that individual frame (or packet).

Because the receiving playback device plays frames (or packets) comprising portions of the audio content according to the playback timing, and because the sourcing playback device plays the same frames (or packets) comprising portions of the audio content according to the playback timing and the determined "timing offset," the receiving playback device and the sourcing playback device play the same frames (or packets) comprising the same portions of the audio content in synchrony, i.e., at the same time or at substantially the same time.

i. Playing Audio Content using Remote Playback Timing and Remote Clock Timing

Recall that, in some embodiments, the sourcing playback device transmits the audio content and the playback timing for the audio content to one or more other playback devices. And further recall that, in some embodiments, the network device providing the clock timing can be a different device than the sourcing playback device. Playback devices that receive the audio content, the playback timing, and the clock timing from another playback device are configured to playback the audio content using the playback timing from the sourcing playback device (i.e., remote playback timing) and clock timing from a clock at another playback device (i.e., remote clock timing). In this manner, the receiving playback device in this instance plays audio content using remote playback timing and remote clock timing.

To play an individual frame (or packet) of the audio content in synchrony with every other playback device tasked with playing the audio content, the receiving playback device (i) receives the frames (or packets) comprising the portions of the audio content from the sourcing playback device, (ii) receives the playback timing for the audio content from the sourcing playback device (e.g., in the frame and/or packet headers of the frames and/or packets comprising the portions of the audio content or perhaps separately from the frames and/or packets comprising the portions of the audio content), (iii) receives the clock timing from another network device, e.g., another playback device, a computing device, or another network device configured to provide clock timing for use by playback devices to generate playback timing and/or playback audio content, and (iv) plays the portion(s) of the audio content in the individual frame (or packet) when the local clock that the receiving playback device uses for audio content playback reaches the playback time specified in the playback timing for that individual frame (or packet) received from the sourcing playback device, as adjusted by a "timing offset."

In operation, after the receiving playback device receives clock timing from the other network device, the receiving device determines a "timing offset" for the receiving playback device. This "timing offset" comprises (or at least corresponds to) a difference between the "reference" clock at the network device that the network device used to generate the clock timing and a "local" clock at the receiving playback device that the receiving playback device uses to play the audio content. In operation, each playback device that receives the clock timing from another network device calculates its own "timing offset" based on the difference between its local clock and the clock timing, and thus, the "timing offset" that each playback determines is specific to that particular playback device.

In some embodiments, when playing back the audio content, the receiving playback device generates new playback timing (specific to the receiving playback device) for individual frames (or packets) of audio content by adding the previously determined "timing offset" to the playback timing for each frame (or packet) received from the sourcing playback device. With this approach, the receiving playback device converts the playback timing for the audio content received from the sourcing playback device into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the sourcing playback generated the playback timing for those frames (or packets) relative to the clock timing and plays the same frames (or packets) comprising portions of the audio content according to the playback timing and its determined "timing offset," the receiving playback device and the sourcing playback device play the same frames (or packets) comprising the same portions of the audio content in synchrony, i.e., at the same time or at substantially the same time.

VII. Example Embodiments

The example embodiments described below illustrate how playback devices in various networking scenarios generate playback timing based on local and/or remote clock timing and playback audio based on local and/or remote playback timing and local and/or remote clock timing in scenarios where multiple playback devices source and play back audio content from multiple audio sources.

A. Two Playback Devices Playing Content Sourced by One Playback Device from Two Different Audio Sources FIG. 7 shows an example configuration 700 of two playback devices playing audio content from multiple sources according to some embodiments.

Figure 7:
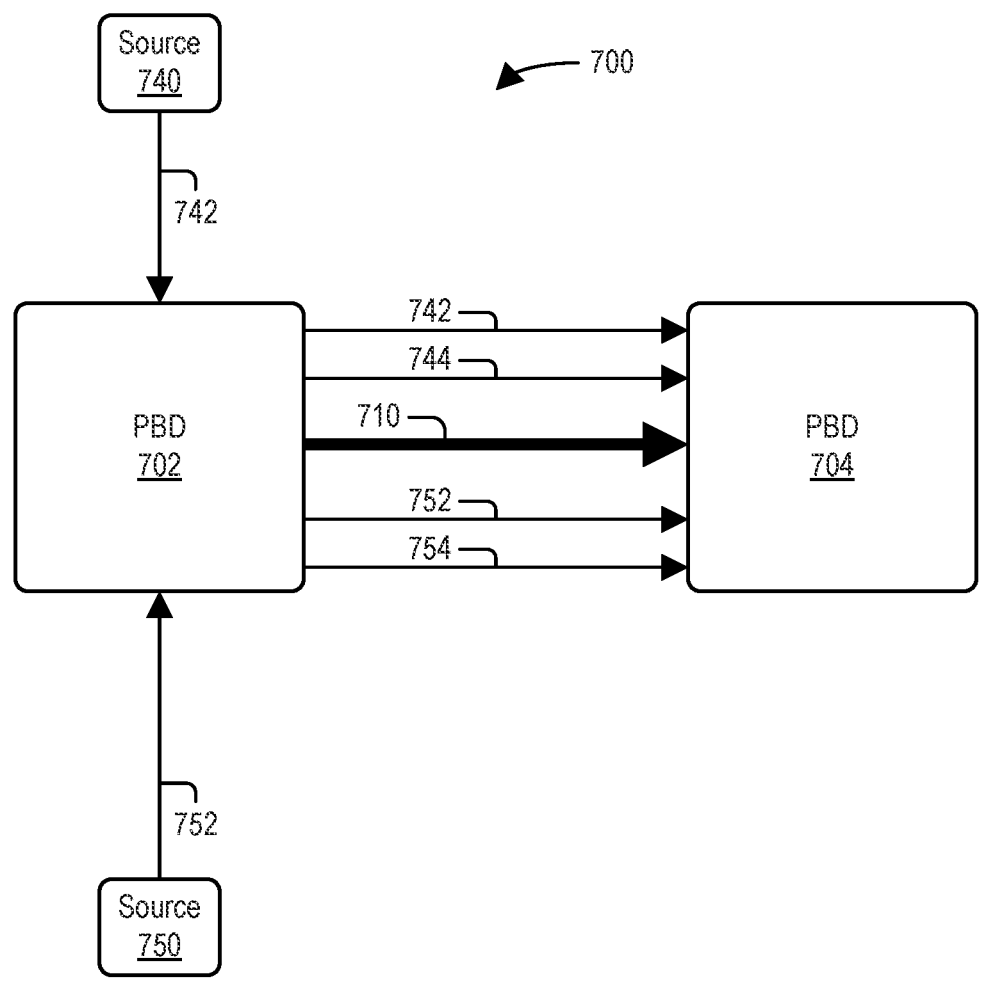
FIG. 7 shows an example configuration of two playback devices playing audio content from multiple sources according to some embodiments.

Configuration 700 in FIG. 7 includes a first playback device 702, a second playback device 704, a first audio source 740 and a second audio source 750. The arrows shown in configuration 700 indicate signal flow for timing information and media content.

Playback devices 702 and 704 are the same as or similar to the playback devices shown and described herein. In some embodiments, one or both of playback devices 702 and 704 are or comprise a networked microphone device.

In some embodiments, the first playback device 702 and the second playback device 704 are configured in a synchrony group, where the first playback device 702 and the second playback device 704 play the same audio content in synchrony with each other, as described earlier. In some embodiments, the first playback device 702 and the second playback device 704 are configured as a stereo pair, where the first playback device 702 is configured to play a left channel of stereo audio content and the second playback device 704 is configured to play a right channel of the stereo audio content (or vice versa), as described earlier. And in further embodiments, the first playback device 702 and the second playback device 704 are configured as a bonded pair, where the first playback device 702 plays a first set of frequency components of audio content, while the second playback device 704 plays a second set of frequency components of the audio content. And in still further embodiments, the first playback device 702 and the second playback device 704 are configured in other grouped arrangements now known or later developed, where the first playback device 702 and the second playback 706 play different channels and/or sets of frequency components of the same audio content in synchrony. In some embodiments, the first playback device 702 and the second playback device 704 need not be grouped in any particular manner (e.g., a synchrony group, stereo pair, bonded pair, consolidated device, etc.) to play audio content in synchrony with each other. Rather, in some embodiments, even if the first playback device 702 and the second playback device 704 are not in a grouped configuration, but instead are just communicatively coupled to each other via a network (e.g., in the same home), the first playback device 702 and the second playback device 704 can play audio content in synchrony with each other according to shared playback timing and clock timing as described herein.

The first audio source 740 and the second audio source 750 are the same as or similar to any of the audio sources disclosed and described herein. Example configuration 700 shows the first playback device 702 obtaining first audio content 742 from the first audio source 740 via one or both of a LAN and/or a WAN.

In example configuration 700, the first playback device 702 is the "sourcing" playback device for the first audio content 742. In operation, the first playback device 702 receives the first audio content 742 from the first audio source 740 and generates first playback timing 744 for the first audio content 742.

In example configuration 700, the first playback device 702 uses its own clock timing 710 (i.e., clock timing of a clock of the first playback device 702) to generate the first playback timing 744 for the first audio content 742. Thus, for the first audio content 742, the first playback device 702 generates playback timing based on local clock timing 710.

In some embodiments, the first playback device 702 generates the first playback timing 744 for the first audio content 742 by adding a "timing advance" to a current clock time of the local reference clock that the first playback device 702 uses for generating the first playback timing 744 for the first audio content 742. As described above, the playback timing for a frame or packet corresponds to a future time, relative to a reference clock time, that the audio content in the frame (or packet) is to be played.

In some embodiments, the timing advance that the first playback device 702 adds to its own clock timing 710 to generate a future time for the first playback timing 744 is based on an amount of time that is greater than or equal to the sum of (i) the network transit time required for packets transmitted from the first playback device 702 to arrive at the second playback device 704 and (ii) the amount of time required for the second playback device 704 to process received packets for playback.

In some embodiments, the first playback device 702 determines the timing advance by sending one or more test packets to the second playback device 704 and receiving test response packets back from the second playback device 704 in response to the test packets. In some embodiments, the first playback device 702 and the second playback device 704 can negotiate a timing advance via one or more test and response messages. In some embodiments with more than two playback devices, the first playback device 702 determines the timing advance by exchanging test and response messages with one or more (or all) of the playback devices, and then setting a timing advance that is sufficient for the playback device having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined. In other embodiments, the playback device that generates the playback timing can change the timing advance in response to a request from a receiving playback device indicating that a greater timing advance is required (e.g., because the receiving playback device is not receiving packets comprising portions of audio content until after other devices have already played the portions of audio content) or a shorter timing advance would be sufficient (e.g., because the receiving device is buffering more packets comprising portions of audio content than necessary to provide consistent, reliable playback).

After determining the first playback timing 744 for a packet, frame, and/or sample of the first audio content 742, the first playback device 702 transmits the first audio content 742 and the first playback timing 744 for the first audio content 742 to the second playback device 704 via the LAN and/or WAN. Because in example configuration 700, the first playback device 702 uses its own local clock timing to generate the first playback timing 744 for the first audio content 742, the first playback device 702 also transmits its clock timing 710 to the second playback device 704.

The second playback device 704 uses the clock timing 710 of the first playback device 702 and the second playback device's 704 own clock timing to generate a "timing offset." Because for the first audio content 742, the second playback device 704 uses the first playback timing 744 and the clock timing 710 from the first playback device 702 to play the first audio content 742, the second playback device 704 in this instance uses remote playback timing and remote clock timing to play the first audio content 742.

In some embodiments, one or more (or all) of the following steps occur in connection with the second playback device 704 generating the "timing offset" based the clock timing 710 of the first playback device 702 and the second playback device's 704 own clock timing.

First, the first playback device 702 generates an indication (e.g., a timestamp) at time, t, and transmits that clock timing 710 to the second playback device 704. Next, when the second playback device 704 receives the clock timing 710 from the first playback device 702, the second playback device 704 determines the difference between a local clock at the second playback device 704 and the time, t, indicated in the clock timing 710.

The second playback device 704 uses this determined "timing offset" to play back audio content in synchrony with the first playback device 702. And as described in more detail with reference to FIG. 8, the second playback device 704 can also use this determined "timing offset" to generate playback timing for audio that the second playback device 704 sources for playback in synchrony with the first playback device 702.

In some embodiments, the first playback device 702 transmits the clock timing 710 to the second playback device 704 at least once at the start of a synchronous playback session. In some embodiments, because clocks at the first playback device 702 and the second playback device 704 are susceptible to clock drift (e.g., frequency and/or phase drift), the first playback device 702 transmits the clock timing 710 to the second playback device 704 periodically or at least more than a few times during the course of a synchronous playback session. For example, the first playback device 702 may transmit the clock timing 710 to the second playback device 704 every few milliseconds, every few tens of milliseconds, every few hundreds of milliseconds, every few seconds, and so on.

After transmitting at least some frames (or packets) comprising at least portions of the first audio content 742, the first playback timing 744, and the clock timing 710 to the second playback device 704, the first playback device 702 and the second playback device 704 perform the following functions to play back the first audio content 742 in synchrony with each other.

The first playback device 702 plays an individual frame (or packet) comprising portions of the first audio content 742 when the local clock at the first playback device 702 that was used for generating the first playback timing 744 reaches the time specified in the first playback timing 744 for that individual frame (or packet). For example, recall that when generating playback timing for an individual frame (or packet), the "sourcing" playback device (i.e., the first playback device 702 in FIG. 7) adds a "timing advance" to the current clock time of the local reference clock used for generating the playback timing. So, if the timing advance for an individual frame is, for example, 30 milliseconds, then the first playback device 702 ultimately plays the portion (e.g., a sample or set of samples) of audio content in an individual frame (or packet) 30 milliseconds after creating the playback timing for that individual frame (or packet).

And the second playback device 704 plays the audio content in each frame (or packet) when the current time of a local clock (at the second playback device 704) that the second playback device 704 is using to play the first audio content 742 reaches the first playback timing 744 for that frame (or packet), taking into account the previously-determined "timing offset."

Recall that the second playback device 704 calculates (or otherwise determines) a "timing offset" that corresponds to a difference between the "reference" clock at the first playback device 702 that the first playback device 702 used to generate the clock timing 710 (and the first playback timing 744) and the "local" clock at the second playback device 704 that the second playback device 704 uses to play the first audio content 742. The second playback device 704 uses this timing offset when playing back the first audio content 742.

In particular, the second playback device 704 generates new playback timing (specific to the second playback device 704) for individual frames (or packets) of audio content by adding the previously determined "timing offset" to the playback time of each frame (or packet) received from the first playback device 702. With this approach, the second playback device 704 converts the first playback timing 744 for the first audio content 742 received from the first playback device 702 into "local" playback timing for the second playback device 704. And when the "local" clock that the second playback device 704 is using for playing back the first audio content 742 reaches the determined "local" playback time for an individual frame (or packet), the second playback device 704 plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the first playback device 702 plays frames (or packets) comprising portions of the first audio content 742 according to the first playback timing 744, and because the second playback device 704 also plays the same frames (or packets) comprising portions of the first audio content 742 according to the first playback timing 744 and the timing offset, the first playback device 702 and the second playback device 704 play the same frames (or packets) comprising the same portions of the first audio content 742 in synchrony, or at the same time or least substantially the same time.

While playing the first audio content 742 in synchrony with each other, the first playback device 702 and the second playback device 704 can also play second audio content 752 from the second audio source 750 in synchrony with each other.

In example configuration 700, the first playback device 702 "sources" both the first audio content 742 and the second audio content 752 from the first audio source 740 and the second audio source 750, respectively. While transmitting the first audio content 742, the first playback timing 744, and the clock timing 710 to the second playback device 704, the first playback device 702 also (i) receives the second audio content 752 from the second audio content source 750, (ii) processes the received second audio content 752 in same manner that the first playback device 702 processes the first audio content 742, (iii) uses the clock timing 710 to generate second playback timing 754 for the second audio content 752 in the same manner that the first playback device 702 uses the clock timing 710 to generate the first playback timing 744 for the first audio content 742, and (iv) transmits the second audio content 752 and the second playback timing 754 for the second audio content 752 to the second playback device 704 in the same manner that the first playback device 702 transmits the first audio content 742 and first playback timing 744 to the second playback device 704.

After transmitting at least some frames (or packets) comprising at least portions of the second audio content 752, the second playback timing 754, and the clock timing 710 to the second playback device 704, the first playback device 702 and the second playback device 704 perform the following functions to play back the second audio content 752 in synchrony with each other.

The first playback device 702 plays an individual frame (or packet) comprising portions of the second audio content 752 when the local clock at the first playback device 702 that was used for generating the second playback timing 754 reaches the time specified in the second playback timing 754 for that individual frame (or packet). For example, recall that when generating playback timing for an individual frame (or packet), the "sourcing" playback device (i.e., the first playback device 702 in FIG. 7) adds a "timing advance" to the current clock time of the local reference clock used for generating the playback timing. So, if the timing advance for an individual frame is, for example, 30 milliseconds, then the first playback device 702 ultimately plays the portion (e.g., a sample or set of samples) of audio content in an individual frame (or packet) 30 milliseconds after creating the playback timing for that individual frame (or packet). In some embodiments, the first playback device 702 uses the same "timing advance" to generate the second playback timing 754 that the first playback device 702 uses to generate the first playback timing 744. But in other embodiments, the "timing advance" used for the second playback timing 754 may be greater or less than the "timing advance" used for the first playback timing 744, for example, if the first audio content 742 has different latency requirements than the second audio content 752. This may occur in scenarios where, for example, the first audio content 742 comprises audio content associated video content (e.g., surround sound content) that has a low latency requirement so as to remain synchronized with the video content whereas the second audio content 752 comprises voice response audio from a voice assistant service (VAS), which may have a less stringent latency requirement than the first audio content 742 associated with the video content.

And the second playback device 704 plays the second audio content in each frame (or packet) when the current time of a local clock (at the second playback device 704) that the second playback device 704 is using to play the second audio content 752 reaches the second playback timing 754 for that frame (or packet), taking into account the previously-determined "timing offset."

Recall that the second playback device 704 calculates (or otherwise determines) a "timing offset" that corresponds to a difference between the "reference" clock at the first playback device 702 that the first playback device 702 used to generate the clock timing 710 (and the first playback timing 744) and the "local" clock at the second playback device 704 that the second playback device 704 uses to play the first audio content 742. The second playback device 704 uses this same timing offset when playing back the second audio content 752.

In particular, the second playback device 704 generates new playback timing (specific to the second playback device 704) for individual frames (or packets) of audio content by adding the previously determined "timing offset" to the playback time of each frame (or packet) received from the first playback device 702. With this approach, the second playback device 704 converts the second playback timing 754 for the second audio content 752 received from the first playback device 702 into "local" playback timing (for the second audio content 752) for the second playback device 704. And when the "local" clock that the second playback device 704 is using for playing back the second audio content 752 (which is the same local clock that the second playback device 704 uses for playing the first audio content 742) reaches the determined "local" playback time for an individual frame (or packet), the second playback device 704 plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the first playback device 702 plays frames (or packets) comprising portions of the second audio content 752 according to the second playback timing 754, and because the second playback device 704 also plays the same frames (or packets) comprising portions of the second audio content 752 according to the second playback timing 754 and the timing offset, the first playback device 702 and the second playback device 704 play the same frames (or packets) comprising the same portions of the second audio content 752 in synchrony, or at the same time or least substantially the same time.

In some embodiments, the first playback device 702 comprises an audio mixer component (in software, hardware, firmware, or some combination of one or more of software, hardware, or firmware) that the first playback device 702 uses to play both the first audio content 742 and the second audio content 752 at the same time. The second playback device 704 also comprises an audio mixer component (in software, hardware, firmware, or some combination of one or more of software, hardware, or firmware) that the second playback device 704 uses to play both the first audio content 742 and the second audio content 752 at the same time.

B. Two Playback Devices Each Playing Content Sourced by the Other Playback Device from Two Different Audio Sources FIG. 8 shows an example configuration 800 of two playback devices playing audio content from two different audio sources according to some embodiments.

Figure 8:
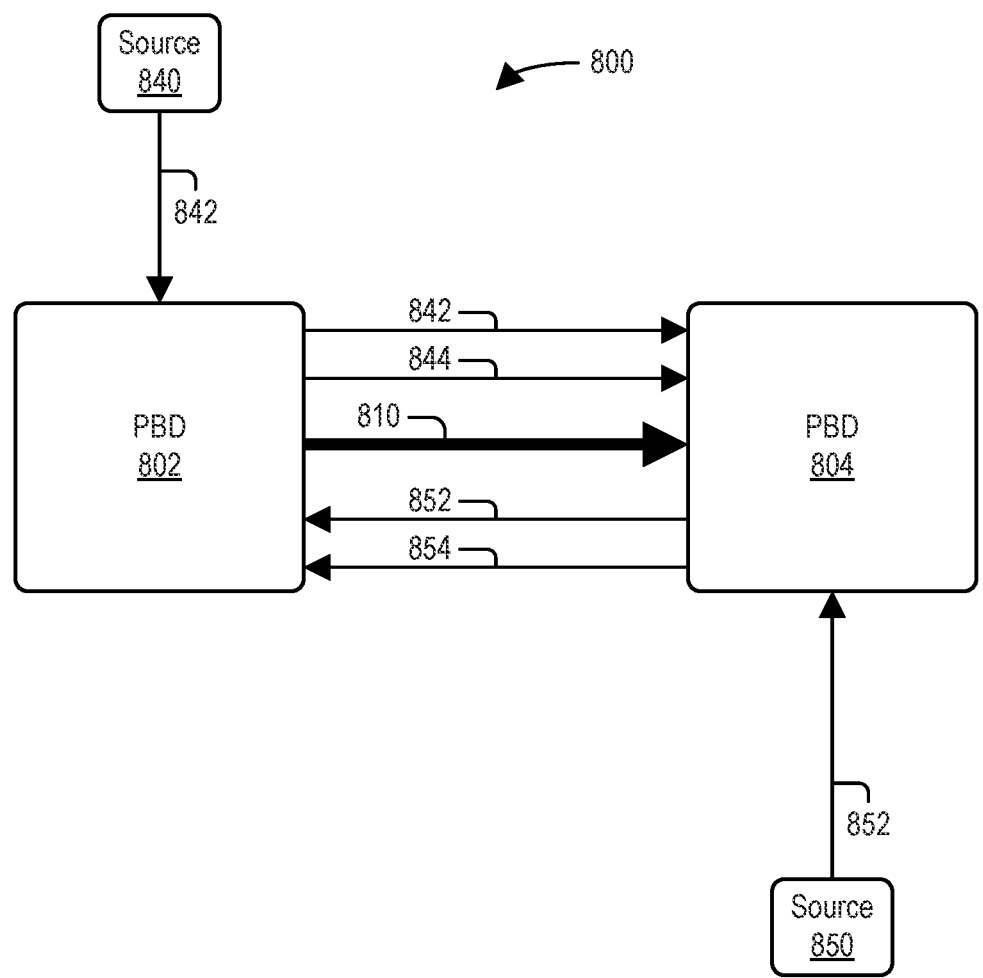
FIG. 8 shows an example configuration of two playback devices playing audio content from multiple sources according to some embodiments.

Configuration 800 in FIG. 8 includes a first playback device 802, a second playback device 804, a first audio source 840 and a second source 850. The arrows shown in configuration 800 indicate signal flow for timing information and media content.

Playback devices 802 and 804 are the same as or similar to the playback devices shown and described herein. In some embodiments, one or both of playback devices 802 and 804 are or comprise a networked microphone device.

Configuration 800 is the same as configuration 700 (FIG. 7) in all material respects except that the first audio content and the second audio content are sourced by different playback devices in configuration 800 whereas the first audio content and the second audio content are sourced by the same playback device in configuration 700.

In particular, regarding the first playback device 802 and the first audio content 842, the first playback device 802 (i) receives (or otherwise obtains) the first audio content 842 from the first audio source 840 in any of the ways that, in example 700 (FIG. 7), the first playback device 702 receives (or otherwise obtains) the first audio content 742 from the first audio source 740, (ii) processes the received first audio content 842 to generate a series of frames and/or packets comprising portions of the first audio content 842 in the same way that, in example 700 (FIG. 7), the first playback device 702 processes the first audio content 742 to generate a series of frames and/or packets comprising portions of the first audio content 742, (iii) generates the first playback timing 844 for the first audio content 842 in the same way that, in example 700 (FIG. 7), the first playback device 702 generates the first playback timing 744 for the first audio content 742, (iv) transmits the processed first audio content 842, the generated first playback timing 844, and the clock timing 810 to the second playback device 804 in the same way that, in example 700 (FIG. 7), the first playback device 702 transmits the processed first audio content 742, the generated first playback timing 744, and the clock timing 710 to the second playback device 704, and (v) uses the first playback timing 844 and the clock timing 810 to play the first audio content 842 in synchrony with the second playback device 804 in the same way that, in example 700 (FIG. 7), the first playback device 702 uses the first playback timing 744 and the clock timing 710 to play the first audio content 742 in synchrony with the second playback device 704.

Similarly, regarding the second playback device 804 and the first audio content 842, the second playback device 804 (i) receives (or otherwise obtains) the processed first audio content 842 from the first playback device 802 in the form of a series of frames and/or packets comprising the first audio content 842 in the same way that, in example 700 (FIG. 7), the second playback device 704 receives (or otherwise obtains) the processed first audio content 742 from the first playback device 702 in a series of fames and/or packets comprising the first audio content 742, (ii) receives (or otherwise obtains) the first playback timing 844 from the first playback device 802 in the same way that, in example 700 (FIG. 7), the second playback device 704 receives (or otherwise obtains) the first playback timing 744 from the first playback device 702, and (iii) uses the first playback timing 844 and the clock timing 810 to play the first audio content 842 in synchrony with the first playback device 802 in the same way that, in example 700 (FIG. 7), the second playback device 704 uses the first playback timing 744 and the clock timing 710 to play the first audio content 742 in synchrony with the first playback device 702.

Because the first playback device 802 plays frames (or packets) comprising portions of the first audio content 842 according to the first playback timing 844, and because the second playback device 804 plays the same frames (or packets) comprising the same portions of the first audio content 842 according to the first playback timing 844 (adjusted for the "timing offset"), the first playback device 802 and the second playback device 804 play the same frames (or packets) comprising the same portions of the first audio content 842 in synchrony, i.e., at the same time or at substantially the same time.

In contrast to example 700 where the first playback device 702 sources the second audio content 742, in example 800, the second playback device 804 sources the second audio content 852. In some embodiments, the second playback device 804 also processes the received second audio content 852 to generate a series of frames and/or packets comprising portions of the second audio content 852 according to any of the audio processing methods disclosed and described herein.

The second playback device 804 also (i) generates second playback timing 854 for the second audio content 852 based on the clock timing 810 received from the first playback device 802 and (ii) transmits the generated second playback timing 854 to the first playback device 802. In this manner, the second playback device 804 in this scenario generates playback timing with clock timing from a remote clock, i.e., clock timing 810 from a "remote" clock at the first playback device 802 rather a "local" clock at the second playback device 804.

In operation, the second playback device 804 generates the second playback timing 854 based on (i) the "timing offset" between (a) a local clock at the second playback device 804 that the second playback device 804 uses for generating the second playback timing 854 for the second audio content 852 and (b) the clock timing 810 that the second playback device 804 receives from the first playback device 802, and (ii) a "timing advance" based on an amount of time that is greater than or equal to the sum of (a) the network transit time required for packets transmitted from the second playback device 804 to arrive at the first playback device 802 and (b) the amount of time required for the first playback device 802 to process packets received from the second playback device 804 for playback. As described above, the playback timing for a frame or packet corresponds to a future time, relative to a reference clock time, that the audio content in the frame (or packet) is to be played. In this instance, the reference clock time is the clock time of the "remote" clock at the first playback device 802 that the first playback device 802 uses to generate the clock timing 810, and which the first playback device 802 transmits to the second playback device 804.

In some embodiments, the "timing offset" that the second playback device 804 uses for generating the second playback timing 854 for the second audio content 852 is the same "timing offset" that the second playback device 804 uses for creating the "local" playback timing from the first playback timing 844 for the first audio content 842 that the second playback device 804 receives from the first playback device 802. As described above, the "timing offset" corresponds to a difference between the "remote" reference clock of the first playback device 802 that the first playback device 802 used to generate the clock timing 810 (and the first playback timing 844) and the local clock of the second playback device 804 that the second playback device 804 uses to play the first audio content 842.

In some embodiments, the "timing advance" that the second playback device 804 uses for generating the second playback timing 854 for the second audio content 852 is the same "timing advance" that the first playback device 802 uses for generating the first playback timing 844 for the first audio content 842. Recall from earlier that, like the first playback device 702 in example 700, the first playback device 802 in example 800 determines the "timing advance" based the sum of (i) an amount of time required for packets to transit the network from the first playback device 802 to the second playback device 804 and (ii) an amount of time required for the second playback device 804 to process packets received from the first playback device 802. In many cases, the "timing advance" the first playback device 802 previously-determined for use in generating the first playback timing 844 for the first audio content 842 is sufficient for the second playback device 804 to use when generating the second playback timing 854 for the second audio content 852. In such cases, the first playback device 802 provides the "timing advance" information to the second playback device 804.

But in some embodiments, the "timing advance" used by the second playback device 804 to generate the second playback timing 854 is different than the "timing advance" used by the first playback device 802 to generate the first playback timing 844. For example, in some embodiments, the second playback device 804 separately determines the network transit time required for packets transmitted from the second playback device 804 to arrive at the first playback device 802 and/or the time for subsequent processing by the first playback device 802. In some embodiments, the second playback device 804 determines the "timing advance" via signaling between the second playback device 804 and the first playback device 802. In some embodiments, the "timing advance" used by the one or both of the first playback device 802 and the second playback device 804 are predetermined and fixed.

As mentioned above, the second playback device 804 uses both the "timing offset" and the "timing advance" to generate the second playback timing 854 for the second audio content 852. For an individual frame (or packet) containing a portion of the second audio content 852, the second playback device 804 generates second playback timing 854 for that individual frame (or packet) by adding the sum of the "timing offset" and the "timing advance" to a current time of the local clock at the second playback device 804 that the second playback device 804 uses to generate the second playback timing 854. In operation, the "timing offset" may be a positive or a negative offset, depending on whether the local clock at the second playback device 804 is ahead of or behind the "remote" reference clock at the first playback device 802 that was used to generate the clock timing 810. And the "timing advance" is a positive number because it corresponds to a future time that playback devices are to play the audio content.

By adding the sum of the "timing advance" and the "timing offset" to a current time of the local clock at the second playback device 804 that the second playback device 804 is using to generate the second playback timing 854, the second playback device 804 is, in effect, generating the second playback timing 854 relative to the reference clock of the first playback device 802 that the first playback device 802 uses to generate the clock timing 810 that the first playback device 802 transmits to the second playback device 804. And after generating the second playback timing 854, the second playback device 804 transmits the second playback timing 854 to the first playback device 802.

To playback the second audio content 852 in synchrony with each other, the first playback device 802 plays the second audio content 852 using "remote" playback timing (i.e., the second playback timing 854 generated by the second playback device 804) and "local" clock timing 810 (i.e., generated by the first playback device 802), whereas the second playback device 804 plays the second audio content 852 using "local" playback timing (i.e., the second playback timing 854 generated by the second playback device 804) and "remote" clock timing 810 (i.e., generated by the first playback device 802).

To play an individual frame (or packet) of the second audio content 852 in synchrony with the first playback device 802, the second playback device 804 subtracts the "timing offset" from the second playback timing 854 (which comprises the sum of the "timing offset" and the "timing advance") for that individual frame (or packet) to generate a "local" playback time for playing the portion(s) of the second audio content 852 within that individual frame (or packet). This is similar to how the second playback device 804 generates "local" playback timing for playing the first audio content 842 in synchrony with the first playback device 802 by adding the "timing offset" to the first playback timing 844 to generate "local" playback timing for the first audio content 742, as described above.

After generating the "local" playback time for playing the portion(s) of the second audio content 852 within the individual frame (or packet), the second playback device 804 plays the portion(s) of the second audio content 852 in the individual frame (or packet) when the local clock at the second playback device 804 that the second playback device 804 is using to play the second audio content 852 (which is the same local clock that the second playback device 804 used to generate the second playback timing 854) reaches the "local" playback time for that individual frame (or packet).

And to play an individual frame (or packet) of the second audio content 852 in synchrony with the second playback device 804, the first playback device 802 (i) receives the frames (or packets) comprising the portions of the second audio content 852 from the second playback device 804, (ii) receives the second playback timing 854 for the second audio content 852 from the second playback device 804 (e.g., in the frame and/or packet headers of the frames and/or packets comprising the portions of the second audio content 852 or perhaps separately from the frames and/or packets comprising the portions of the second audio content 852), and (iii) plays the portion(s) of the second audio content 852 in the individual frame (or packet) when the clock that the first playback device 802 used to generate the clock timing 810 reaches the playback time specified in the second playback timing 854 for that individual frame (or packet). Because the second playback device 804 used the "timing offset" when generating the second playback timing 854, the second playback timing 854 already accounts for differences between timing at the second playback device 804 and the first playback device 802.

Because the first playback device 802 plays frames (or packets) comprising portions of the second audio content 852 according to the second playback timing 854, and because the second playback device 804 plays the same frames (or packets) comprising portions of the second audio content 852 according to the second playback timing 854 adjusted by the determined "timing offset," the first playback device 802 and the second playback device 804 play the same frames (or packets) comprising the same portions of the second audio content 842 in synchrony, i.e., at the same time or at substantially the same time.

One advantage of this approach is that, for the second audio content 852, the first playback device 802 and the second playback device 804 use the same playback timing 854 to play the second audio content 852, which may be more computationally efficient for the second playback device 804 when generating playback timing because the second playback device 804 only needs to generate on playback timing (i.e., the second playback timing 854) for the second audio content 852. However, one potential drawback of this approach is that, when playing the second audio content 852, the second playback device 804 has to subtract the "timing offset" from the second playback timing 854 (which comprises the sum of the "timing offset" and the "timing advance") for that individual frame (or packet) to generate a "local" playback time for playing the portion(s) of the second audio content 852 within that individual frame (or packet), so the second playback device 804 has to add the "timing offset" to the "timing advance" and its local clock to generate the second playback timing 854 and then subtract the "timing offset" from the second playback timing 854 to play the second audio content 852, which may be less computationally efficient for the second playback device 804 when playing audio content.

Alternatively, in some embodiments, rather than first playback device 802 and the second playback device 804 using the same second playback timing 854 to play the second audio content 852 in synchrony with each other, instead (i) the second playback device 804 generates and transmits the second playback timing 854 and second audio content 852 to the first playback device 802 as described above, and the first playback device 802 plays the second audio content 852 according to the second playback timing 854 as described above, and (ii) the second playback device 804 generates its "device-specific" playback timing (different than the second playback timing 854) and plays the second audio content 852 according to its "device-specific" playback timing.

In such embodiments, to generate a "device-specific" playback time for an individual frame (or packet) containing a portion of the second audio content 852, the second playback device 804 generates a "device-specific" playback time for that individual frame (or packet) by adding the "timing advance" to a current time of the local clock at the second playback device 804 that the second playback device 804 uses to generate the "device-specific" playback timing (and the second playback timing 854). In operation, the second playback device 804 uses the same "timing advance" to generate the "device-specific" playback timing (that the second playback device 804 will use to play the second audio content 852) and the second playback timing 854 (that the first playback device 802 will use to the play the second audio content 852). Recall that the "timing advance" is a positive number because it corresponds to a future time that playback devices are to play the audio content.

After generating the "device-specific" playback time for playing the portion(s) of the second audio content 852 within the individual frame (or packet), the second playback device 804 plays the portion(s) of the second audio content 852 in the individual frame (or packet) when the local clock at the second playback device 804 that the second playback device 804 is using to play the second audio content 852 (which is the same local clock that the second playback device 804 used to generate the "device-specific" playback timing and the second playback timing 854) reaches the "device-specific" playback time for that individual frame (or packet).

Because the first playback device 802 plays frames (or packets) comprising portions of the second audio content 852 according to the second playback timing 854, and because the second playback device 804 plays the same frames (or packets) comprising portions of the second audio content 852 according to its "device-specific" playback timing, and because the second playback device 804 generates both the second playback timing 854 (based on the "timing offset") and "device-specific" playback timing with the same local clock at the second playback device 804, the first playback device 802 and the second playback device 804 play the same frames (or packets) comprising the same portions of the second audio content 842 in synchrony, i.e., at the same time or at substantially the same time.

One advantage of this approach is that, when playing the second audio content 852, the second playback device 804 does not need to subtract the "timing offset" from the second playback timing 854 (which comprises the sum of the "timing offset" and the "timing advance") for that individual frame (or packet) to generate a "local" playback time for playing the portion(s) of the second audio content 852 within that individual frame (or packet), which may be more computationally efficient for the second playback device 804 when playing audio content. However, one potential drawback of this approach is that the second playback device 804 has to generate and store two sets playback timing (i.e., the second playback timing 854 for the first playback device 802 and the "device-specific" playback timing for the second playback device 804) at the same time (or substantially the same time), which may be less computationally efficient for the second playback device 804 when generating playback timing.

In some embodiments, the first playback device 802 and the second playback device 804 each comprise an audio mixer component (in software, hardware, firmware, or some combination of one or more of software, hardware, or firmware) that enables the first playback device 802 and the second playback device 804 to play the first audio content 842 in synchrony with each other at the same that the first playback device 802 and the second playback device 804 play the second audio content 852 in synchrony with each other.

C. Three Playback Devices Playing Content Sourced by Two Different Playback Devices from Two Different Audio Sources FIG. 9 shows an example configuration 900 of three playback devices playing audio content from multiple sources according to some embodiments.

Figure 9:
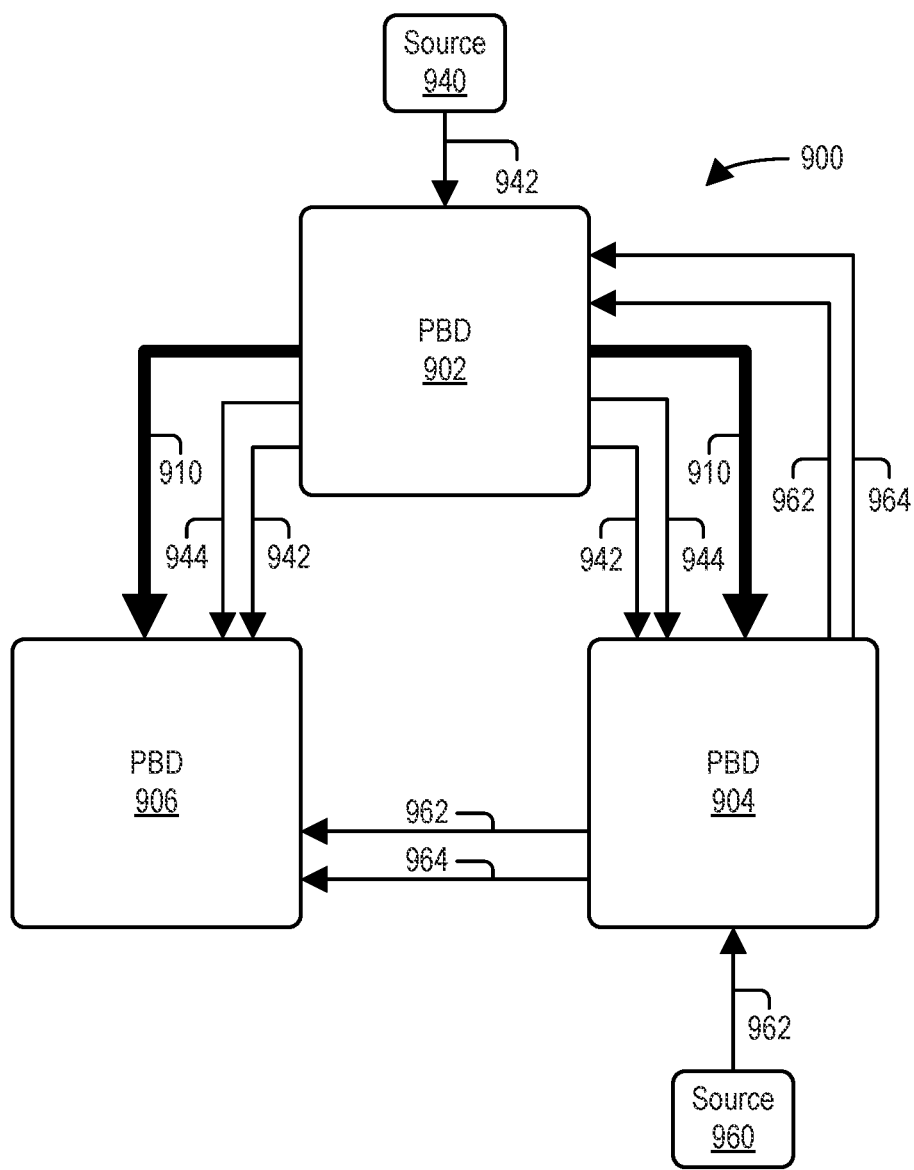
FIG. 9 shows an example configuration of three playback devices playing audio content from multiple sources according to some embodiments.

Configuration 900 in FIG. 9 includes a first playback device 902, a second playback device 904, a third playback device 906, a first source 940 and a second audio source 960. The arrows shown in configuration 900 indicate signal flow for timing information and media content.

Playback devices 902, 904, and 906 are the same as or similar to the playback devices shown and described herein. In some embodiments, one or more of playback devices 902, 904, and 906 are or comprise a networked microphone device.

Configuration 900 is the same as example 800 (FIG. 8) in most material respects except that example 900 includes a third playback device 906 that is configured to (i) play first audio content 942 in synchrony with one or both of the first playback device 902 and the second playback device 904 and/or (ii) playback second audio content 962 in synchrony with one or both of the first playback device 902 and the second playback device 904.

With regard to the first audio content 942, the first playback device 902 (i) generates first playback timing 944 with clock timing 910 from a "local" clock at the first playback device 902 and (ii) plays the first audio content 942 using locally-generated first playback timing 944 and local clock timing 910.

In particular, regarding the first playback device 902 and the first audio content 942, the first playback device 902 (i) receives (or otherwise obtains) the first audio content 942 from the first audio source 940 in any of the ways that, in example 800 (FIG. 8), the first playback device 802 receives (or otherwise obtains) the first audio content 842 from the first audio source 840, (ii) processes the received first audio content 942 to generate a series of frames and/or packets comprising portions of the first audio content 942 in the same way that, in example 800 (FIG. 8), the first playback device 802 processes the first audio content 842 to generate a series of frames and/or packets comprising portions of the first audio content 842, (iii) generates the first playback timing 944 for the first audio content 942 similar to the way that, in example 800 (FIG. 8), the first playback device 802 generates the first playback timing 844 for the first audio content 842, and (iv) transmits the processed first audio content 942, the generated first playback timing 944, and the clock timing 910 to the second playback device 904 in the same way that, in example 800 (FIG. 8), the first playback device 802 transmits the processed first audio content 842, the generated first playback timing 844, and the clock timing 810 to the second playback device 804. But unlike configuration 800 (FIG. 8), the first playback device 902 additionally (i) transmits the processed first audio content 942, the generated first playback timing 944, and the clock timing 910 to the third playback device 906 and (ii) uses the first playback timing 944 and the clock timing 910 to play the first audio content 942 in synchrony with both the second playback device 904 and the third playback device.

With regard to the first playback timing 944, the first playback device 902 generates the first playback timing 944 for the first audio content 942 by adding a "timing advance" to a current clock time of the local reference clock that the first playback device 902 uses for generating the first playback timing 944 for the first audio content 942 and the clock timing 910. As described above, the playback timing for a frame or packet corresponds to a future time, relative a reference clock time, that the audio content in the frame (or packet) is to be played. In some embodiments, the timing advance that the first playback device 902 adds to its own clock timing 910 to generate a future time for the first playback timing 944 is based on an amount of time that is greater than or equal to the sum of (i) the network transit time required for packets transmitted from the first playback device 902 to arrive at one or both of the second playback device 904 and the third playback device 906 and (ii) the amount of time required for one or both of the second playback device 904 and the third playback device 906 to process received packets for playback.

In some embodiments, the first playback device 902 determines the timing advance by (i) sending one or more test packets to one or both of the second playback device 904 and the third playback device 906 and (ii) receiving test response packets back from one or both of the second playback device 904 and the third playback device 906 in response to the test packets. In some embodiments, the first playback device 902, the second playback device 904, and the third playback device 906 can negotiate a timing advance via one or more test and response messages.

After receiving the first audio content 942, the first playback timing 944, and the clock timing 910 from the first playback device 902, the second playback device 904 and the third playback device 906 each perform the same functions with regard to the first audio content 942. In operation, both the second playback device 904 and the third playback device 906 play the first audio content 942 using "remote" playback timing (i.e., the first playback timing 944 generated by the first playback device 902) and "remote" clock timing (i.e., the clock timing 910 generated by the first playback device 902).

In particular, the second playback device 904 and the third playback device 906 each (i) receive (or otherwise obtain) the processed first audio content 942 from the first playback device 902 in the form of a series of frames and/or packets comprising the first audio content 942 in the same way that, in example 800 (FIG. 8), the second playback device 804 receives (or otherwise obtains) the processed first audio content 842 from the first playback device 802 in a series of fames and/or packets comprising the first audio content 842, (ii) receive (or otherwise obtain) the first playback timing 944 from the first playback device 902 in the same way that, in example 800 (FIG. 8), the second playback device 804 receives (or otherwise obtains) the first playback timing 844 from the first playback device 802, (iii) receive (or otherwise obtain) the clock timing 910 from the first playback device 902, and (iv) use the clock timing 910 and the first playback timing 944 to play the first audio content 942 in synchrony with each other and the first playback device 902.

Before playing an individual frame (or packet) comprising a portion(s) of the first audio content 942, the second playback device 904 and the third playback device 906 each calculates its own "timing offset" value relative to the clock timing 910 received from the first playback device 902. In particular, the second playback device 904 calculates (or otherwise determines) a "timing offset" that corresponds to a difference between (a) the "reference" clock at the first playback device 902 that the first playback device 902 used to generate the clock timing 910 and the first playback timing 944 and (b) the "local" clock at the second playback device 904 that the second playback device 904 uses to play the first audio content 942. And the third playback device 906 calculates (or otherwise determines) a "timing offset" that corresponds to a difference between (a) the "reference" clock at the first playback device 902 that the first playback device 902 used to generate the clock timing 910 and first playback timing 910 and (b) the "local" clock at the third playback device 906 that the third playback device 906 uses to play the first audio content 942.

Because the local clocks at the second playback device 904 and the third playback device 906 may have different times and/or operate at slightly different clocking rates, the "timing offset" determined and used by the second playback device 904 to play the first audio content 942 may be different than the "timing offset" determined and used by the third playback device 906 to play the first audio content 942. However, the "timing offsets" used by the second playback device 904 and the third playback device 906 need not be different; the "timing offsets" could be the same if the local clocks at the second playback device 904 and the third playback device 906 happen to have the same (or substantially the same) time and/or operate at the same (or substantially the same) clocking rates. In embodiments where playback devices calculate and recalculate a "timing offset" during the course of playback, there could be timeframes during which both the second playback device 904 and the third playback device 906 independently determine and use the same value for their "timing offset" but other timeframes during which the second playback device 904 and the third playback device 906 independently determine and use different values for their "timing offset."

The second playback device 904 and the third playback device 906 each use their determined "timing offset" values and the first playback timing 944 to play the first audio content 942.

In operation, the second playback device 904 generates new playback timing (specific to the second playback device 904) for individual frames (or packets) comprising the first audio content 942 by adding its determined "timing offset" to the playback time for each frame (or packet) received from the first playback device 902. With this approach, the second playback device 904 converts the first playback timing 944 for the first audio content 942 received from the first playback device 902 into "local" playback timing for the second playback device 904. And when the "local" clock that the second playback device 904 is using for playing back the first audio content 942 reaches the determined "local" playback time for an individual frame (or packet), the second playback device 904 plays the audio content (or portions thereof) associated with that individual frame (or packet).

Similarly, the third playback device 906 generates new playback timing (specific to the third playback device 906) for individual frames (or packets) comprising the first audio content 942 by adding its determined "timing offset" to the playback time for each frame (or packet) received from the first playback device 902. With this approach, the third playback device 906 converts the first playback timing 944 for the first audio content 942 received from the first playback device 902 into "local" playback timing for the third playback device 906. And when the "local" clock that the third playback device 906 is using for playing back the first audio content 942 reaches the determined "local" playback time for an individual frame (or packet), the third playback device 906 plays the audio content (or portions thereof) associated with that individual frame (or packet).

Because the first playback device 902 plays frames (or packets) comprising portions of the first audio content 942 according to the first playback timing 944, and because the second playback device 904 and the third playback device 906 each play those same frames (or packets) comprising the same portions of the first audio content 942 according to the first playback timing 944 (adjusted by their respective "timing offset" values), the first playback device 902, the second playback device 904, and the third playback device 906 all play the same frames (or packets) comprising the same portions of the first audio content 942 in synchrony, i.e., at the same time or at substantially the same time.

While the first playback device 902, the second playback device 904, and the third playback device 906 are playing the first audio content 942 in synchrony, the second playback device 904 receives (or otherwise obtains) second audio content 962 from a second audio source 960 for playback in synchrony by the playback devices 902, 904, and 906 while the playback devices 902, 904, and 906 are playing back the first audio content 942 in synchrony.

The second playback device 904 processes the received second audio content 962 to generate a series of frames and/or packets comprising portions of the second audio content 962 according to any of the audio processing methods disclosed and described herein. The second playback device 904 also (i) generates second playback timing 964 for the second audio content 962 based on the clock timing 910 received from the first playback device 902 and (ii) transmits the generated second playback timing 964 to the first playback device 902 and the third playback device 906. Thus, the second playback device 904 in this scenario generates playback timing with clock timing from a remote clock, i.e., clock timing 910 from a "remote" clock at the first playback device 902 rather a "local" clock at the second playback device 904.

In operation, the second playback device 904 generates the second playback timing 964 for the second audio content 962 based on (i) a "timing offset" between (a) a local clock at the second playback device 904 that the second playback device 904 uses for generating the second playback timing 964 for the second audio content 962 and (b) the clock timing 910 that the second playback device 904 receives from the first playback device 902, and (ii) a "timing advance" based on an amount of time that is greater than or equal to the sum of (a) the network transit time required for packets transmitted from the second playback device 904 to arrive at the first playback device 902 and (b) the amount of time required for the first playback device 902 to process packets received from the second playback device 904 for playback. As described above, the playback timing for a frame or packet corresponds to a future time, relative to a reference clock time, that the audio content in the frame (or packet) is to be played. In this instance, the reference clock time is the clock time of the "remote" clock at the first playback device 902 that the first playback device 902 uses to generate the clock timing 910, and which the first playback device 902 transmits to the second playback device 904 and the third playback device 906.

In some embodiments, the second playback device 904 uses the same "timing offset" for generating the second playback timing 964 for the second audio content 962 that the second playback device 904 uses for creating the "local" playback timing based on the first playback timing 944 for the first audio content 942. As described above, the "timing offset" corresponds to a difference between (a) the "remote" reference clock of the first playback device 902 that the first playback device 902 used to generate the first playback timing 944 and the clock timing 910 and (b) the local clock of the second playback device 904 that the second playback device 904 uses to play the first audio content 942.

In some embodiments, the "timing advance" that the second playback device 904 uses for generating the second playback timing 964 for the second audio content 962 is the same "timing advance" that the first playback device 902 uses for generating the first playback timing 944 for the first audio content 942. In many cases, the "timing advance" the first playback device 902 previously-determined for use in generating the first playback timing 944 for the first audio content 942 is sufficient for the second playback device 904 to use when generating the second playback timing 964 for the second audio content 962. In such cases, the first playback device 902 provides the "timing advance" information to the second playback device 904.

But in some embodiments, the "timing advance" used by the second playback device 904 to generate the second playback timing 964 is different than the "timing advance" used by the first playback device 902 to generate the first playback timing 944. For example, in some embodiments, the second playback device 904 separately determines one or both of (i) the network transit time required for packets transmitted from the second playback device 904 to arrive at the first playback device 902 and/or the third playback device 906 and/or (ii) the time for subsequent processing by the first playback device 902 and/or third playback device 906. In some embodiments, the second playback device 904 determines the "timing advance" that it uses for generating the second playback timing 964 via signaling between the second playback device 804 and one or both of the first playback device 902 and/or the third playback device 906. In some embodiments, the "timing advance" used by the one or both of the first playback device 904 and the second playback device 906 are predetermined and fixed.

As mentioned above, the second playback device 904 uses both the "timing offset" and the "timing advance" to generate the second playback timing 964 for the second audio content 962. For an individual frame (or packet) containing a portion of the second audio content 962, the second playback device 904 generates second playback timing 964 for that individual frame (or packet) by adding the sum of the "timing offset" and the "timing advance" to a current time of the local clock at the second playback device 904 that the second playback device 904 uses to generate the second playback timing 964. In operation, the "timing offset" may be a positive or a negative offset, depending on whether the local clock at the second playback device 904 is ahead of or behind the "remote" reference clock at the first playback device 902 that was used to generate the clock timing 910. And the "timing advance" is a positive number because it corresponds to a future time that playback devices are to play the audio content.

By adding the sum of the "timing advance" and the "timing offset" to a current time of the local clock at the second playback device 904 that the second playback device 904 is using to generate the second playback timing 964, the second playback device 904 is, in effect, generating the second playback timing 964 relative to the reference clock of the first playback device 902 that the first playback device 902 uses to generate the clock timing 910 that the first playback device 902 transmits to both the second playback device 904 and the third playback device 906. And after generating the second playback timing 964, the second playback device 904 transmits the second playback timing 964 to both the first playback device 902 and the third playback device 906.

In this scenario, the first playback device 902 plays the second audio content 962 in synchrony with the second playback device 904 and the third playback device 906 using "remote" playback timing (i.e., the second playback timing 964 generated by the second playback device 904) and "local" clock timing 910 (i.e., generated by the first playback device 902). In operation, the first playback device 902 plays the second audio content 962 based on the second playback timing 964 and the clock timing 910 in the same way that, in example 800, the first playback device 802 plays the second audio content 852 based on the second playback timing 854 and the clock timing 810.

The second playback device 904 plays the second audio content 962 in synchrony with the first playback device 902 and the third playback device 906 using "local" playback timing (i.e., the second playback timing 964 generated by the second playback device 904) and "remote" clock timing 910 (i.e., generated by the first playback device 902). In operation, the second playback device 904 plays the second audio content 962 based on the second playback timing 964 and the clock timing 910 in the same way that, in example 800, the second playback device 804 plays the second audio content 852 based on the second playback timing 854 and the clock timing 810. Alternatively, in some embodiments, rather using the second playback timing 964 to play the second audio content 962, the second playback device 904 can instead generate and use "device-specific" playback timing to play the second audio content 962 in the same way that, in the alternative embodiments of example 800, the second playback device 804 generates and uses "device-specific" playback timing to play the second audio content 852.

And the third playback device 906 plays the second audio content 962 in synchrony with the first playback device 902 and the second playback device 904 using "remote" playback timing (i.e., the second playback timing 964 generated by the second playback device 904) and "remote" clock timing 910 (i.e., generated by the first playback device 902). In operation, to play an individual frame (or packet) of the second audio content 962 in synchrony with the first playback device 902 and the second playback device 904, the third playback device 906 adds its previously-determined "timing offset" to the second playback timing 964 for that individual frame (or packet) to generate a "local" playback time for playing the portion(s) of the second audio content 852 within that individual frame (or packet). Recall that the third playback device's 906 "timing offset" can be positive or negative based on whether the "local" clock at the third playback device 906 is running ahead of or behind the "reference" clock at the first playback device 902 that the first playback device 902 uses to generate the clock timing 910.

After generating the "local" playback time for playing the portion(s) of the second audio content 962 within the individual frame (or packet), the third playback device 906 plays the portion(s) of the second audio content 962 in the individual frame (or packet) when the local clock at the third playback device 906 that the third playback device 906 is using to play the second audio content 962 reaches the "local" playback time for that individual frame (or packet).

Because the first playback device 902 plays frames (or packets) comprising portions of the second audio content 962 according to the second playback timing 964 (which is based on the second playback device's "timing offset," which is based on the clock timing 910, which is based on the "reference" clock at the first playback device 902), and because the second playback device 804 and the third playback device 906 each play the same frames (or packets) comprising portions of the second audio content 962 according to the second playback timing 964 adjusted by their own respective "timing offset" values (which are also based on the clock timing 910), the first playback device 902, the second playback device 904, and the third playback device 906 all play the same frames (or packets) comprising the same portions of the second audio content 962 in synchrony, i.e., at the same time or at substantially the same time.

D. A First Playback Device Playing First Content from a First Source Individually while Playing Second Content Sourced by a Second Playback Device from a Second Source in Synchrony with the Second Playback Device FIG. 10 shows an example configuration 1000 of two playback devices playing audio content from multiple sources according to some embodiments.

Figure 10:
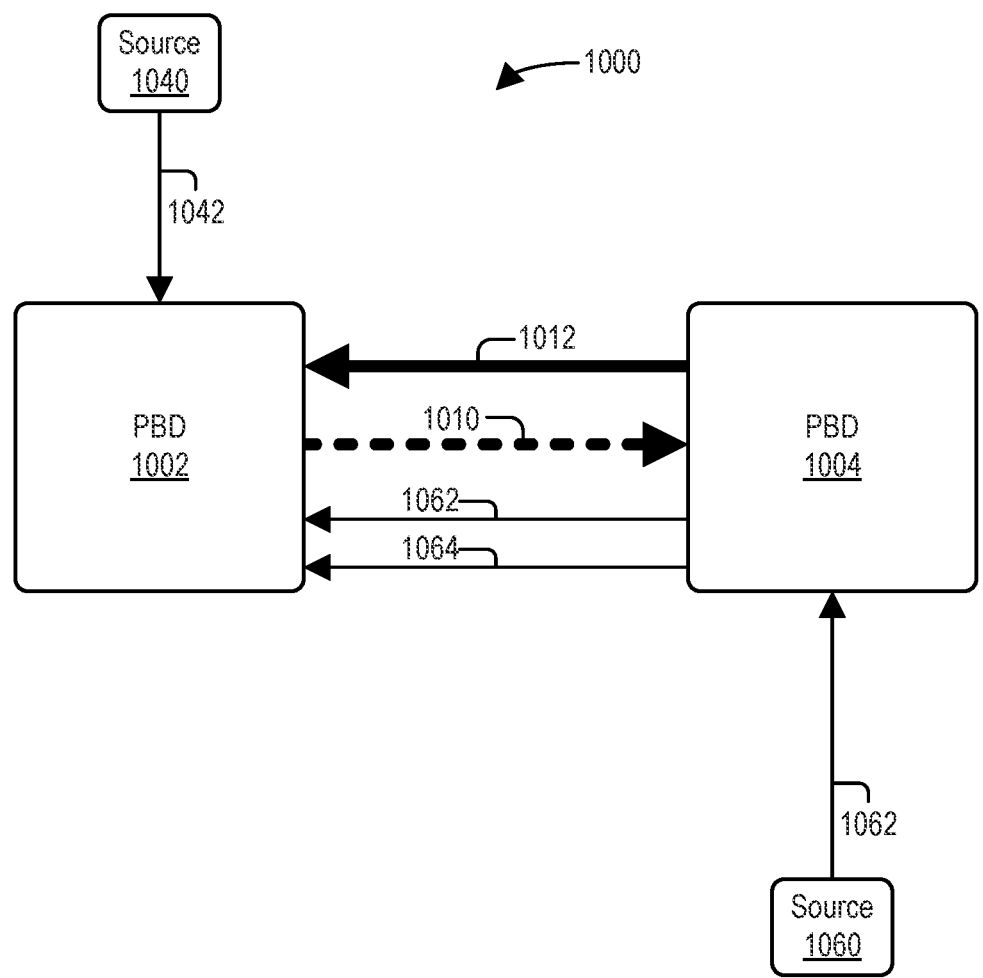
FIG. 10 shows an example configuration of two playback devices playing audio content from multiple sources according to some embodiments.

Configuration 1000 in FIG. 10 includes a first playback device 1002, a second playback device 1004, a first audio source 1040 and a second audio source 1060. The arrows shown in configuration 1000 indicate signal flow for timing information and media content.

Playback devices 1002 and 1004 are the same as or similar to the other playback devices shown and described herein. In some embodiments, one or more of playback devices 1002 and 1004 are or comprise a networked microphone device.

Configuration 1000 is similar to the previous examples in most material respects except that the first playback device 1002 is configured to play first audio content 1042 from a first audio source 1040 individually rather than in synchrony with another playback device, e.g., playback device 1004. But the first playback device 1002 and the second playback device 1004 are configured to play second audio content 1062 from a second audio source 1060 in synchrony with each other.

For the first audio content 1042, the first playback device 1002 receives (or otherwise obtains) the first audio content 1042 from the first audio source 1040. The first playback device 1002 may perform some or all of the audio content processing described herein, including but not necessarily limited to (i) generating a series of fames and/or packets comprising the first audio content 1042, (ii) generating playback timing for the first audio content 1042, and (iii) playing the first audio content 1042 based on a local clock at the first playback device 1002 and the playback timing. But because the first playback device 1002 plays the first audio content 1042 individually (rather than in synchrony with one or more other playback devices), the first playback device 1002 need not perform the audio content processing described herein for synchronous playback. The first playback device 1002 also transmits its clock timing 1010 to the second playback device 1004.

In some embodiments, the second playback device 1004 uses the first playback device's 1002 clock timing 1010 to generate playback timing for audio content that the second playback device 1004 sources similar to how, in example 800, the second playback device 804 uses the first playback device's 802 clock timing 810 to generate second playback timing 854 for the second audio content 852.

But in some embodiments, and in example 1000 of FIG. 10, the second playback device 1004 uses the first playback device's 1002 clock timing 1010 as a reference to generate its own clock timing 1012, which the second playback device 1004 will both (i) transmit to other playback devices and (ii) use to generate playback timing.

In operation, the second playback device 1004 receives clock timing 1010 from the first playback device 1002. The second playback device 1004 then calculates a "timing offset" based on the difference between the clock time indicated by the clock timing 1010 from the first playback device 1002 in the same manner as described in the earlier examples.

The second playback device 1004 uses the determined "timing offset" to generate its own clock timing 1012. In operation, the second playback device 1004 adds the "timing offset" (which could be positive or negative) to a local clock at the second playback device 1004 that the second playback device 1004 will use to generate its own clock timing 1012. In this manner, the clock timing 1012 that the second playback device 1004 generates is based at least in part on the clock timing 1010 received from the first playback device 1002.

While the first playback device 1002 is playing the first audio content 1042 individually, the second playback device 1004 receives (or otherwise obtains) the second audio content 1062 from the second audio source 1060. The second playback device 1004 processes the received second audio content 1062 to generate a series of frames and/or packets comprising portions of the second audio content 1060.

In example configuration 1000, the first playback device 1002 uses the clock timing 1012 (derived from clock timing 1010) to generate the second playback timing 1064 for the second audio content 1062. In some embodiments, the second playback device 1004 generates the second playback timing 1064 for the second audio content 1062 by adding a "timing advance" to the sum of (i) the current time of the local clock at the second playback device 1004 that the second playback device 1004 is using to generate the clock timing 1012 and (ii) the previously-determined "timing offset." As described above, the playback timing for a frame or packet corresponds to a future time, relative to a reference clock time, that the audio content in the frame (or packet) is to be played. In operation, the "timing advance" may be determined according to any of the methods for determining a "timing advance" described herein.

The second playback device 1004 (i) transmits the second audio content 1062, the second playback timing 1064, and the clock timing 1012 to the first playback device 1002, and (ii) plays the second audio content 1062 in synchrony with the first playback device 1002.

To playback the second audio content 1062 in synchrony with each other, the first playback device 1002 plays the second audio content 1062 using "remote" playback timing (i.e., the second playback timing 1064 generated by the second playback device 1004) and "remote" clock timing 1012 (i.e., generated by the second playback device 1004), whereas the second playback device 1004 plays the second audio content 1062 using "local" playback timing (i.e., the second playback timing 1064 generated by the second playback device 1004) and "local" clock timing 1012 (i.e., generated by the first second device 1004).

The first playback device 1002 plays the second audio content 1062 in each frame (or packet) when the current time of a local clock (at the first playback device 1002) that the first playback device 1002 is using to play the second audio content 1062 reaches the second playback timing 1064 for that frame (or packet), taking into account a "timing offset." This "timing offset" corresponds to a difference between (a) the second playback device's 1004 clock timing 1012 that the first playback device 1002 received from the second playback device 1004 and (b) the first playback device's 1002 clock timing 1010.

In particular, the first playback device 1002 generates new playback timing (specific to the first playback device 1002) for individual frames (or packets) of the second audio content 1062 by adding the "timing offset" to the playback time of each frame (or packet) received from the second playback device 1004. With this approach, the first playback device 1002 converts the second playback timing 1064 for the second audio content 1062 received from the second playback device 1004 into "local" playback timing for the first playback device 1002. And when the "local" clock that the first playback device 1002 is using for playing back the second audio content 1062 reaches the determined "local" playback time for an individual frame (or packet), the first playback device 1002 plays the audio content (or portions thereof) associated with that individual frame (or packet). In some embodiments, generating the "local" playback timing effectively removes the "timing offset" that the second playback device 1004 added to the second playback device's 1004 local clock to generate the second playback device's 1004 clock timing 1012.

The second playback device 1004 plays an individual frame (or packet) comprising portions of the second audio content 1062 when the local clock at the second playback device 1004 that the second playback device 1004 used for generating the second playback timing 1064 reaches the time specified in the playback timing 1064 for that individual frame (or packet). So, like in other scenarios where a playback device plays audio content based on locally-generated clock timing and playback timing, if the timing advance for an individual frame is, for example, 30 milliseconds, then the second playback device 1004 ultimately plays the portion (e.g., a sample or set of samples) of the second audio content 1062 in an individual frame (or packet) 30 milliseconds after creating the second playback timing 1064 for that individual frame (or packet).

Because the first playback device 1002 plays frames (or packets) comprising portions of the second audio content 1062 according to the second playback timing 1064 and the timing offset, and because the second playback device 1004 plays those same frames (or packets) comprising portions of the second audio content 1062 according to the second playback timing 1064, the first playback device 1002 and the second playback device 1004 play the same frames (or packets) comprising the same portions of the second audio content 1062 in synchrony, or at the same time or least substantially the same time.

E. Multiple Playback Devices Playing Audio Content Sourced from Multiple Audio Sources FIG. 11A shows an example configuration 1100 of four playback devices playing audio content from multiple sources according to some embodiments.

Figure 11A:
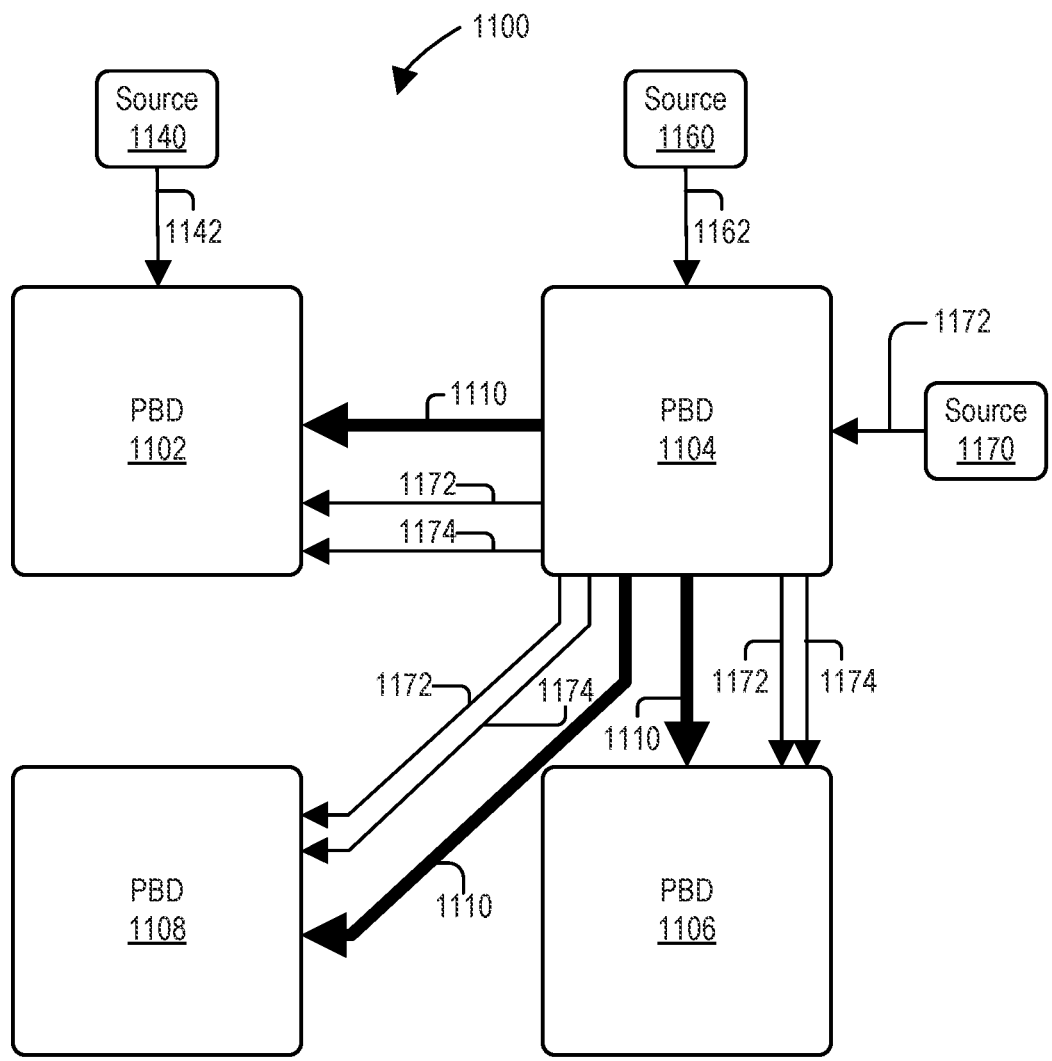
FIG. 11A shows an example configuration of four playback devices playing audio content from multiple sources according to some embodiments.

FIG. 11A includes a first playback device 1102, a second playback device 1104, a third playback device 1106, and a fourth playback device 1108. The arrows shown in configuration 1100 indicate signal flow for timing information and media content.

Playback devices 1102, 1104, 1106, and 1108 are the same as or similar to the playback devices shown and described herein. In some embodiments, one or more (or all) of playback devices 1102, 1104, 1106, and 1108 are or comprise a networked microphone device. In some embodiments, one or more (or all) of playback devices 1102, 1104, 1106, and 1108 comprise an audio mixer component (in software, hardware, firmware, or some combination of one or more of software, hardware, or firmware) that allows the playback device to play multiple streams of audio content at the same time.

In an initial state, in example 1100, the first playback device 1102 (i) receives (or otherwise obtains) first audio content 1142 from a first audio source 1140; and (ii) plays the first audio content 1142 individually, i.e., not in synchrony with any of the other playback devices in example 1100. And the second playback device 1104 receives (or otherwise obtains) second audio content 1162 from a second audio source 1160; and (ii) plays the second audio content 1162 individually, i.e., not in synchrony with any of the other playback devices in example 1100. Neither the third playback device 1106 nor the fourth playback device 1108 receive or play any audio content, at least in this initial state.

Later, and while in the initial state where the third playback device 1106 and the fourth playback device 1108 are not playing any content and the first playback device 1102 and second playback device 1104 are individually playing the first audio content 1142 and the second audio content 1164, respectively, the second playback device 1104 receives (or otherwise obtains) third audio content 1172 from a third audio source 1170. Playback devices 1102, 1104, 1106, and 1108 are configured to play this third audio content 1172 in synchrony.

After receiving at least a portion of the third audio content 1172, the second playback device 1104 processes the third audio content 1172 and generates a series of frames (or packets), wherein individual frames (or packets) comprise one or more portions of the third audio content 1172 in the same way or similar to any of the ways described herein that playback devices receive and process audio content.

The second playback device 1104 also generates playback timing with clock timing 1110 from a local clock. In some embodiments, like the initial state here, when a set of playback devices are not currently in the process of playing audio content together in synchrony, one or more of the playback devices determines which of the playback devices will provide clock timing for synchronous playback. In some embodiments, the playback device with the lowest MAC address in the network may be the default playback device for providing the clock timing, this this playback device may remain the clock timing source unless and until there is some reason to change the clock timing source role to another playback device. In other embodiments, where none of the playback devices in the network are currently playing audio content in synchrony, when a sourcing playback device receives new audio content for synchronous playback, that sourcing playback device becomes the clock timing source for the network. In some embodiments, this sourcing device may remain the clock timing source unless and until another playback device takes over the clock timing source role in the network. This may occur if (or when), for example, a playback device performing the clock timing source role becomes unable to provide reliable clock timing. Such a scenario may arise if (or when) the clock that the playback device performing the clock timing source role is using to provide the clock timing becomes unstable (e.g., drifts too far+/−a certain threshold), or if the network topology changes in a way that puts that playback device at an edge of the network topology, thereby causing other playback devices to have "timing offsets" that are undesirably large compared to if a different, more centrally-located playback device served as the clock timing source.

In some embodiments, one or more of the playback devices in the network may determine which of the playback devices (and perhaps other computing devices, too) should perform the role of providing clock timing to the network. In operation, one or more of the playback devices, individually or in combination with another computing device or system (e.g., the cloud computing systems described earlier), may determine network transmit times (e.g., via source-destination pings or other Internet Control Messaging Protocol (ICMP) or similar messaging) between each playback device and each other playback device, and then designate the playback device having the best transit time performance (i.e., the playback device with the lowest transit times to each of the other playback devices). And because any of the playback devices (and at least some other computing devices) can provide clock timing for the network, the playback devices, individually or in combination with another computing device or system (e.g., the cloud computing systems described earlier), can de-designate one playback device as the clock timing source and designate a different playback device as the clock timing source. In operation, this may happen on an ongoing basis as the network topology, playback device performance, and/or network loading changes.

Here, the second playback device 1104 is providing the clock timing 1110 for the network. The second playback device 1104 generates the playback timing 1174 for the third audio content 1172 by adding a "timing advance" to a current clock time of the local reference clock that the second playback device 1104 uses for generating the playback timing 1174 for the third audio content 1172 (which is the same local clock that the second playback device 1104 uses to generate the clock timing 1110). As described above, the playback timing for a frame or packet corresponds to a future time, relative to a reference clock time, that the audio content in the frame (or packet) is to be played.

In operation, the second playback device 1104 determines the "timing advance" to use for generating the playback timing 1174 according to any of the methods disclosed herein for generating a timing advance. In some embodiments, the timing advance that the second playback device 1104 adds to its local clock timing 1110 to generate a future time for the playback timing 1174 is based on an amount of time that is greater than or equal to the sum of (i) the network transit time required for packets transmitted from the second playback device 1104 to arrive at one or more the first playback device 1102, third playback device 1106, and/or the fourth playback device 1108 and (ii) the amount of time required for one or more the first playback device 1102, third playback device 1106, and/or the fourth playback device 1108 to process received packets for playback.

The second playback device 1104 then (i) transmits the third audio content 1172, the playback timing 1174, and the clock timing 1110 to the first playback device 1102, third playback device 1106, and fourth playback device 1108, and (ii) plays the third audio content 1172 in synchrony with the first playback device 1102, third playback device 1106, and fourth playback device 1108 while also playing the second audio content 1162 individually.

The second playback device 1104 plays the third audio content 1172 using locally-generated playback timing (i.e., playback timing 1174) and locally-generating clock timing (i.e., clock timing 1110). In operation, the second playback device 1104 (while playing at least a portion of the second audio content 1162 individually) plays an individual frame (or packet) comprising portions of the third audio content 1172 when the local clock at the second playback device 1104 that was used for generating the playback timing 1174 reaches the time specified in the playback timing 1174 for that individual frame (or packet).

After receiving the third audio content 1172, the playback timing 1174, and the clock timing 1110 from the second playback device 1104, the other playback devices 1102, 1106, and 1108 each perform the same functions with regard to the third audio content 1172. In operation, playback devices 1102, 1106, and 1108 each play the third audio content 1172 using remote playback timing (i.e., playback timing 1174 generated by the second playback device 1104) and remote clock timing (i.e., clock timing 1110 generated by the second playback device 1104).

In particular, playback devices 1102, 1106, and 1108 each (i) receive (or otherwise obtain) the processed third audio content 1172 from the second playback device 1104 in the form of a series of frames and/or packets comprising the third audio content 1172, (ii) receive (or otherwise obtain) the playback timing 1174 from the second playback device 1104, (iii) receive (or otherwise obtain) the clock timing 1110 from the second playback device 1104, and (iv) use the clock timing 1110 and the playback timing 1174 to play the third audio content 1172 in synchrony with each other and the second playback device 1104.

Before playing an individual frame (or packet) comprising a portion(s) of the third audio content 1172, playback devices 1102, 1106, and 1108 each calculate their own "timing offset" value relative to the clock timing 1110 received from the second playback device 1104. In particular, the first playback device 1102 calculates (or otherwise determines) a "timing offset" that corresponds to a difference between (a) the "reference" clock at the second playback device 1104 that the second playback device 1104 used to generate the clock timing 1110 and the playback timing 1174 and (b) the "local" clock at the first playback device 1002 that the first playback device 1102 uses to play the third audio content 1172. The third playback device 1106 calculates (or otherwise determines) a "timing offset" that corresponds to a difference between (a) the "reference" clock at the second playback device 1104 that the second playback device 1104 used to generate the clock timing 1110 and the playback timing 1174 and (b) the "local" clock at the third playback device 1106 that the third playback device 1106 uses to play the third audio content 1172. And the fourth playback device 1108 calculates (or otherwise determines) a "timing offset" that corresponds to a difference between (a) the "reference" clock at the second playback device 1104 that the second playback device 1104 used to generate the clock timing 1110 and the playback timing 1174 and (b) the "local" clock at the fourth playback device 1108 that the fourth playback device 1108 uses to play the third audio content 1172

Because the local clocks at playback devices 1102, 1106, and 1108 may have different times and/or operate at slightly different clocking rates, the individual "timing offset" values determined and used by each of the playback devices 1102, 1106, and 1108 to play the third audio content 1172 may be different from each other. However, the "timing offsets" used by the playback devices 1102, 1106, and 1108 need not be different; the "timing offsets" could be the same if the local clocks at the playback devices 1102, 1106, and 1108 happen to have the same (or substantially the same) time and/or operate at the same (or substantially the same) clocking rates. In embodiments where playback devices calculate and recalculate a "timing offset" during the course of playback, there could be timeframes during which the playback devices 1102, 1106, and 1108 each independently determine and use the same value for their "timing offset" but other timeframes during which the playback devices 1102, 1106, and 1108 each independently determine and use different values for their "timing offset."

The playback devices 1102, 1106, and 1108 each use their determined "timing offset" values and the playback timing 1174 to play the third audio content 1172.

The first playback device 1102 (while playing at least a portion of the first audio content 1142 individually) generates new playback timing (specific to the first playback device 1102) for individual frames (or packets) comprising the third audio content 1172 by adding its determined "timing offset" to the playback time for each frame (or packet) received from the second playback device 1104. With this approach, the first playback device 1102 converts the playback timing 1174 for the third audio content 1172 received from the second playback device 1104 into "local" playback timing for the first playback device 1102. And when the "local" clock that the first playback device 1102 is using for playing back the third audio content 1172 reaches the determined "local" playback time for an individual frame (or packet), the first playback device 1102 plays the audio content (or portions thereof) associated with that individual frame (or packet).

Similarly, the third playback device 1106 generates new playback timing (specific to the third playback device 1106) for individual frames (or packets) comprising the third audio content 1172 by adding its determined "timing offset" to the playback time for each frame (or packet) received from the second playback device 1104. With this approach, the third playback device 1106 converts the playback timing 1174 for the third audio content 1172 received from the second playback device 1104 into "local" playback timing for the third playback device 1106. And when the "local" clock that the third playback device 1106 is using for playing back the third audio content 1172 reaches the determined "local" playback time for an individual frame (or packet), the third playback device 1106 plays the audio content (or portions thereof) associated with that individual frame (or packet).

And the fourth playback device 1108 generates new playback timing (specific to the fourth playback device 1108) for individual frames (or packets) comprising the third audio content 1172 by adding its determined "timing offset" to the playback time for each frame (or packet) received from the second playback device 1104. With this approach, the fourth playback device 1108 converts the playback timing 1174 for the third audio content 1172 received from the second playback device 1104 into "local" playback timing for the fourth playback device 1108. And when the "local" clock that the fourth playback device 1108 is using for playing back the third audio content 1172 reaches the determined "local" playback time for an individual frame (or packet), the fourth playback device 1108 plays the audio content (or portions thereof) associated with that individual frame (or packet).

Because the second playback device 1104 plays frames (or packets) comprising portions of the third audio content 1172 according to the playback timing 1174, and because each of the other playback devices 1102, 1106, and 1108 play those same frames (or packets) comprising the same portions of the third audio content 1172 according to the playback timing 1174 (adjusted by their respective "timing offset" values), the first playback device 1102, the second playback device 1104, the third playback device 1106, and the fourth playback device 1108 all play the same frames (or packets) comprising the same portions of the third audio content 1172 in synchrony, i.e., at the same time or at substantially the same time.

Figure 11B:
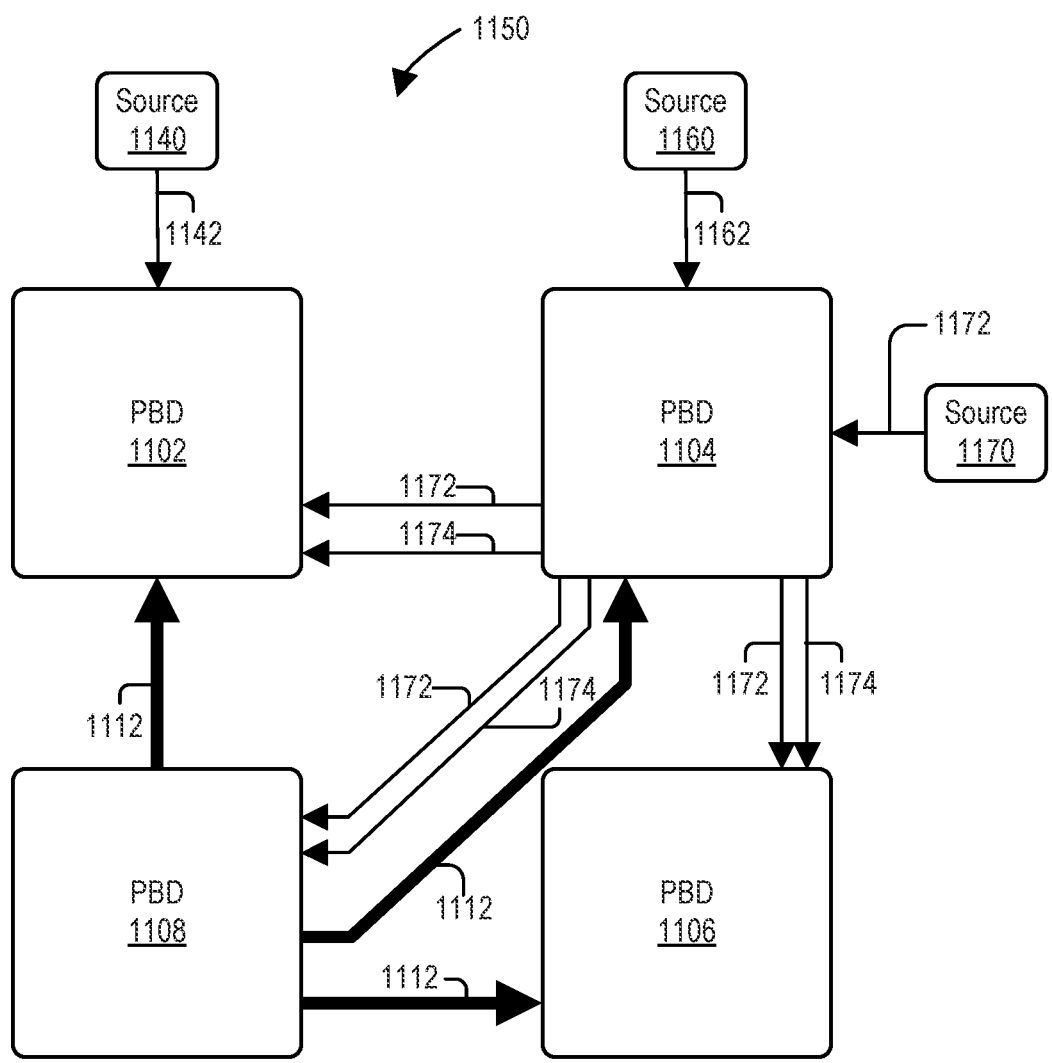
FIG. 11B shows an example configuration of four playback devices playing audio content from multiple sources according to some embodiments.

FIG. 11B shows an alternative example configuration 1150 of four playback devices playing audio content from multiple sources according to some embodiments.

Example configuration 1150 is the same as example configuration 1100 in most material respects except that the fourth playback device 1108 generates and provides clock timing 1112 for all the playback devices 1102, 1104, 1106, and 1108 rather than the second playback device 1104 providing clock timing 1110 for all the playback devices 1102, 1104, 1106, and 1108.

In an initial state, in example 1150, the first playback device 1102 (i) receives (or otherwise obtains) first audio content 1142 from the first audio source 1140; and (ii) plays the first audio content 1142 individually, i.e., not in synchrony with any of the other playback devices. And the second playback device 1104 receives (or otherwise obtains) second audio content 1162 from the second audio source 1160; and (ii) plays the second audio content 1162 individually, i.e., not in synchrony with any of the other playback devices in example 1100. Neither the third playback device 1106 nor the fourth playback device 1108 receive or play any audio content, at least in this initial state.

Later, and while in the initial state where the third playback device 1106 and the fourth playback device 1108 are not playing any content and the first playback device 1102 and second playback device 1104 are individually playing the first audio content 1142 and the second audio content 1162, respectively, the second playback device 1104 receives (or otherwise obtains) the third audio content 1172 from the third audio source 1170. Playback devices 1102, 1104, 1106, and 1108 are configured to play this third audio content 1172 in synchrony.

After receiving at least a portion of the third audio content 1172, the second playback device 1104 processes the third audio content 1172 and generates a series of frames (or packets), wherein individual frames (or packets) comprise one or more portions of the third audio content 1172.

The second playback device 1104 also generates playback timing for the third audio content 1172 with clock timing 1112 from a remote clock (rather than a local clock as in example 1100). In operation, the second playback device 1104 generates the playback timing 1174 based on (i) the "timing offset" between (a) a local clock at the second playback device 1104 that the second playback device 1104 uses for generating the playback timing 1174 for the third audio content 1172 and (b) the clock timing 1112 that the second playback device 1104 receives from the fourth playback device 1108, and (ii) a "timing advance" based on an amount of time that is greater than or equal to the sum of (a) the network transit time required for packets transmitted from the second playback device 1104 to arrive at one or more of the other playback devices 1102, 1106, and 1108 and (b) the amount of time required for one or more of the other playback devices 1102, 1106, and 1108 to process packets received from the second playback device 1104 for playback. As described above, the playback timing for a frame or packet corresponds to a future time, relative to a reference clock time, that the audio content in the frame (or packet) is to be played. In this instance, the reference clock time is the clock time of the "remote" clock at the fourth playback device 1108 that the fourth playback device 1108 uses to generate the clock timing 1112. The fourth playback device 1108 transmits this clock timing 1112 to the other playback devices 1102, 1106, and 1108.

As mentioned above, the second playback device 1104 uses both the "timing offset" and the "timing advance" to generate the playback timing 1174 for the third audio content 1172. For an individual frame (or packet) containing a portion of the third audio content 1172, the second playback device 1104 generates playback timing for that individual frame (or packet) by adding the sum of the "timing offset" and the "timing advance" to a current time of the local clock at the second playback device 1104 that the second playback device 1104 uses to generate the playback timing 1174. In operation, the "timing offset" may be a positive or a negative offset, depending on whether the local clock at the second playback device 1104 is ahead of or behind the "remote" reference clock at the fourth playback device 1108 that was used to generate the clock timing 1112. And the "timing advance" is a positive number because it corresponds to a future time that playback devices are to play the audio content.

By adding the sum of the "timing advance" and the "timing offset" to a current time of the local clock at the second playback device 1104 that the second playback device 1104 is using to generate the playback timing 1174, the second playback device 1104 is, in effect, generating the playback timing 1174 relative to the reference clock of the fourth playback device 1108 that the fourth playback device 1108 uses to generate the clock timing 1112 that the fourth playback device 1108 transmits to the second playback device 1104.

After generating the playback timing 1174, and while playing at least a portion of the second audio content 1162, the second playback device 1104 (i) transmits the third audio content 1172 and the playback timing 1174 to the first playback device 1102, third playback device 1106, and fourth playback device 1108, and (ii) plays the third audio content 1172 in synchrony with the first playback device 1102, third playback device 1106, and fourth playback device 1108 while also playing the second audio content 1162 individually.

The second playback device 1104 plays the third audio content 1172 using locally-generated playback timing (i.e., playback timing 1174) and remote clock timing (i.e., clock timing 1112).

To play an individual frame (or packet) of the third audio content 1172 in synchrony with the other playback devices 1102, 1106, and 1108, the second playback device 1104 subtracts the "timing offset" from the playback timing 1174 (which comprises the sum of the "timing offset" and the "timing advance") for that individual frame (or packet) to generate a "local" playback time for playing the portion(s) of the third audio content 1172 within that individual frame (or packet).

After generating the "local" playback time for playing the portion(s) of the third audio content 1172 within the individual frame (or packet), the second playback device 1104 plays the portion(s) of the third audio content 1172 in the individual frame (or packet) when the local clock at the second playback device 1104 that the second playback device 1104 is using to play the third audio content 1172 (which is the same local clock that the second playback device 1104 used to generate the playback timing 1174) reaches the "local" playback time for that individual frame (or packet).

Alternatively, in some embodiments, rather using the playback timing 1174 to play the third audio content 1172, the second playback device 1104 can instead generate and use "device-specific" playback timing to play the third audio content 1172 in the same way that, in the alternative embodiments of example 800, the second playback device 804 generates and uses "device-specific" playback timing to play the second audio content 852

The first playback device 1102 and the third playback device 1106 each play the third audio content 1172 based on remote playback timing (i.e., playback timing 1174 generated by the second playback device 1104) and remote clock timing (i.e., clock timing 1112 received from the fourth playback device 1108).

In particular, the first playback device 1102 and the third playback device 1106 each (i) receive (or otherwise obtain) the processed third audio content 1172 from the second playback device 1104 in the form of a series of frames and/or packets comprising the third audio content 1172, (ii) receive (or otherwise obtain) the playback timing 1174 from the second playback device 1104, (iii) receive (or otherwise obtain) the clock timing 1112 from the fourth playback device 1108, and (iv) use the clock timing 1112 and the playback timing 1174 to play the third audio content 1172 in synchrony with each other and the second and fourth playback devices.

Before playing an individual frame (or packet) comprising a portion(s) of the third audio content 1172, the first playback device 1102 and the third playback device 1106 each calculate their own "timing offset" value relative to the clock timing 1112 received from the fourth playback device 1108. In particular, the first playback device 1102 calculates (or otherwise determines) a "timing offset" that corresponds to a difference between (a) the "reference" clock at the fourth playback device 1108 that the fourth playback device 1108 used to generate the clock timing 1112 and (b) the "local" clock at the first playback device 1002 that the first playback device 1102 uses to play the third audio content 1172. And the third playback device 1106 calculates (or otherwise determines) a "timing offset" that corresponds to a difference between (a) the "reference" clock at the fourth playback device 1108 that the fourth playback device 1108 used to generate the clock timing 1112 and (b) the "local" clock at the third playback device 1106 that the third playback device 1106 uses to play the third audio content 1172.

Because the local clocks at the first playback device 1102 and the third playback device 1106 may have different times and/or operate at slightly different clocking rates, the individual "timing offset" values determined and used by each of the first playback device 1102 and the third playback device 1106 to play the third audio content 1172 may be different from each other. However, the "timing offsets" used by the first playback device 1102 and the third playback device 1106 need not be different; the "timing offsets" could be the same if the local clocks at the first playback device 1102 and the third playback device 1106 happen to have the same (or substantially the same) time and/or operate at the same (or substantially the same) clocking rates. In embodiments where playback devices calculate and recalculate a "timing offset" during the course of playback, there could be timeframes during which the first playback device 1102 and the third playback device 1106 each independently determine and use the same value for their "timing offset" but other timeframes during which the first playback device 1102 and the third playback device 1106 each independently determine and use different values for their "timing offset."

The first playback device 1102 and the third playback device 1106 each use their determined "timing offset" values and the playback timing 1174 to play the third audio content 1172.

In operation, the first playback device 1102 (while playing at least a portion of the first audio content 1142) generates new playback timing (specific to the first playback device 1102) for individual frames (or packets) comprising the third audio content 1172 by adding its determined "timing offset" to the playback time for each frame (or packet) received from the second playback device 1104. With this approach, the first playback device 1102 converts the playback timing 1174 for the third audio content 1172 received from the second playback device 1104 into "local" playback timing for the first playback device 1102. And when the "local" clock that the first playback device 1102 is using for playing back the third audio content 1172 reaches the determined "local" playback time for an individual frame (or packet), the first playback device 1102 plays the audio content (or portions thereof) associated with that individual frame (or packet).

Similarly, the third playback device 1106 generates new playback timing (specific to the third playback device 1106) for individual frames (or packets) comprising the third audio content 1172 by adding its determined "timing offset" to the playback time for each frame (or packet) received from the second playback device 1104. With this approach, the third playback device 1106 converts the playback timing 1174 for the third audio content 1172 received from the second playback device 1104 into "local" playback timing for the third playback device 1106. And when the "local" clock that the third playback device 1106 is using for playing back the third audio content 1172 reaches the determined "local" playback time for an individual frame (or packet), the third playback device 1106 plays the audio content (or portions thereof) associated with that individual frame (or packet).

The fourth playback device 1108 plays the third audio content 1172 based on remote playback timing (i.e., playback timing 1174 generated by the second playback device 1104) and local clock timing (i.e., clock timing 1112). In operation, the fourth playback device 1108 (i) receives the frames (or packets) comprising the portions of the third audio content 1172 from the second playback device 1104, (ii) receives the playback timing 1174 for the third audio content 1172 from the second playback device 1104 (e.g., in the frame and/or packet headers of the frames and/or packets comprising the portions of the third audio content 1172 or perhaps separately from the frames and/or packets comprising the portions of the third audio content 1172), and (iii) plays the portion(s) of the third audio content 1172 in the individual frame (or packet) when the clock that the fourth playback device 1108 used to generate the clock timing 1112 reaches the playback time specified in the playback timing 1174 for that individual frame (or packet). Because the second playback device 1104 used the "timing offset" (the time difference between the clock timing 1112 from the fourth playback device 1108 and the local clock of the second playback device 1104) when generating the playback timing 1174, the playback timing 1174 already accounts for differences between timing at the second playback device 1104 and the fourth playback device 1108.

Because each of the playback devices 1102, 1104, 1106, and 1108 plays frames (or packets) comprising portions of the third audio content 1172 according to the playback timing 1174 (adjusted, where appropriate, by their respective "timing offset" values, which are derived from the clock timing 1112), the playback devices 1102, 1104, 1106, and 1108 all play the same frames (or packets) comprising the same portions of the third audio content 1172 in synchrony, i.e., at the same time or at substantially the same time.

V. Example Methods

Figure 12:
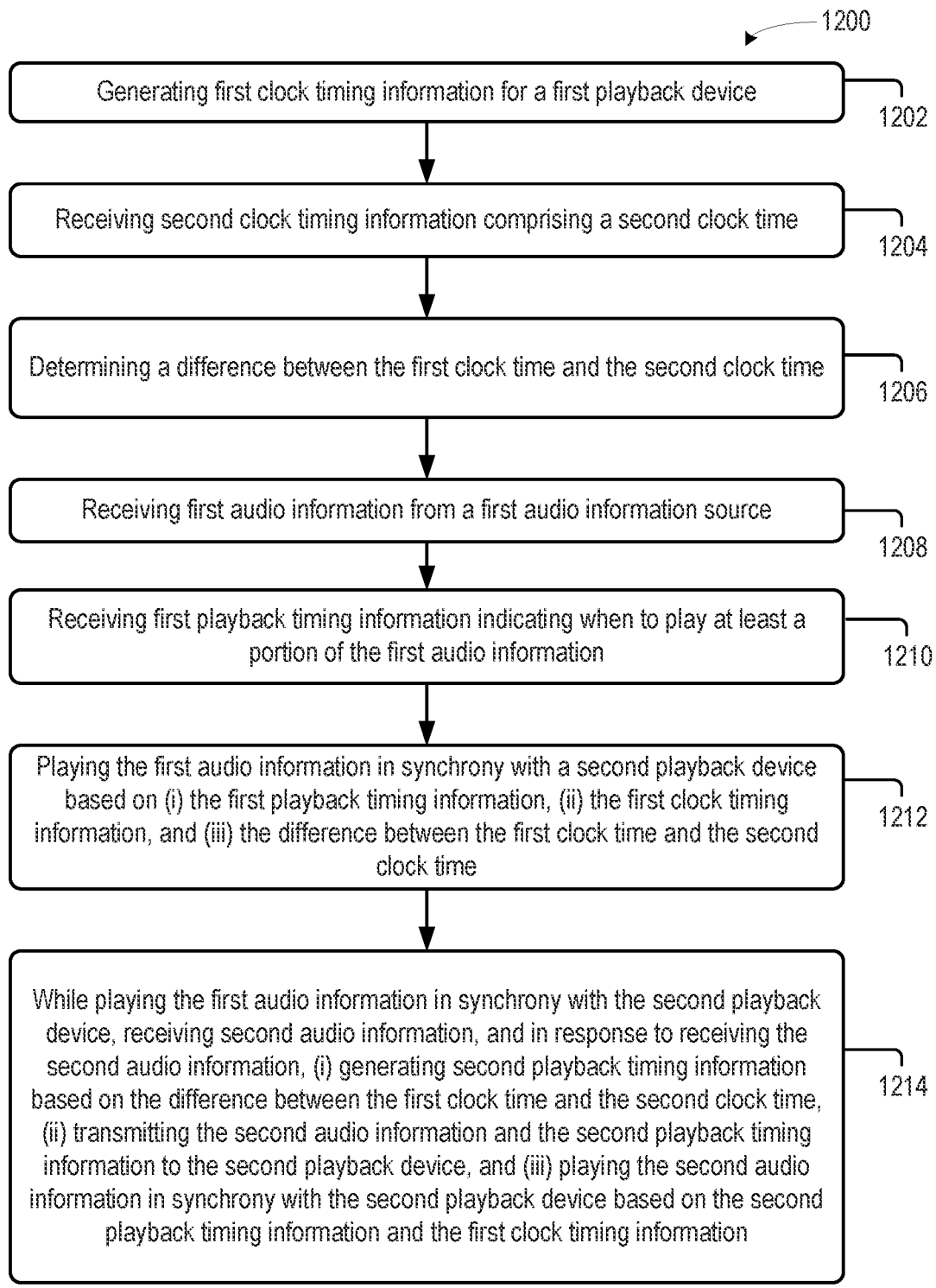
FIG. 12 shows an example method performed by a playback device for playing audio content from multiple sources according to some embodiments.

FIG. 12 shows an example method 1200 performed by a playback device for playing audio content from multiple sources according to some embodiments.

Method 1200 begins at block 1202, which includes generating first clock timing information for the first playback device, where the first clock timing information includes a first clock time of the first playback device.

Next, method 1200 advances to block 1204, which includes receiving second clock timing information comprising a second clock time. In some embodiments, receiving the second clock timing information comprising the second clock time at block 1204 includes receiving the second clock timing information from the second playback device.

Next, method 1200 advances to block 1206, which includes determining a difference between the first clock time and the second clock time.

In some embodiments, determining a difference between the first clock time and the second clock time at block 1206 includes determining the difference on an ongoing basis.

Next, method 1200 advances to block 1208, which includes receiving first audio information from a first audio information source. In some embodiments, receiving the first audio information from the first audio information source at block 1208 includes receiving the first audio information via the second playback device.

Next, method 1200 advances to block 1210, which includes receiving first playback timing information indicating when to play at least a portion of the first audio information. In some embodiments, receiving the first playback timing information indicating when to play at least a portion of the first audio information at block 1210 includes receiving a first plurality of frames, wherein a first frame includes (i) one or more samples of the first audio information and (ii) a first time for playing the one or more samples of the first frame.

Next, method 1200 advances to block 1212, which includes playing the first audio information in synchrony with a second playback device based on (i) the first playback timing information, (ii) the first clock timing information, and (iii) the difference between the first clock time and the second clock time.

In some embodiments, playing the first audio information in synchrony with the second playback device based on (i) the first playback timing information, (ii) the first clock timing information, and (iii) the difference between the first clock time and the second clock time in block 1212 includes, for a first frame and/or packet of audio information: (a) generating a first playback time for the first frame and/or packet; and (b) playing the one or more samples of the first frame and/or packet when a current clock time of the first playback device equals the first playback time.

In some embodiments, generating the first playback time for the first frame and/or packet comprises adding (i) the time for playing the one or more samples of the first audio information to (ii) the difference between the first clock time and the second clock time.

Next, method 1200 advances to block 1214, which includes while playing the first audio information in synchrony with the second playback device, receiving second audio information, and in response to receiving the second audio information, (i) generating second playback timing information based on the difference between the first clock time and the second clock time, (ii) transmitting the second audio information and the second playback timing information to the second playback device, and (iii) playing the second audio information in synchrony with the second playback device based on the second playback timing information and the first clock timing information.

In some embodiments, playing the first audio information in synchrony with the second playback device at block 1214 includes the first playback device playing a first channel of the first audio information while the second playback device plays a second channel of the first audio information.

In some embodiments, generating the second playback timing information at block 1214 includes generating a second plurality of frames and/or packets, wherein a second frame and/or packet of the second plurality of frames and/or packets comprises (i) one or more samples of the second audio information and (ii) a second time for playing the one or more samples of the second frame and/or packet, wherein the second time is based on the difference between the first clock time and the second clock time.

In some embodiments, playing the second audio information in synchrony with the second playback device while playing the first audio information in synchrony with the second playback device at block 1214 includes: (i) playing the first audio information in synchrony with the second playback device based on (a) the first playback timing information, (b) the first clock timing information, and (c) the difference between the first clock time and the second clock time; and (ii) playing the second audio information in synchrony with the second playback device based on (a) the second playback timing information and (b) the first clock timing information.

In some embodiments, playing the first audio information in synchrony with the second playback device at block 1214 includes playing the first audio information in synchrony with the second playback device and a third playback device based on (i) the first playback timing information, (ii) the first clock timing information, and (iii) the difference between the first clock time and the second clock time.

In some embodiments, in response to receiving the second audio information, the first playback device is additionally configured to (i) transmit the second audio information and the second playback timing information to the third playback device, and (ii) play the second audio information in synchrony with the second playback device and the third playback device based on the second playback timing information and the first clock timing information.

And in some embodiments, in response to receiving the second audio information, the first playback device is additionally configured to: (i) transmit the second audio information and the second playback timing information to a third playback device, and (ii) play the second audio information in synchrony with the second playback device and the third playback device based on the second playback timing information and the first clock timing information.

Figure 13:
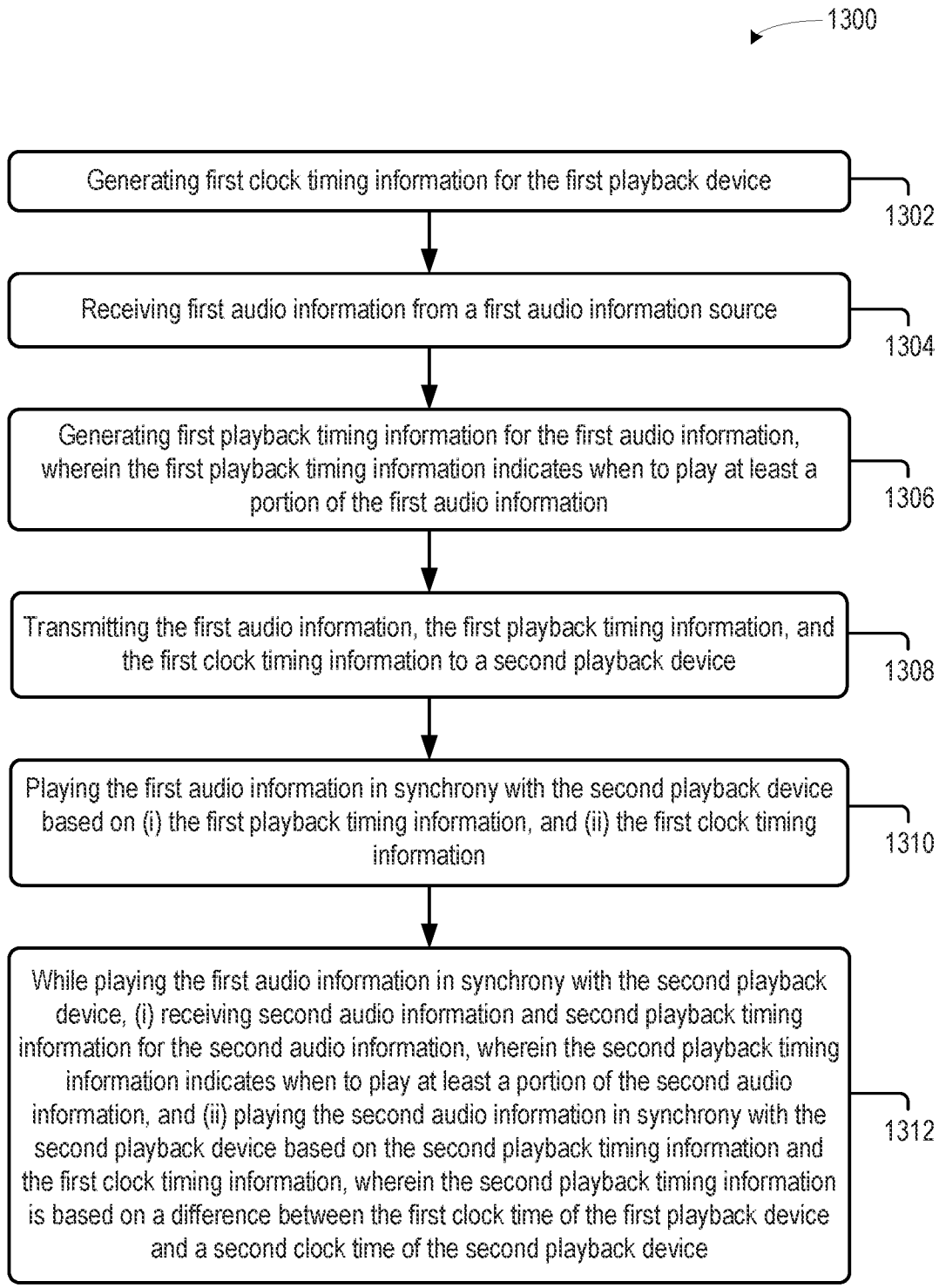
FIG. 13 shows an example method performed by a playback device for playing audio content from multiple sources according to some embodiments.

FIG. 13 shows an example method 1300 performed by a playback device for playing audio content from multiple sources according to some embodiments.

Method 1300 begins at block 1302, which includes generating first clock timing information for a first playback device, where the first clock timing information includes a first clock time of the first playback device.

Next, method 1300 advances to block 1304, which includes receiving first audio information from a first audio information source.

Next, method 1300 advances to block 1306, which includes generating first playback timing information for the first audio information, where the first playback timing information indicates when to play at least a portion of the first audio information.

In some embodiments, generating the first playback timing information for the first audio information at block 1306 includes generating a first plurality of frames and/or packets, wherein an individual frame and/or packet of the first plurality of frames and/or packets comprises (i) one or more samples of the first audio information and (ii) a playback time for playing the one or more samples of the individual frame and/or packet of the first plurality of frames, where the playback time is based on the first clock timing information.

Next, method 1300 advances to block 1308, which includes transmitting the first audio information, the first playback timing information, and the first clock timing information to a second playback device.

Next, method 1300 advances to block 1310, which includes playing the first audio information in synchrony with the second playback device based on (i) the first playback timing information, and (ii) the first clock timing information.

Next, method 1300 advances to block 1312, which includes, while playing the first audio information in synchrony with the second playback device, (i) receiving second audio information and second playback timing information for the second audio information, wherein the second playback timing information indicates when to play at least a portion of the second audio information, and (ii) playing the second audio information in synchrony with the second playback device based on the second playback timing information and the first clock timing information, where the second playback timing information is based on a difference between the first clock time of the first playback device and a second clock time of the second playback device.

In some embodiments, receiving the second audio information at block 1312 includes receiving the second audio information via the second playback device. And in some embodiments, receiving the second playback timing information for the second audio information at block 1312 includes receiving the second playback timing information from the second playback device.

In some embodiments, receiving the second playback timing information for the second audio information at block 1312 includes receiving a second plurality of frames and/or packets, wherein an individual frame and/or packet of the second plurality of frames and/or packets comprises (i) one or more samples of the second audio information and (ii) a playback time for playing the one or more samples of the individual frame and/or packet of the second plurality of frames and/or packets.

In some embodiments, playing the first audio information in synchrony with the second playback device comprises the first playback device playing a first channel of the first audio information while the second playback device plays a second channel of the first audio information.

In some embodiments, playing the second audio information in synchrony with the second playback device while playing the first audio information in synchrony with the second playback device at block 1312 includes: (i) playing the first audio information in synchrony with the second playback device based on (a) the first playback timing information and (b) the first clock timing information; and (ii) playing the second audio information in synchrony with the second playback device based on (a) the second playback timing information and (b) the first clock timing information.

In some embodiments, playing the second audio information in synchrony with the second playback device while playing the first audio information in synchrony with the second playback device at block 1312 includes: (i) playing the first audio information in synchrony with the second playback device and a third playback device based on (a) the first playback timing information and (b) the first clock timing information; and (ii) playing the second audio information in synchrony with the second playback device and the third playback device based on (a) the second playback timing information and (b) the first clock timing information.

VI. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:
one or more processors;
a wireless communications interface; and
tangible, non-transitory, computer-readable media comprising program instructions executable by the one or more processors such that the first playback device is configured to:
play first audio content in a groupwise manner with at least a second playback device based on (i) first playback timing information associated with the first audio content, wherein the first playback timing information is received via the wireless communications interface, and (ii) a relationship between first clock information of the first playback device and second clock information of the second playback device;
while the first playback device is playing the first audio content in the groupwise manner with the second playback device, (i) generate second playback timing information associated with second audio content received via the wireless communications interface, wherein the second playback timing information is based on a relationship between the first clock information of the first playback device and the second clock information of the second playback device, and (ii) transmit the second audio content and the second playback timing information associated with the second audio content to the second playback device via the wireless communications interface; and
play the second audio content in a groupwise manner with the second playback device based on (i) the second playback timing information and (ii) the first clock information of the first playback device.

2. The first playback device of claim 1, wherein the wireless communications interface comprises one of a WiFi interface or a Bluetooth interface.

3. The first playback device of claim 1, wherein the program instructions executable by the one or more processors such that the first playback device is configured to play the first audio content received via the wireless communications interface in a groupwise manner with at least a second playback device based on (i) first playback timing information associated with the first audio content, wherein the first playback timing information is received via the wireless communications interface, and (ii) a relationship between first clock information of the first playback device and second clock information of the second playback device comprise program instructions executable by the one or more processors such that the first playback device is configured to:
generate local playback timing for the first audio content based on the relationship between the first clock information of the first playback device and the second clock information of the second playback device; and
play the first audio content based on the local playback timing and the first clock information of the first playback device.

4. The first playback device of claim 1, wherein the program instructions executable by the one or more processors such that the first playback device is configured to play the first audio content received via the wireless communications interface in a groupwise manner with at least a second playback device comprise program instructions executable by the one or more processors such that the first playback device is configured to play a first channel of the first audio content while the second playback device plays a second channel of the first audio content.

5. The first playback device of claim 1, wherein the program instructions executable by the one or more processors such that the first playback device is configured to generate second playback timing information associated with second audio content received via the wireless communications interface, wherein the second playback timing information is based on a relationship between the first clock information of the first playback device and the second clock information of the second playback device comprise program instructions executable by the one or more processors such that the first playback device is configured to:
determine a timing offset based on a difference between the first clock information of the first playback device and the second clock information of the second playback device;
determine a timing advance comprising an amount of time that is greater than or equal to a sum of (i) a network transit time required for a packet transmitted from the first playback device to arrive at the second playback device and (b) an amount of time required for the second playback device to process a packet comprising audio content received from the first playback device; and
generate the second playback timing information associated with the second audio content based on the timing offset and the timing advance.

6. The first playback device of claim 1, wherein the program instructions executable by the one or more processors such that the first playback device is configured to play the second audio content in a groupwise manner with the second playback device comprise program instructions executable by the one or more processors such that the first playback device is configured to play a first channel of the second audio content while the second playback device plays a second channel of the second audio content.

7. The first playback device of claim 1, wherein the program instructions executable by the one or more processors such that the first playback device is configured to play the second audio content in a groupwise manner with the second playback device based on (i) the second playback timing information and (ii) the first clock information of the first playback device comprise program instructions executable by the one or more processors such that the first playback device is configured to:
play the second audio content in a groupwise manner with the second playback device play the second audio content in a groupwise manner with the second playback device while the first playback device continues to play the first audio content in a groupwise manner with the second playback device.

8. The first playback device of claim 7, wherein the program instructions executable by the one or more processors such that the first playback device is configured to play the second audio content in a groupwise manner with the second playback device while the first playback device continues to play the first audio content in a groupwise manner with the second playback device comprise program instructions executable by the one or more processors such that the first playback device is configured to:
    duck playback of the first audio content while playing the second audio content.

9. The first playback device of claim 1, wherein the program instructions comprise further program instructions executable by the one or more processors such that the first playback device is further configured to:
    determine the relationship between first clock information of the first playback device and second clock information of the second playback device.

10. The first playback device of claim 1, wherein:
    the program instructions executable by the one or more processors such that the first playback device is configured to play the first audio content received via the wireless communications interface in a groupwise manner with at least a second playback device comprise program instructions executable by the one or more processors such that the first playback device is configured to play the first audio content received via the wireless communications interface in a groupwise manner with the second playback device and a third playback device;
    the program instructions executable by the one or more processors such that the program instructions executable by the one or more processors such that the first playback device is configured to transmit the second audio content and the second playback timing information associated with the second audio content to the second playback device via the wireless communications interface comprise program instructions executable by the one or more processors such that the first playback device is configured to transmit the second audio content and the second playback timing information associated with the second audio content to the second playback device and the third playback device via the wireless communications interface; and
    the program instructions executable by the one or more processors such that the program instructions executable by the one or more processors such that the first playback device is configured to play the second audio content in a groupwise manner with the second playback device comprise program instructions executable by the one or more processors such that the first playback device is configured to play the second audio content in a groupwise manner with the second playback device and the third playback device.

11. Tangible, non-transitory computer-readable media comprising program instructions, wherein the program instructions, when executed by one or more processors, cause a first playback device to perform functions comprising:
    playing first audio content received via a wireless communications interface in a groupwise manner with at least a second playback device based on (i) first playback timing information associated with the first audio content, wherein the first playback timing information is received via the wireless communications interface, and (ii) a relationship between first clock information of the first playback device and second clock information of the second playback device;
    while the first playback device is playing the first audio content in the groupwise manner with the second playback device, (i) generating second playback timing information associated with second audio content received via the wireless communications interface, wherein the second playback timing information is based on a relationship between the first clock information of the first playback device and the second clock information of the second playback device, and (ii) transmitting the second audio content and the second playback timing information associated with the second audio content to the second playback device via the wireless communications interface; and
    playing the second audio content in a groupwise manner with the second playback device based on (i) the second playback timing information and (ii) the first clock information of the first playback device.

12. The tangible, non-transitory computer-readable media of claim 11,
    wherein the wireless communications interface comprises one of a WiFi interface or a Bluetooth interface.

13. The tangible, non-transitory computer-readable media of claim 11, wherein playing the first audio content received via the wireless communications interface in a groupwise manner with at least a second playback device based on (i) first playback timing information associated with the first audio content, wherein the first playback timing information is received via the wireless communications interface, and (ii) a relationship between first clock information of the first playback device and second clock information of the second playback device comprises:
    generating local playback timing for the first audio content based on the relationship between the first clock information of the first playback device and the second clock information of the second playback device; and
    playing the first audio content based on the local playback timing and the first clock information of the first playback device.

14. The tangible, non-transitory computer-readable media of claim 11, wherein playing the first audio content received via the wireless communications interface in a groupwise manner with at least a second playback device comprises playing a first channel of the first audio content while the second playback device plays a second channel of the first audio content.

15. The tangible, non-transitory computer-readable media of claim 11, wherein generating second playback timing information associated with second audio content received via the wireless communications interface, wherein the second playback timing information is based on a relationship between the first clock information of the first playback device and the second clock information of the second playback device comprises:
    determining a timing offset based on a difference between the first clock information of the first playback device and the second clock information of the second playback device;
    determining a timing advance comprising an amount of time that is greater than or equal to a sum of (i) a network transit time required for a packet transmitted from the first playback device to arrive at the second playback device and (b) an amount of time required for the second playback device to process a packet comprising audio content received from the first playback device; and
    generating the second playback timing information associated with the second audio content based on the timing offset and the timing advance.

16. The tangible, non-transitory computer-readable media of claim 11, wherein playing the second audio content in a groupwise manner with the second playback device comprises playing a first channel of the second audio content while the second playback device plays a second channel of the second audio content.

17. The tangible, non-transitory computer-readable media of claim 11, wherein playing the second audio content in a groupwise manner with the second playback device based on (i) the second playback timing information and (ii) the first clock information of the first playback device comprises:
  playing the second audio content in a groupwise manner with the second playback device playing the second audio content in a groupwise manner with the second playback device while the first playback device continues to play the first audio content in a groupwise manner with the second playback device.

18. The tangible, non-transitory computer-readable media of claim 17, wherein playing the second audio content in a groupwise manner with the second playback device while the first playback device continues to play the first audio content in a groupwise manner with the second playback device comprises:
  ducking playback of the first audio content while playing the second audio content.

19. The tangible, non-transitory computer-readable media of claim 11, wherein the functions further comprise:
  determining the relationship between first clock information of the first playback device and second clock information of the second playback device.

20. The tangible, non-transitory computer-readable media of claim 11, wherein playing first audio content received via the wireless communications interface in a groupwise manner with at least a second playback device comprises playing the first audio content received via the wireless communications interface in a groupwise manner with the second playback device and a third playback device, wherein transmitting the second audio content and the second playback timing information associated with the second audio content to the second playback device via the wireless communications interface comprises transmitting the second audio content and the second playback timing information associated with the second audio content to the second playback device and the third playback device via the wireless communications interface, and wherein playing the second audio content in a groupwise manner with the second playback device comprises playing the second audio content in a groupwise manner with the second playback device and the third playback device.

* * * * *